US012683689B2

(12) United States Patent
Takata et al.

(10) Patent No.: US 12,683,689 B2
(45) Date of Patent: Jul. 14, 2026

(54) OPTICAL TRANSMISSION DEVICE AND COMMUNICATION DEVICE

(71) Applicant: NEC Corporation, Tokyo (JP)

(72) Inventors: Koya Takata, Tokyo (JP); Hisashi Mizumoto, Tokyo (JP); Fujio Okumura, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 346 days.

(21) Appl. No.: 18/683,596

(22) PCT Filed: Aug. 27, 2021

(86) PCT No.: PCT/JP2021/031475
§ 371 (c)(1),
(2) Date: Feb. 14, 2024

(87) PCT Pub. No.: WO2023/026462
PCT Pub. Date: Mar. 2, 2023

(65) Prior Publication Data
US 2024/0380494 A1 Nov. 14, 2024

(51) Int. Cl.
*H04B 10/532* (2013.01)
*H04B 10/50* (2013.01)
*H04B 10/61* (2013.01)

(52) U.S. Cl.
CPC ......... *H04B 10/532* (2013.01); *H04B 10/505* (2013.01); *H04B 10/615* (2013.01)

(58) Field of Classification Search
CPC ... H04B 10/532; H04B 10/505; H04B 10/615
(Continued)

(56) References Cited

U.S. PATENT DOCUMENTS

| | | | |
|---|---|---|---|
| 6,680,797 B2 * | 1/2004 | Juday | G02F 1/292 385/11 |
| 9,632,297 B1 * | 4/2017 | Reuss | G02F 1/292 |

(Continued)

FOREIGN PATENT DOCUMENTS

| | | |
|---|---|---|
| JP | H10-163982 A | 6/1998 |
| WO | 2005/004324 A1 | 1/2005 |

(Continued)

OTHER PUBLICATIONS

International Search Report for PCT Application No. PCT/JP2021/031475, mailed on Nov. 16, 2021.
(Continued)

*Primary Examiner* — Dalzid E Singh
(74) *Attorney, Agent, or Firm* — Sughrue Mion, PLLC

(57) ABSTRACT

A optical transmission device that includes a light source, a spatial light modulator including a modulation part where a plurality of modulation regions that is irradiated with light emitted from the light source is set, a wave plate disposed in an optical path of modulated light that is modulated in each of the modulation regions set in the modulation part of the spatial light modulator, the wave plate converting the modulated light that is modulated in each of the modulation regions to mutually different polarization states, and a curved surface mirror having a curved reflection surface irradiated with the modulated light that is converted to the mutually different polarization states, the curved surface mirror reflecting the modulated light converted to the mutually different polarization states at a projection angle in accordance with a curvature of the reflection surface.

13 Claims, 40 Drawing Sheets

(58) Field of Classification Search
USPC ............................................................ 398/65
See application file for complete search history.

(56) References Cited

U.S. PATENT DOCUMENTS

| | | | | |
|---|---|---|---|---|
| 12,411,326 B2* | 9/2025 | Kuang | ............... | G02B 21/0036 |
| 2002/0176151 A1* | 11/2002 | Moon | ................. | G02B 27/126 |
| | | | | 359/298 |
| 2021/0075511 A1* | 3/2021 | Chou | ................. | H04B 10/1123 |

FOREIGN PATENT DOCUMENTS

| | | | |
|---|---|---|---|
| WO | 2018/168598 A1 | 9/2018 |
| WO | 2019/026175 A1 | 2/2019 |
| WO | 2020/188766 A1 | 9/2020 |

OTHER PUBLICATIONS

English translation of Written opinion for PCT Application No. PCT/JP2021/031475, mailed on Nov. 16, 2021.

\* cited by examiner

Fig.40

OPTICAL TRANSMISSION DEVICE AND COMMUNICATION DEVICE

This application is a National Stage Entry of PCT/JP2021/031475 filed on Aug. 27, 2021, the contents of all of which are incorporated herein by reference, in their entirety.

TECHNICAL FIELD

The present disclosure relates to an optical transmission device and the like that implement communication using spatial light.

BACKGROUND ART

In optical spatial communication, optical signals (hereinafter, also referred to as a spatial optical signal) propagating in space are transmitted and received without using a medium such as an optical fiber. In optical communication using an optical fiber, a multiplexing system of optical signals using polarized light is achieved. Also in the optical spatial communication, when the multiplexed spatial optical signal can be transmitted and the multiplexed spatial optical signal can be separated and received, the communication amount can be doubled.

PTL 1 describes a communication device including a phase modulation type spatial light modulation element. The system of PTL 1 includes a transmitter and a reception device. The reception device of PTL 1 converts circularly polarized signal light emitted from the transmitter into linearly polarized signal light in a direction matching the polarization direction of the phase modulation type spatial light modulation element. The device of PTL 1 generates a phase image based on position information indicating a position of a transmitter. The device of PTL 1 supplies the generated phase image to the phase modulation type spatial light modulation element. The device of PTL 1 diffracts and collects the linearly polarized signal light by the phase modulation type spatial light modulation element, and receives the linearly polarized signal light diffracted and collected.

CITATION LIST

Patent Literature

PTL 1: WO 2019/026175 A1

SUMMARY OF INVENTION

Technical Problem

As in PTL 1, in a projection device including a phase modulation type spatial light modulation element, a polarization direction is determined by the modulation element. Therefore, when the projection regions of the multiplexed spatial optical signals overlap, the projection device of PTL 1 cannot separate the spatial optical signals. That is, the technique of PTL 1 cannot transmit and receive multiplexed spatial optical signals.

An object of the present disclosure is to provide an optical transmission device and the like capable of implementing optical spatial communication using multiplexed spatial optical signals.

Solution to Problem

A optical transmission device according to an aspect of the present disclosure includes a light source, a spatial light modulator including a modulation part where a plurality of modulation regions that is irradiated with light emitted from the light source is set, the spatial light modulator modulating a phase of the radiated light in each of the plurality of modulation regions that is set in the modulation part, a wave plate disposed in an optical path of modulated light that is modulated in each of the plurality of modulation regions set in the modulation part of the spatial light modulator, the wave plate converting the modulated light that is modulated in each of the plurality of modulation regions to mutually different polarization states, and a curved surface mirror having a curved reflection surface irradiated with the modulated light that is converted to the mutually different polarization states, the curved surface mirror reflecting the modulated light converted to the mutually different polarization states at a projection angle in accordance with a curvature of the reflection surface.

Advantageous Effects of Invention

According to the present disclosure, it is possible to provide an optical transmission device and the like capable of implementing optical spatial communication using multiplexed spatial optical signals.

BRIEF DESCRIPTION OF DRAWINGS

FIG. 40 is a block diagram illustrating an example of a hardware configuration that implements control and processing of each example embodiment.

EXAMPLE EMBODIMENT

Figure 1:
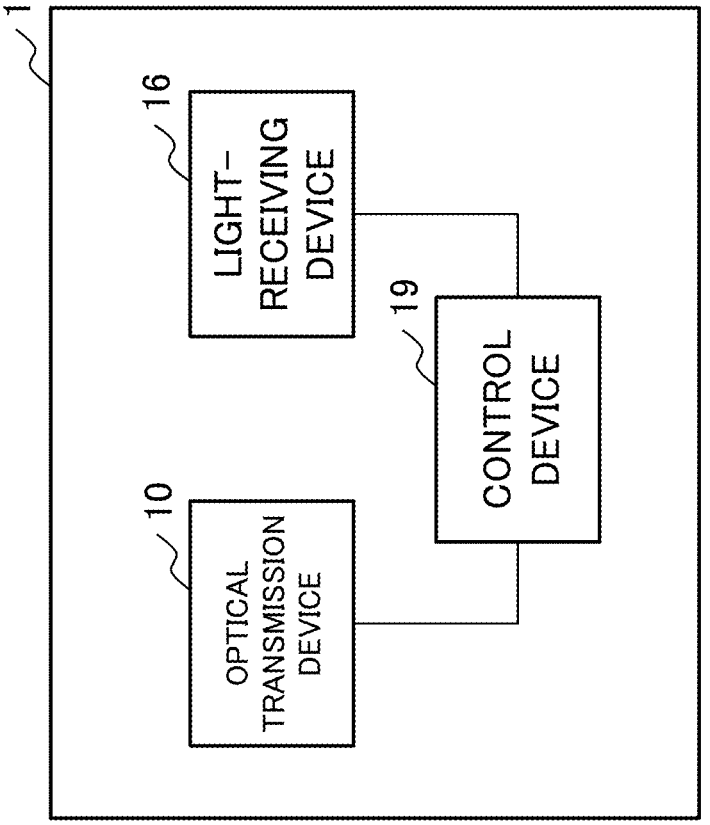
FIG. 1 is a block diagram illustrating an example of a configuration of a communication device according to a first example embodiment.

Hereinafter, embodiments of the present invention will be described with reference to the drawings. However, the example embodiments described below have technically preferable limitations for carrying out the present invention, but the scope of the present invention is not limited to the following. In all the drawings used in the following description of the example embodiment, the same reference numerals are given to the same parts unless there is a particular reason. In the following example embodiments, repeated description of similar configurations and operations may be omitted.

In all the drawings used for description of the following example embodiments, the directions of the arrows in the drawings are merely examples, and do not limit the directions of light and signals. A line indicating a trace of light in the drawings is conceptual, and does not accurately indicate an actual traveling direction or state of light. For example, in the drawings, a change in a traveling direction or a state of light due to refraction, reflection, diffraction, diffusion, or the like at an interface between air and a substance may be omitted, or a pencil of light may be expressed by one line.

First Example Embodiment

First, a communication device according to a first example embodiment will be described with reference to the drawings. The communication device according to the present example embodiment performs optical spatial communication for transmitting and receiving optical signals (Hereinafter, also referred to as a spatial optical signal.) propagating in a space without using a medium such as an optical fiber.

(Configuration)

FIG. 1 is a block diagram illustrating an example of a configuration of a communication device 1 of the present example embodiment. The communication device 1 of the present example embodiment includes an optical transmission device 10, a light-receiving device 16, and a control device 19. In the following, the optical transmission device 10, the light-receiving device 16, and the control device 19 will be described individually.

[Light-Sending Device]

Figure 2:
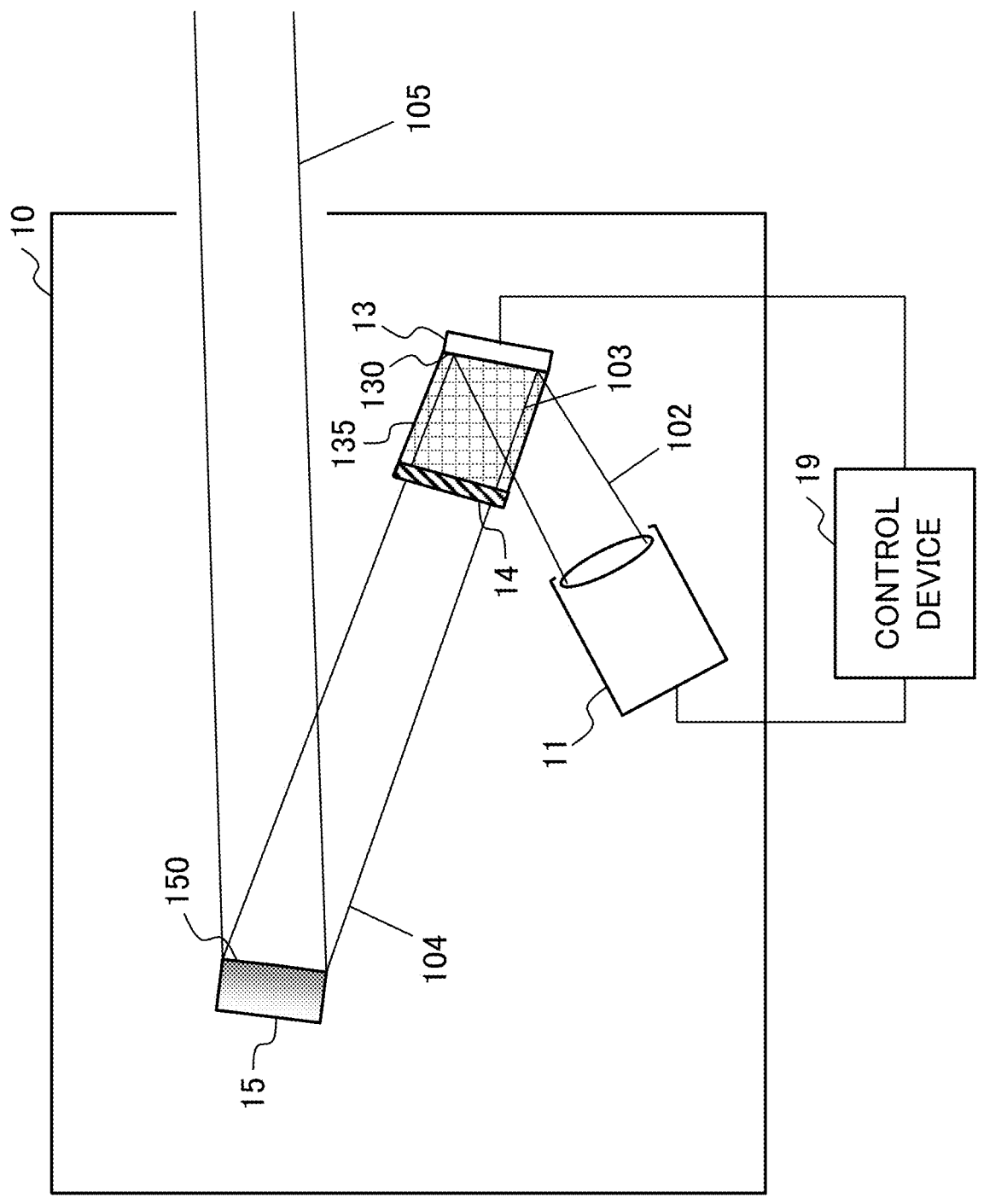
FIG. 2 is a conceptual diagram illustrating an example of a configuration of an optical transmission device included in the communication device according to the first example embodiment.
Figure 3:
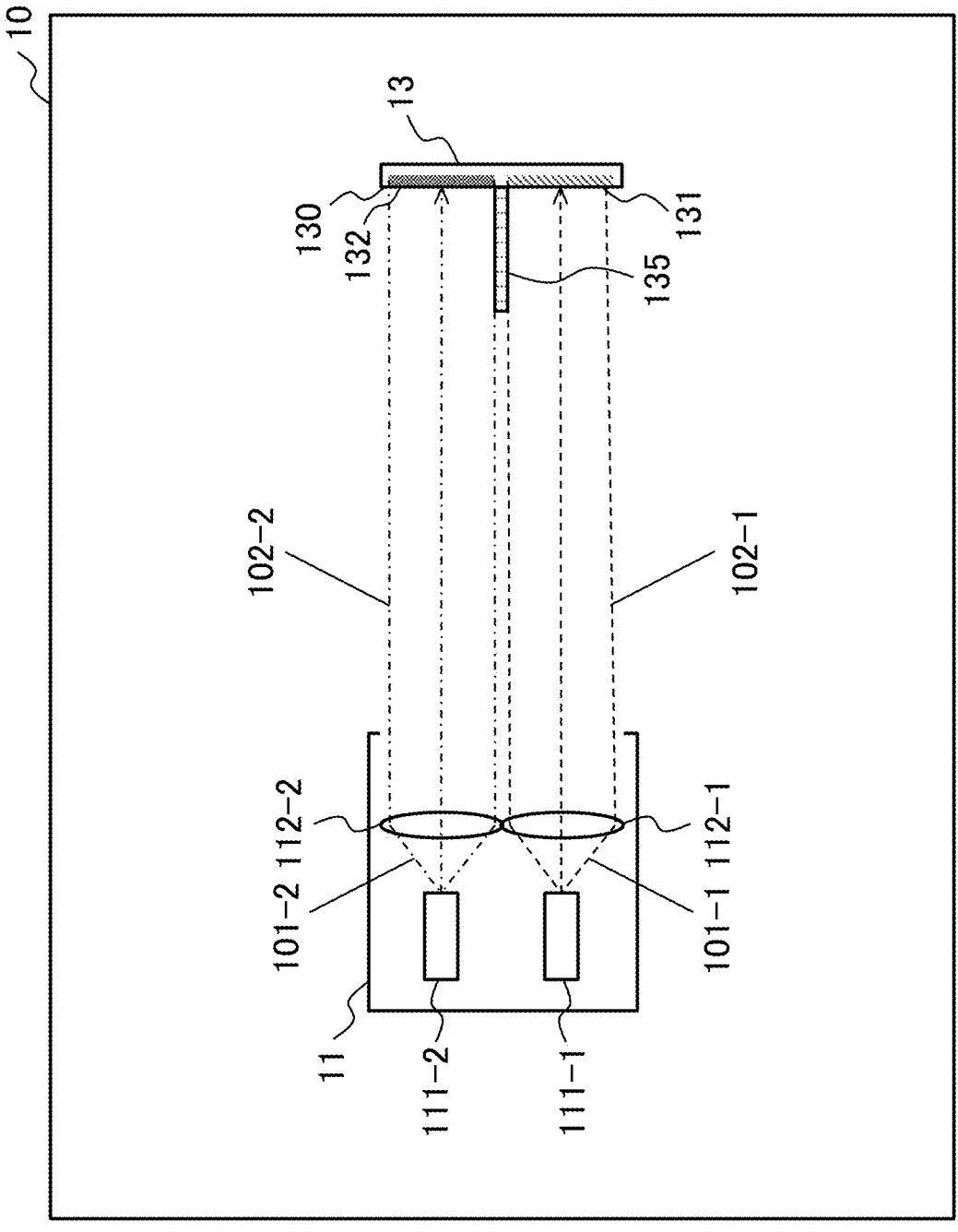
FIG. 3 is a conceptual diagram illustrating an example of an internal configuration of an optical transmission device included in the communication device of the first example embodiment as viewed from an upper viewpoint.

First, the configuration of the optical transmission device 10 will be described with reference to the drawings. FIGS. 2 to 3 are conceptual diagrams illustrating an example of a configuration of the optical transmission device 10. The optical transmission device 10 includes a light source 11, a spatial light modulator 13, a wave plate 14, and a curved surface mirror 15. The spatial light modulator 13 includes a modulation part 130. A first modulation region 131 and a second modulation region 132 are set in the modulation part 130 of the spatial light modulator 13. FIG. 2 is a side view of the internal configuration of the optical transmission device 10 as viewed from the lateral direction. FIG. 3 is a top view of the internal configuration of the optical transmission device 10 as viewed from above. In FIG. 3, the light source 11 and the spatial light modulator 13 are illustrated, and the wave plate 14 and the curved surface mirror 15 are omitted.

FIGS. 2 to 3 are conceptual, and do not accurately represent the positional relationship between the components, the traveling direction of light, and the like.

The light source 11 includes a first light emitter 111-1, a second light emitter 111-2, a first lens 112-1, and a second lens 112-2. The first light emitter 111-1 and the second light emitter 111-2 are disposed in such a way that the output axes do not cross each other in the optical path from the light source 11 to the spatial light modulator 13.

The first light emitter 111-1 emits laser light 101-1 in a predetermined wavelength band toward the first lens 112-1 under the control of the control device 19. The laser light 101-1 emitted from the first light emitter 111-1 is polarized light. The first lens 112-1 is disposed on an optical path of the laser light 101-1 emitted from the first light emitter 111-1. The first lens 112-1 enlarges the laser light 101-1 emitted from the first light emitter 111-1 according to the size of the first modulation region 131 of the modulation part 130 of the spatial light modulator 13. Light 102-1 enlarged by the first lens 112-1 travels toward the first modulation region 131.

The second light emitter 111-2 emits laser light 101-2 in a predetermined wavelength band toward the second lens 112-2 under the control of the control device 19. The laser light 101-2 emitted from the second light emitter 111-2 is polarized light. The polarization directions of the light with which the modulation part 130 of the spatial light modulator 13 is irradiated are required to be the same. Therefore, the polarization direction of the laser light 101-1 emitted from the first light emitter 111-1 and the polarization direction of the laser light 101-2 emitted from the second light emitter 111-2 are set to be the same. The second lens 112-2 is disposed on an optical path of the laser light 101-2 emitted from the second light emitter 111-2. The second lens 112-2 enlarges the laser light 101-2 emitted from the second light emitter 111-2 according to the size of the second modulation region 132 of the modulation part 130 of the spatial light modulator 13. Light 102-2 enlarged by the second lens 112-2 travels toward the second modulation region 132.

The wavelengths of the laser light 101-1 to 2 emitted from the first light emitter 111-1 and the second light emitter 111-2 are not particularly limited, and may be selected according to the application. The wavelengths of the laser light 101-1 to 2 may be the same or different. In the present example embodiment, since the light 102-1 to 2 is emitted toward the same spatial light modulator 13, the polarization directions of the laser light 101-1 to 2 are the same. For example, the first light emitter 111-1 and the second light emitter 111-2 emit the laser light 101-1 to 2 in visible and infrared wavelength bands. For example, in the case of near infrared rays of 800 to 900 nanometers (nm), the laser class can be increased, so that the sensitivity can be improved by about one digit as compared with other wavelength bands. For example, a high-output laser light source can be used for infrared rays in a wavelength band of 1.55 micrometers (μm). As an infrared laser light source in a wavelength band of 1.55 μm, an aluminum gallium arsenide phosphorus (AlGaAsP)-based laser light source, an indium gallium arsenide (InGaAs)-based laser light source, or the like can be used. The longer the wavelength of the laser light 101-1 to 2 is, the larger the diffraction angle can be made, and the higher energy can be set to be.

The spatial light modulator 13 includes the modulation part 130. The first modulation region 131 and the second modulation region 132 are set in the modulation part 130. The first modulation region 131 is irradiated with the light 102-1. The light 102-1 is modulated by the first modulation region 131 and emitted as the modulated light 103-1. The second modulation region 132 is irradiated with the light 102-2. The light 102-2 is modulated by the second modulation region 132 and emitted as the modulated light 103-2.

A partition wall 135 is disposed between the first modulation region 131 and the second modulation region 132. The partition wall 135 stands perpendicular to the surface of the modulation part 130. The partition wall 135 divides the modulation part 130 into two in such a way that the modulated light 103-1 modulated in the first modulation region 131 and the modulated light 103-2 modulated in the second modulation region 132 are not mixed immediately after being modulated by the modulation part 130. A pattern (also referred to as a phase image) related to an image displayed by projection light 105 is set in each of the first modulation region 131 and the second modulation region 132 under the control of the control device 19. When the spatial light modulator 13 is used, a high-order image is generated as in the diffraction grating because the diffraction phenomenon is used. The high-order image is not clear due to low power, but it is difficult to make them completely invisible. The partition wall 135 prevents a high-order image that can be displayed on the face to be projected from generating.

For example, the spatial light modulator 13 is achieved by a spatial light modulator using ferroelectric liquid crystal, homogeneous liquid crystal, vertical alignment liquid crystal, or the like. For example, the spatial light modulator 13 can be achieved by liquid crystal on silicon (LCOS). The spatial light modulator 13 may be achieved by a micro electro mechanical system (MEMS). In the phase modulation type spatial light modulator 13, the energy can be concentrated on the portion of the image by operating to sequentially switch the portion on which the projection light 105 is projected. Therefore, in the case of using the phase modulation type spatial light modulator 13, when the output of the light source 11 is the same, the image can be displayed brighter than that of other methods.

Figure 4:
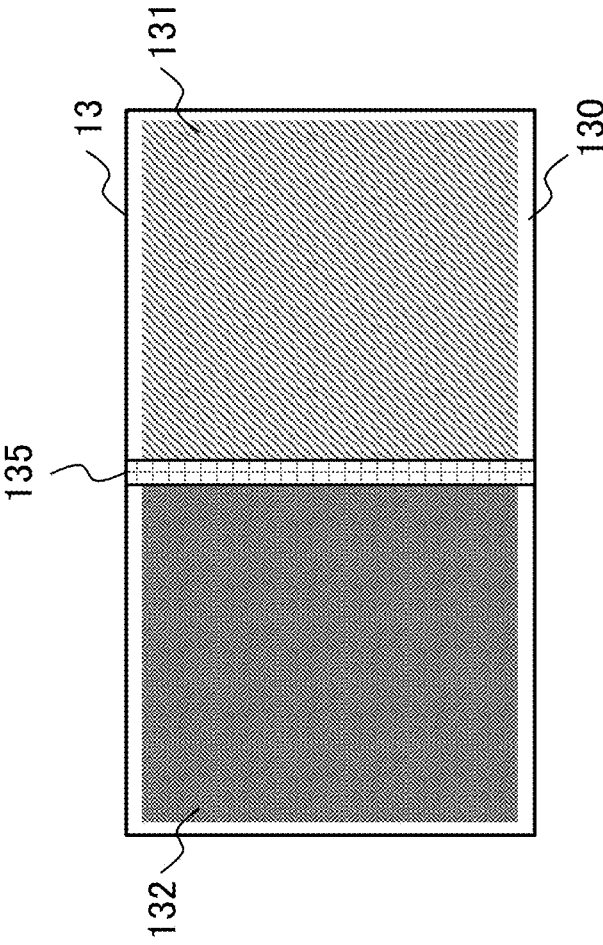
FIG. 4 is a conceptual diagram for describing an example of a modulation region set in a modulation part of a spatial light modulator of the optical transmission device included in the communication device of the first example embodiment.

FIG. 4 is an example of the first modulation region 131 and the second modulation region 132 set in the modulation part 130 of the spatial light modulator 13. A pattern (phase image) related to an image formed by the modulated light 103-1 is set in the first modulation region 131. A phase image related to an image formed by the modulated light 103-2 is set in the second modulation region 132. For example, in a case where only one of the modulated light 103-1 and the modulated light 103-2 is used for image display, the phase image may be set only in the modulation region where the modulated light 103 used for image display is emitted.

Each of the first modulation region 131 and the second modulation region 132 allocated to the modulation part 130 of the spatial light modulator 13 is divided into a plurality of regions (also referred to as tiling). For example, each of the first modulation region 131 and the second modulation region 132 is divided into rectangular regions (also referred to as tiles) having a desired aspect ratio. Each of the plurality of tiles includes a plurality of pixels. A phase image is tiled to each of the plurality of tiles set in the first modulation region 131 and the second modulation region 132. For example, a phase image generated in advance is set in each of the plurality of tiles. A phase image related to a projected image is set to each of the plurality of tiles.

When the modulation part 130 is irradiated with the light 102 in a state where the phase images are set for the plurality of tiles, the modulated light 103 that forms an image related to the phase image of each tile is emitted. As the number of tiles set in the modulation part 130 increases, a clear image can be displayed. However, when the number of pixels of each tile decreases, the resolution decreases. Therefore, the size and number of tiles set in the modulation part 130 are set according to the application.

Figure 5:
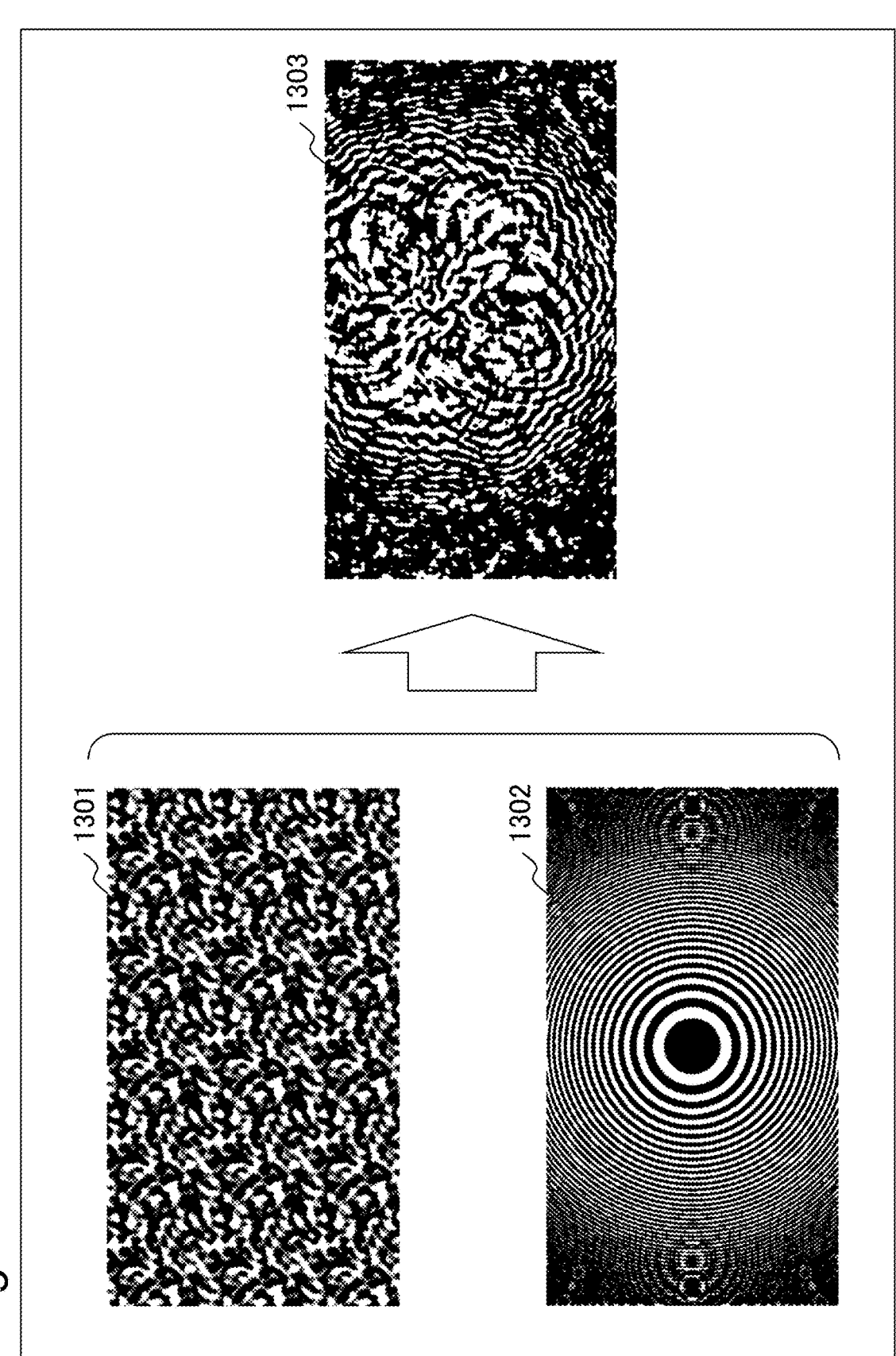
FIG. 5 is a conceptual diagram for describing an example of a pattern set in a modulation part of the spatial light modulator of the optical transmission device included in the communication device of the first example embodiment.

FIG. 5 is a conceptual diagram illustrating an example of patterns set in the first modulation region 131 and the second modulation region 132 of the modulation part 130 of the spatial light modulator 13. A composite image 1303 is set in each of the first modulation region 131 and the second modulation region 132. The composite image 1303 is a pattern obtained by combining a phase image 1301 for forming a desired image and a virtual lens image 1302 for condensing light for forming a desired image. As in diffraction, the wavefront of light can be controlled by phase control. When the phase changes to a spherical shape, a spherical difference is generated in the wavefront, and a lens effect is generated. The virtual lens image 1302 changes the phase of the light 102 with which the modulation part 130 of the spatial light modulator 13 is irradiated into a spherical shape, and generates a lens effect of condensing the light at a position (also referred to as a condensing point) of a predetermined focal distance. Condensing points of the modulated light 103-1 to 2 modulated in the first modulation region 131 and the second modulation region 132 are set on a reflection surface 150 of the curved surface mirror 15.

The image collected by the virtual lens image 1302 is formed on the reflection surface 150 of the curved surface mirror 15. For example, the composite image 1303 generated in advance may be stored in a storage unit (not illustrated). FIG. 5 is an example, and does not limit the patterns of the phase image 1301, the virtual lens image 1302, and the composite image 1303.

The modulated light 103-1 modulated in the first modulation region 131 and the modulated light 103-2 modulated in the second modulation region 132 are separated by the partition wall 135 immediately after being emitted from the modulation part 130. The modulated light 103-1 to 2 can be set in such a way as to be mixed with each other or not to be mixed with each other after being emitted from the modulation part 130. The mixing situation of the modulated light 103-1 to 2 emitted from the modulation part 130 can be set by adjusting the emission direction of light 102 from the light source 11.

The wave plate 14 is disposed between the spatial light modulator 13 and the curved surface mirror 15. In the example of FIG. 2, the wave plate 14 is disposed substantially parallel to the surface of the modulation part 130 by the partition wall 135. For example, the wave plate 14 is achieved by a birefringent element that generates a phase difference between orthogonal polarization components.

For example, the wave plate 14 is a half-wave plate. The half-wave plate has a specific polarization direction. The half-wave plate gives a phase difference of an integral multiple of a ½ wavelength between linearly polarized light in a specific polarization direction and linearly polarized light in a polarization direction orthogonal to the specific polarization direction. When linearly polarized light is emitted from the optical transmission device 10, the wave plate 14 including a half-wave plate is disposed on one optical path of the modulated light 103-1 and the modulated light 103-2. When linearly polarized light is emitted from the optical transmission device 10, the wave plate 14 is not disposed on the other optical path of the modulated light 103-1 and the modulated light 103-2. As a result, the polarization direction of the modulated light 103-1 and the polarization direction of the modulated light 103-2 are orthogonal to each other.

For example, the wave plate 14 is a quarter-wave plate. The quarter-wave plate generates a phase difference of 90 degrees between orthogonal polarization components. The quarter-wave plate converts linearly polarized light into circularly polarized light and converts circularly polarized light into linearly polarized light. In a case where circularly polarized light is emitted from the optical transmission device 10, a wave plate 14 including a quarter-wave plate whose optical axes are orthogonal to each other is disposed on the optical path of each of the modulated light 103-1 and the modulated light 103-2. The wave plate 14 including the quarter-wave plate converts the modulated light 103-1 and the modulated light 103-2, which are linearly polarized light, into circularly polarized light having rotation directions opposite to each other. As a result, the rotation direction of the modulated light 103-1 and the rotation direction of the modulated light 103-2 are opposite to each other.

Figure 6:
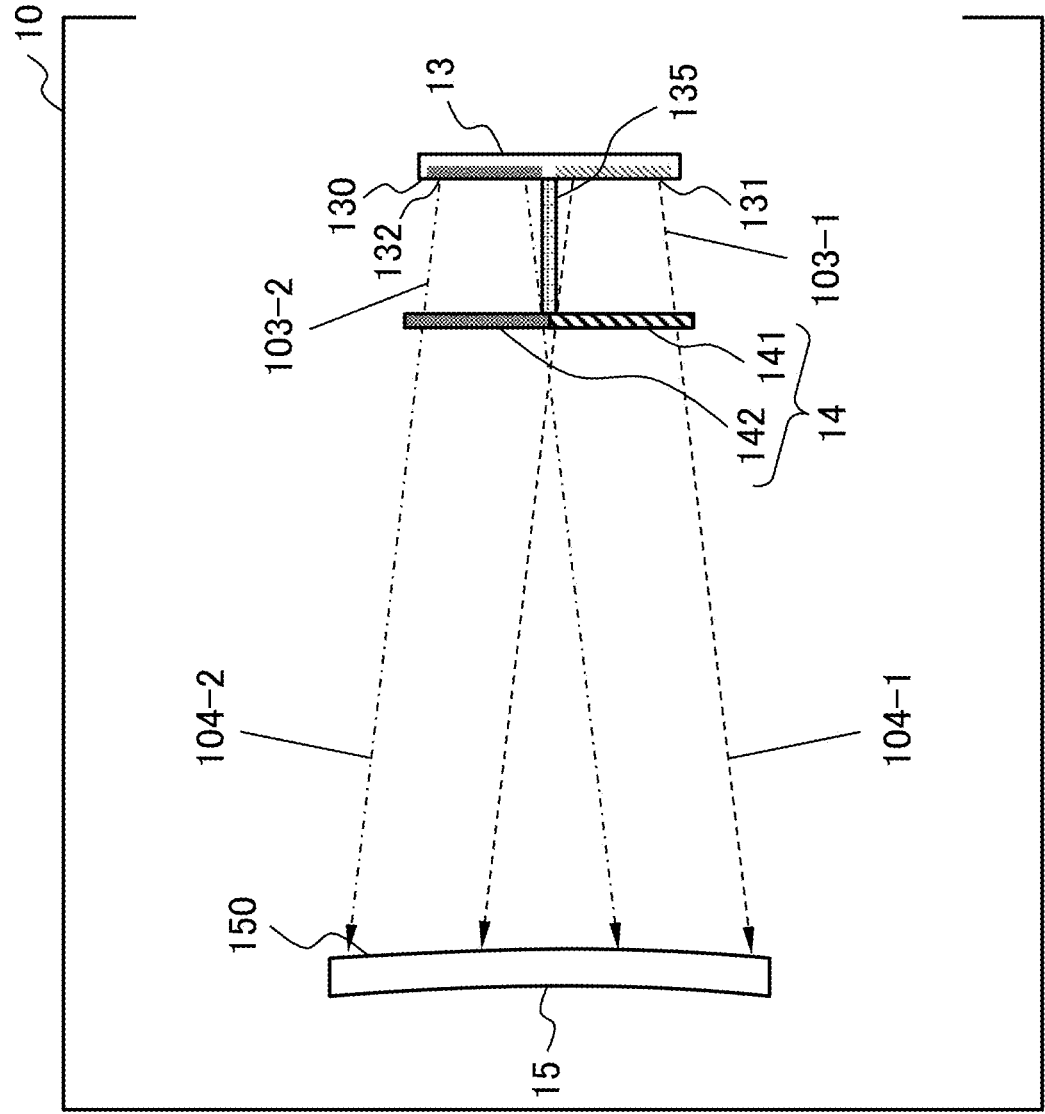
FIG. 6 is a conceptual diagram illustrating another example of the internal configuration of the optical transmission device included in the communication device of the first example embodiment as viewed from an upper viewing seat.

FIG. 6 is a conceptual diagram of an internal configuration of the optical transmission device 10 as viewed from above. In FIG. 6, the light source 11 is omitted. FIG. 6 is conceptual, and does not accurately represent the positional relationship between the components, the traveling direction of light, and the like. The wave plate 14 includes a first wave plate 141 and a second wave plate 142. For example, when a spatial optical signal of linearly polarized light is transmitted from the optical transmission device 10, the first wave plate 141 is a half-wave plate, and the second wave plate 142 is omitted. For example, when a spatial optical signal of circularly polarized light is transmitted from the optical transmission device 10, the first wave plate 141 and the second wave plate 142 include quarter-wave plates whose optical axes are orthogonal to each other.

The first wave plate 141 is disposed in association with the first modulation region 131. The modulated light 103-1 modulated in the first modulation region 131 passes through the first wave plate 141 before reaching the reflection surface 150 of the curved surface mirror 15. When passing through the first wave plate 141, the modulated light 103-1 turns to a polarization state related to the polarization characteristic of the first wave plate 141 (light 104-1). The light 104-1 forms an image related to the phase image set in the first modulation region 131 on the reflection surface 150 of the curved surface mirror 15.

The second wave plate 142 is disposed in association with the second modulation region 132. The modulated light 103-2 modulated in second modulation region 132 passes through the second wave plate 142 before reaching the reflection surface 150 of the curved surface mirror 15. For example, when a spatial optical signal of linearly polarized light is transmitted, the second wave plate 142 is omitted. When passing through the second wave plate 142, the modulated light 103-2 turns to a polarization state related to the polarization characteristic of the second wave plate 142 (light 104-2). When the spatial optical signal of linearly polarized light is transmitted, the polarization state of the light 104-2 is not changed, and thus, the polarization states of the modulated light 103-2 and the light 104-2 are the same. The light 104-2 forms an image related to the phase image set in the second modulation region 132 on the reflection surface 150 of the curved surface mirror 15.

The modulated light 103-1 having passed through the first wave plate 141 and the modulated light 103-2 having passed through the second wave plate 142 turn to different polarization states. That is, the modulated light 103-1 to 2 having passed through the wave plate 14 turn the light 104-1 to 2 in different polarization states.

For example, when linearly polarized light is transmitted from the optical transmission device 10, the first wave plate 141 is a half-wave plate. The polarization direction of the modulated light 103-1 passing through the first wave plate 141 is rotated by 90 degrees. The modulated light 103-2 passing through the second wave plate 142 travels in the same polarization direction. For example, nothing is installed on the second wave plate 142. For example, an element made of a transparent glass or plastic material that does not affect the polarization state may be disposed on the second wave plate 142. The polarization direction of the light 104-1 having passed through the first wave plate 141 and the polarization direction of the light 104-2 having passed through the second wave plate 142 are orthogonal to each other. Therefore, the spatial optical signal derived from the light 104-1 passing through the first wave plate 141 and the spatial optical signal derived from the light 104-2 passing through the second wave plate 142 can be separated from each other.

For example, when circularly polarized light is transmitted from the optical transmission device 10, quarter-wave plates whose optical axes are orthogonal to each other are used as the first wave plate 141 and the second wave plate 142. The light 104-1 having passed through the first wave plate 141 and the light 104-2 having passed through the second wave plate 142 are converted into circularly polarized light having opposite rotation directions. Therefore, the spatial optical signal derived from the light 104-1 passing through the first wave plate 141 and the spatial optical signal derived from the light 104-2 passing through the second wave plate 142 can be separated on the reception side of the spatial optical signal.

The curved surface mirror 15 is a reflecting mirror having the curved reflection surface 150. The reflection surface 150 of the curved surface mirror 15 has a curvature in accordance with the projection angle of the projection light 105. In the example of FIG. 2, the reflection surface 150 of the curved surface mirror 15 has a shape of a side face of a cylinder. For example, the reflection surface 150 of the curved surface mirror 15 may be a spherical surface. For example, the reflection surface 150 of the curved surface mirror 15 may be a free-form surface. For example, the reflection surface 150 of the curved surface mirror 15 may have a shape in which a plurality of curved surfaces is combined instead of a single curved surface. For example, the reflection surface 150 of the curved surface mirror 15 may have a shape in which a curved surface and a flat face are combined.

The curved surface mirror 15 is disposed on an optical path of the modulated light 103 with the reflection surface 150 facing the modulation part 130 of the spatial light modulator 13. The reflection surface 150 of the curved surface mirror 15 is irradiated with the light 104 that has passed through the wave plate 14 in the modulated light 103 modulated by the modulation part 130 of the spatial light modulator 13. Light 104 includes the light 104-1 and the light 104-2. The light 104-1 is light that has passed through the first wave plate 141 in the modulated light 103-1 modulated by the first modulation region 131 of the modulation part 130 of the spatial light modulator 13. The light 104-2 is light that has passed through the second wave plate 142 of the modulated light 103-2 modulated by the second modulation region 132 of the modulation part 130 of the spatial light modulator 13. At least one of the light 104-1 and the light 104-2 passes through the wave plate 14, whereby the polarization state is converted. That is, light 104-1 and light 104-2 have different polarization states.

Figure 7:
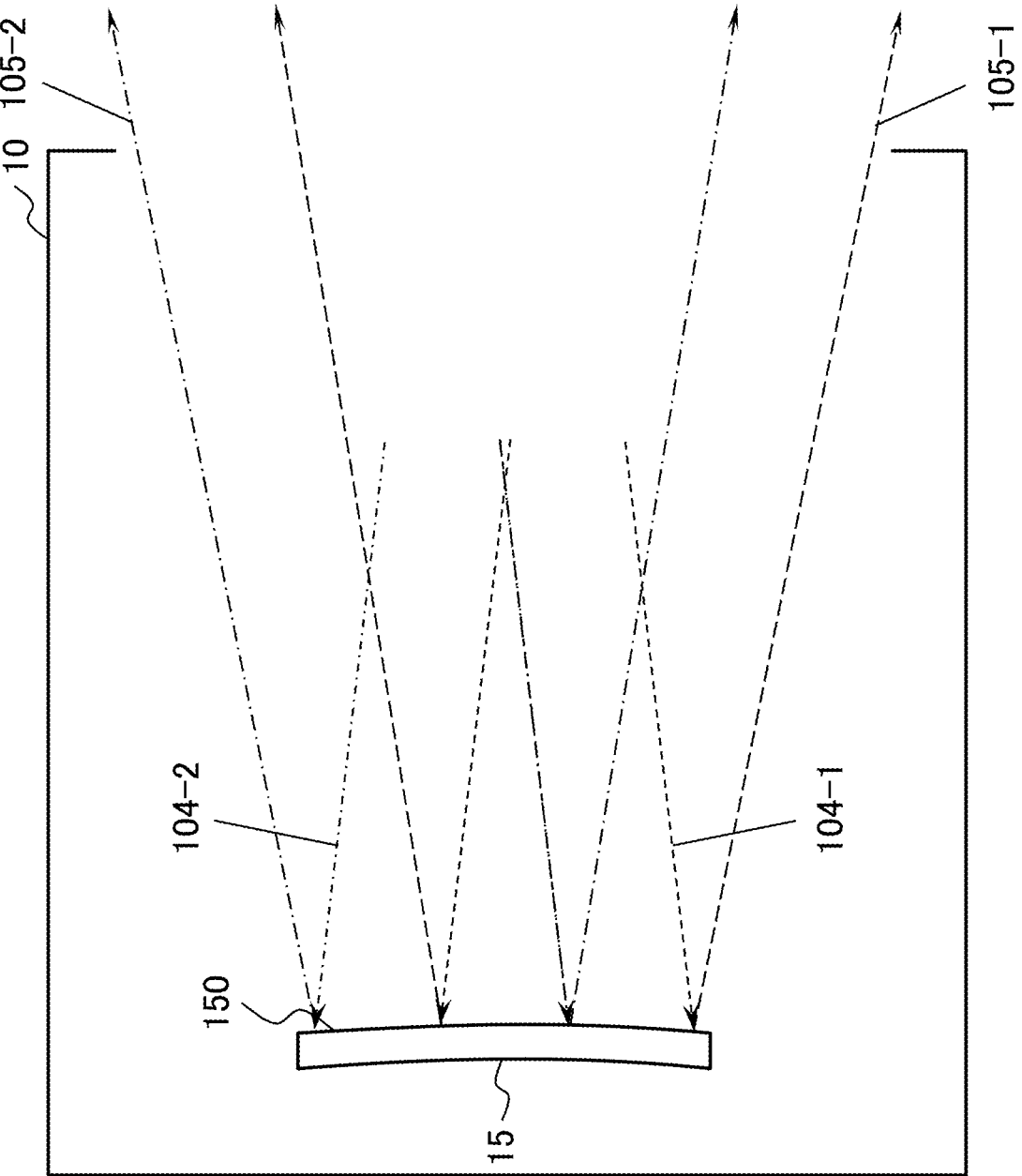
FIG. 7 is a conceptual diagram for describing projection light projected from the optical transmission device included in the communication device of the first example embodiment.

The light (projection light 105) reflected by the reflection surface 150 of the curved surface mirror 15 is enlarged and projected at an enlargement ratio in accordance with the curvature of the reflection surface 150. FIG. 7 is a conceptual diagram illustrating an example of projection of the projection light 105 reflected by the reflection surface 150. FIG. 7 is conceptual, and does not accurately represent a traveling direction of light or the like. The projection light 105 is enlarged along the horizontal direction (the vertical direction of the sheet of FIG. 7) according to the curvature of the irradiation range of light 104 on the reflection surface 150 of the curved surface mirror 15. The reflection surface 150 is irradiated with each of the light 104-1 to 2 constituting the light 104. Each of the light 104-1 to 2 is individually reflected by the reflection surface 150. The light 104-1 is reflected by the reflection surface 150 and projected as the projection light 105-1. The light 104-2 is reflected by the reflection surface 150 and projected as the projection light 105-2. Each of the light 104-1 to 2 is projected as each of the projection light 105-1 to 2 at a projection angle in accordance with the curvature of the reflection surface 150. In the example of FIG. 7, the projection ranges of the projection light 105-1 to 2 overlap with each other, but the polarization states of the projection light 105-1 to 2 are different, so that the projection light 105-1 to 2 can be separated on the light receiving side of the spatial optical signal.

For example, a shielder (not illustrated) or a 0th-order light remover (not illustrated) may be disposed on the optical paths of the modulated light 103, the light 104, and the projection light 105.

For example, the shielder is disposed between the wave plate 14 and the curved surface mirror 15. In other words, the shielder is disposed on the optical path of the light 104 that has passed through the wave plate 14 in the modulated light 103 modulated by the modulation part 130 of the spatial light modulator 13. The shielder is an aperture in which a slit-shaped opening is formed in a portion transmitting light forming a desired image. For example, the shielder is a frame that shields unnecessary light components included in the light 104 and defines an outer edge of a display area of the projection light 105. The shielder transmits light that forms a desired image and shields unwanted light components. For example, the shielder shields 0th-order light or a ghost image included in the light 104.

For example, the 0th-order light remover includes a light absorbing element supported by an element that supports the light absorbing element. The light absorbing element is fixed on the optical path of the 0th-order light included in the modulated light 103, the light 104, and the projection light 105 by the support element. For example, the support element is made of a material that transmits the light 104, such as glass or plastic. For example, a black body such as carbon is used for the light absorbing element. When the wavelength of the laser light 101 to be used is fixed, it is preferable to use a light absorbing element made of a material that selectively absorbs light having the wavelength of the laser light 101.

[Light-Receiving Device]

Figure 8:
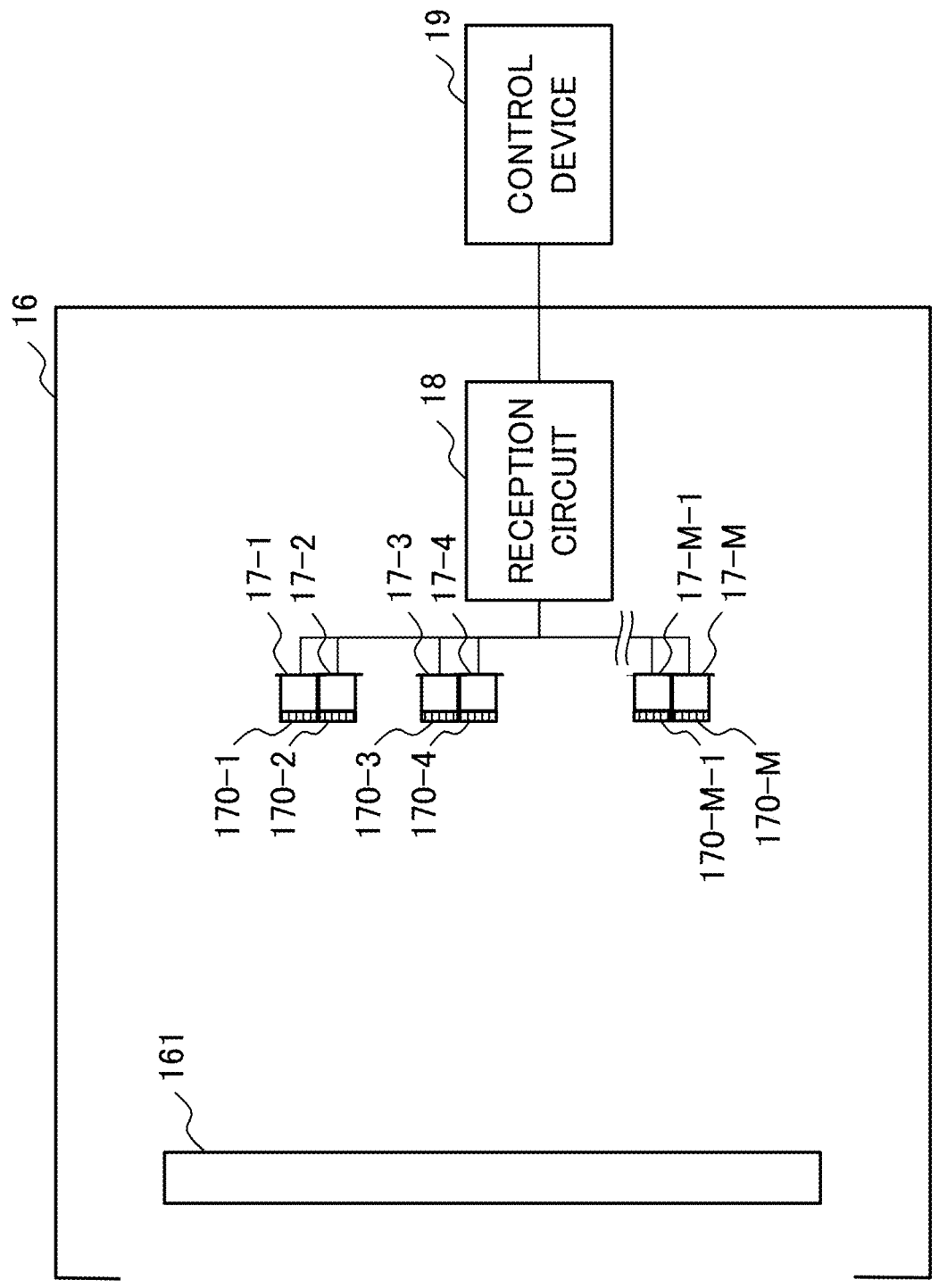
FIG. 8 is a conceptual diagram illustrating an example of a configuration of a light-receiving device included in the communication device according to the first example embodiment.

Next, a configuration of the light-receiving device 16 will be described with reference to the drawings. FIG. 8 is a conceptual diagram for describing a configuration of the light-receiving device 16. The light-receiving device 16 includes a concentrator 161, a plurality of light receiving elements 17-1 to M, a plurality of light receiving filters 170-1 to M, and a reception circuit 18 (M is a natural number of equal to or more than two). The plurality of light receiving elements 17-1 to M is disposed in such a way that two light receiving elements 17 form a pair. The pair of two light receiving elements 17 is disposed adjacent to each other. The pair of two light receiving elements 17 receives polarization-multiplexed optical signals transmitted from the same transmission source. FIG. 8 is a plan view of the internal configuration of the light-receiving device 16 when viewed from above. The position of the reception circuit 18 is not particularly limited. The reception circuit 18 may be disposed inside the light-receiving device 16 or may be disposed outside the light-receiving device 16. The control device 19 may include the function of the reception circuit 18.

The concentrator 161 is an optical element that collects a spatial optical signal arriving from the outside. The spatial optical signal is incident on the incident surface of the concentrator 161. The optical signal collected by the concentrator 161 is collected toward a region where the plurality of light receiving elements 17-1 to M is disposed. For example, the concentrator 161 is a lens that collects an incident spatial optical signal. For example, the concentrator 161 is a light beam control element that guides the incident spatial optical signal toward the light receiving units of the plurality of light receiving elements 17-1 to M. For example, the concentrator 161 may have a configuration in which a lens and a light beam control element are combined. The configuration of the concentrator 161 is not particularly limited as long as the spatial optical signal can be collected toward the region where the plurality of light receiving elements 17-1 to M is disposed. For example, a mechanism for guiding the optical signal collected by the concentrator 161 toward the light receiving units of the plurality of light receiving elements 17-1 to M may be added.

Figure 9:
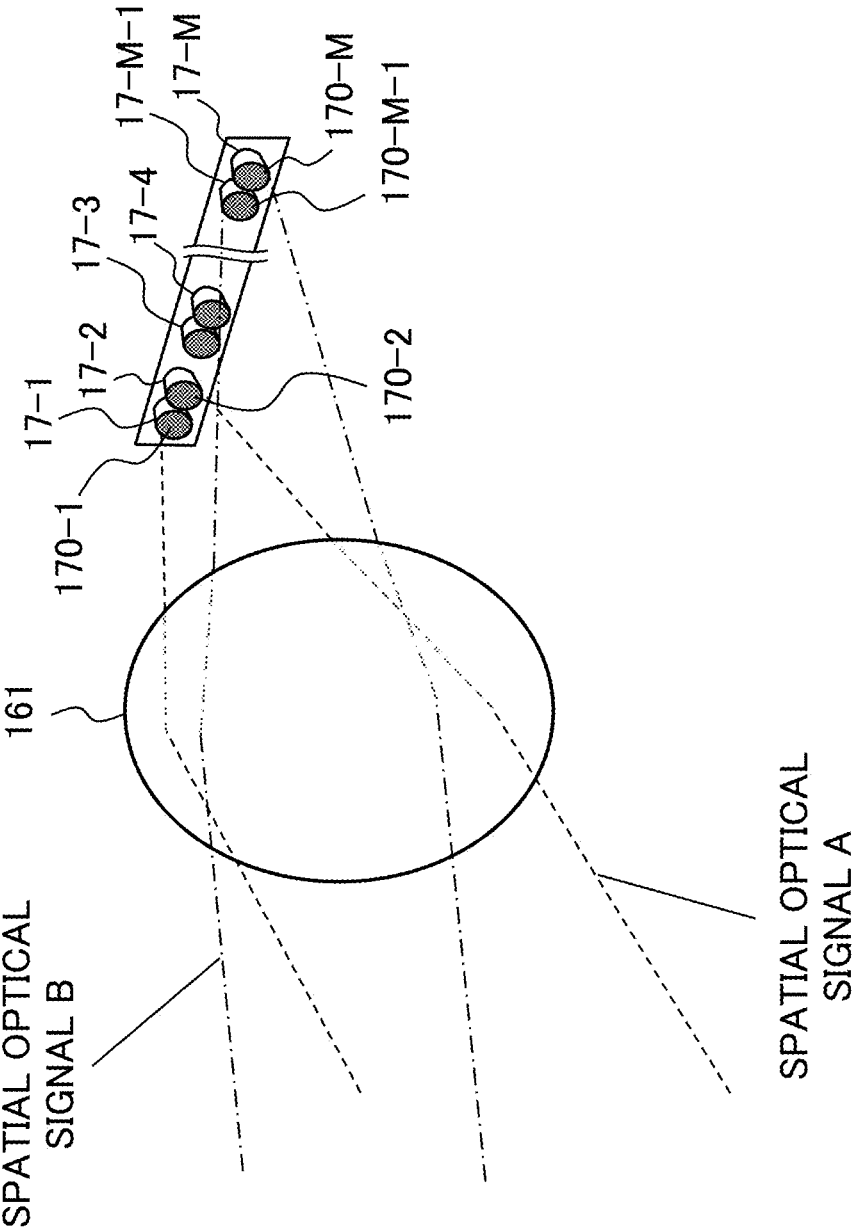
FIG. 9 is a conceptual diagram illustrating an example of reception of a spatial optical signal by the light-receiving device included in the communication device according to the first example embodiment.

FIG. 9 is a conceptual diagram for describing an example of a trace of light received by the light-receiving device 16. FIG. 9 is a perspective view of the internal configuration of the light-receiving device 16 when viewed obliquely from the front. FIG. 9 illustrates an example in which a plurality of light receiving elements is disposed in a line. The plurality of light receiving elements can be disposed in an any array in accordance with the incoming direction of the spatial optical signal. In the example of FIG. 9, a spatial optical signal A and a spatial optical signal B arriving from different directions are incident on the concentrator 161. The optical signals derived from the spatial optical signal A and the spatial optical signal B are collected by the concentrator 161 and are collected toward the region where the plurality of light receiving elements 17-1 to M is arranged. The optical signal collected by the concentrator 161 travels toward the pair of adjacent light receiving elements 17. The pair of light receiving elements 17 receives polarization-multiplexed optical signals transmitted from the same transmission source. In the example of FIG. 9, the optical signal derived from the spatial optical signal A travels toward the light receiving elements 17-1 to 2, and the optical signal derived from the spatial optical signal B travels toward the light receiving elements 17-M−1 to M. The optical signals derived from the spatial optical signal A and the spatial optical signal B reach the light receiving filters 170 disposed in association with the pair of two light receiving elements 17.

Each of the plurality of light receiving filters 170-1 to M is disposed before the plurality of light receiving elements 17-1 to M. The plurality of light receiving filters 170-1 to M is arranged in association with the light receiving units of the plurality of light receiving elements 17-1 to M, respectively. For example, each of the plurality of light receiving filters 170-1 to M is disposed to overlap the light receiving units of the plurality of light receiving elements 17-1 to M. The light receiving filters 170-1 to M are selected according to the polarization state of the spatial optical signal to be received. Among the optical signals reaching any one of the plurality of light receiving filters 170-1 to M, the optical signal in the polarization direction of the light receiving filter 170 passes through the light receiving filter 170. For example, when the spatial optical signal to be received is linearly polarized light, the light receiving filter 170 includes a polarizing plate. In the case of linearly polarized light, the polarization directions of the two light receiving filters 170 associated with the pair of two light receiving elements 17 are orthogonal to each other. Each of the two light receiving filters 170 associated with the pair of two light receiving elements 17 transmits an optical signal derived from a spatial optical signal having polarization directions opposite to each other. For example, when the spatial optical signal to be received is circularly polarized light, the light receiving filter 170 includes a quarter-wave plate. In the case of circularly polarized light, the two light receiving filters 170 associated with the pair of two light receiving elements 17 includes quarter-wave plates whose optical axes are orthogonal to each other. The two light receiving filters 170 including the quarter-wave plates whose optical axes are orthogonal to each other transmit optical signals derived from spatial optical signals whose rotation directions are opposite to each other.

Figure 10:
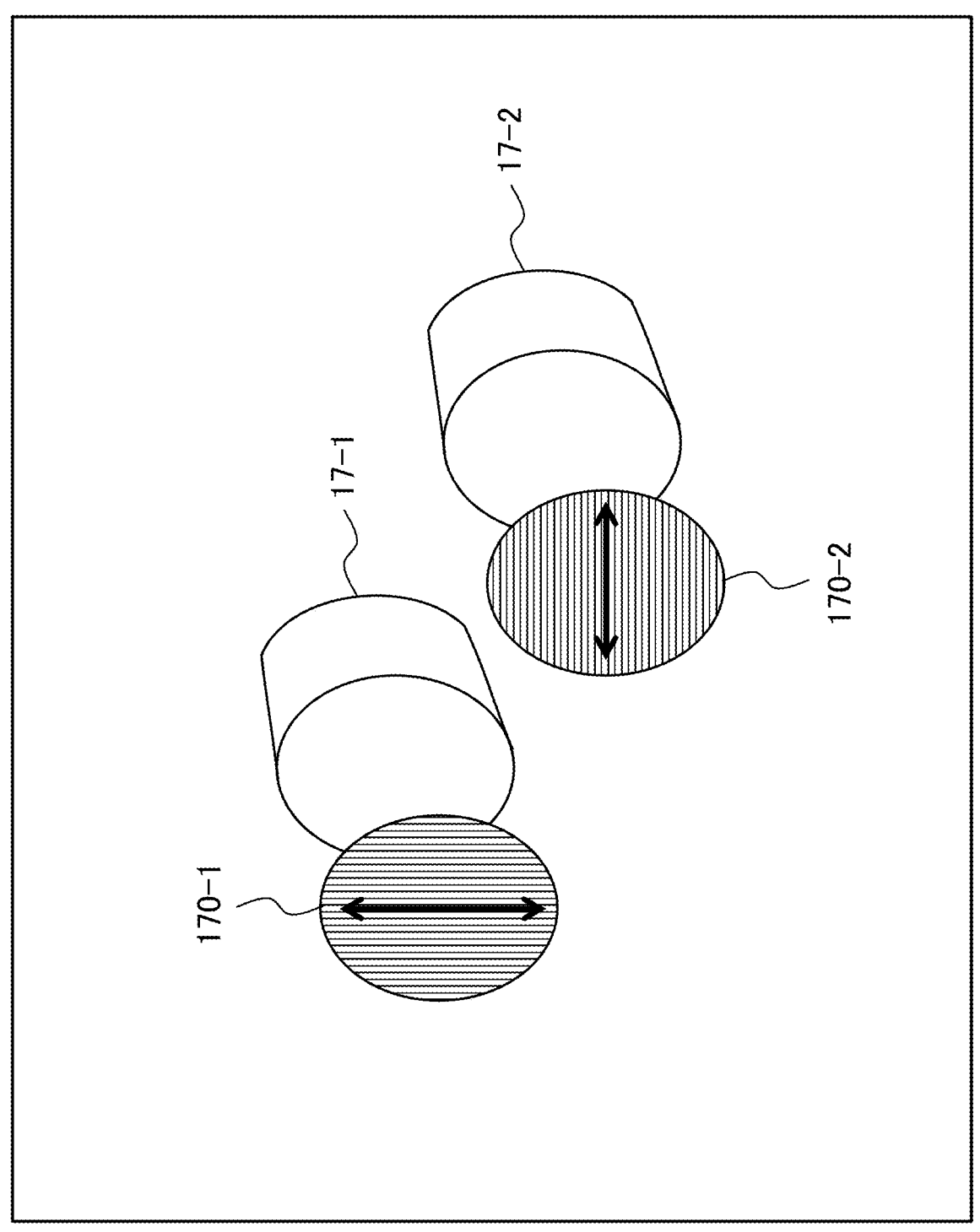
FIG. 10 is a conceptual diagram for describing an example of a filter associated with a light receiving element of the light-receiving device included in the communication device according to the first example embodiment.

FIG. 10 is a conceptual diagram for describing an example of the light receiving filter 170 used in a case where the spatial optical signal to be received is linearly polarized light. In FIG. 10, two light receiving filters 170-1 to 2 associated with pair of two light receiving elements 17-1 to 2, respectively, will be described as an example. In the example of FIG. 10, the two light receiving elements 17-1 to 2 are disposed at intervals, but are actually disposed adjacent to each other.

The polarization direction of the optical signal to be received by the light receiving element 17-1 is the vertical direction in the sheet of FIG. 10. The light receiving filter 170-1 associated with the light receiving element 17-1 includes a polarizing plate having a polarization direction of the vertical direction in the sheet of FIG. 10. The light receiving filter 170-1 associated with the light receiving element 17-1 transmits the optical signal in the polarization direction in the vertical direction on the sheet of FIG. 10. The optical signal having passed through the light receiving filter 170-1 is received by a light receiving element 17-1.

The polarization direction of the optical signal to be received by the light receiving element 17-2 is the left-right direction with respect to the sheet of FIG. 10. The light receiving filter 170-2 associated with the light receiving element 17-2 includes a polarizing plate having a polarization direction of the left-right direction in the sheet of FIG. 10. The light receiving filter 170-2 associated with the light receiving element 17-2 transmits the optical signal in the polarization direction in the left-right direction on the sheet of FIG. 10. The optical signal having passed through the light receiving filter 170-2 is received by a light receiving element 17-2. The polarization directions of the light receiving filter 170-2 and the light receiving filter 170-1 are orthogonal to each other. That is, the light receiving element 17-1 and the light receiving element 17-2 receive polarization-multiplexed optical signals whose polarization directions are orthogonal to each other and which are derived from spatial optical signals transmitted from the same transmission source.

Figure 11:
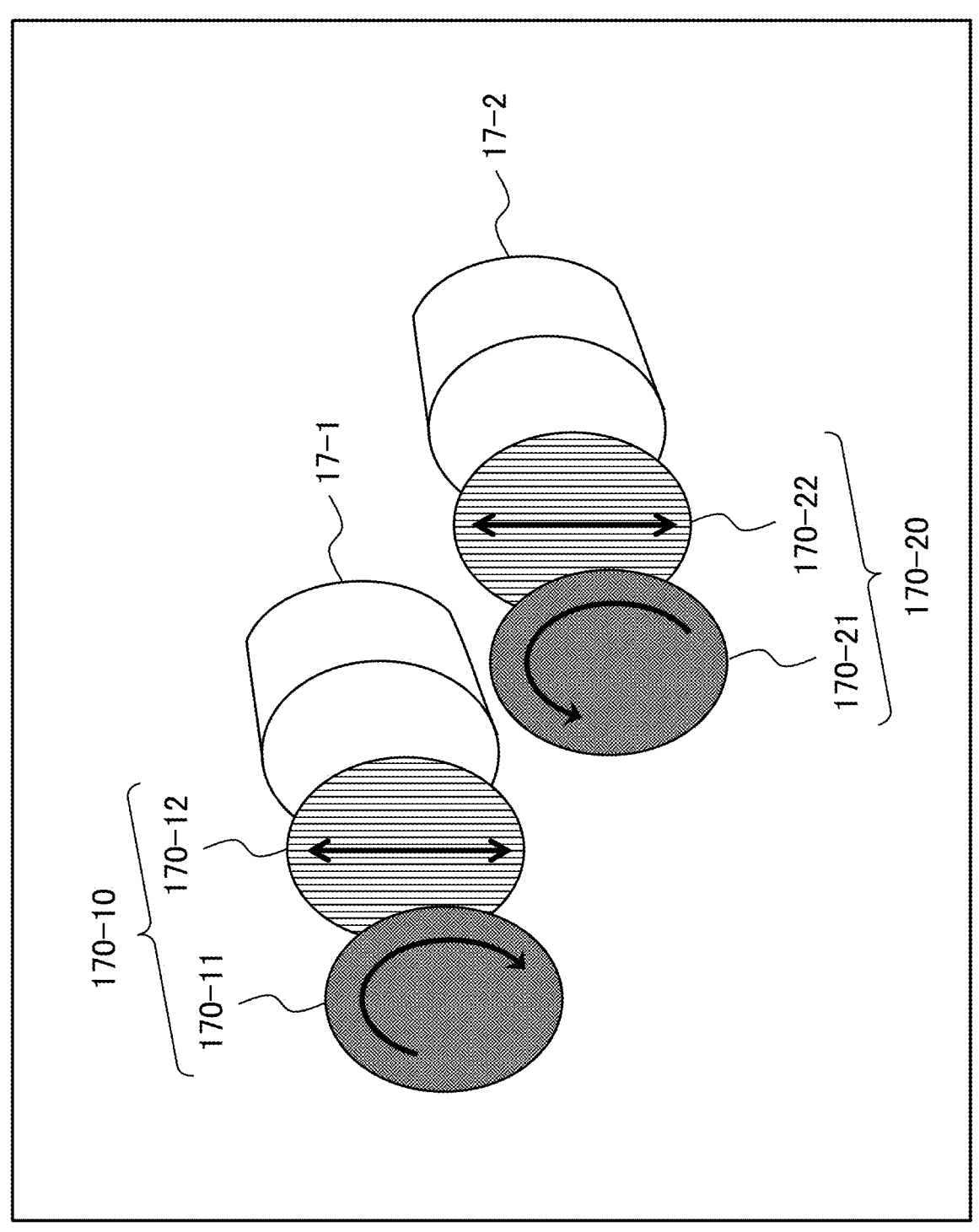
FIG. 11 is a conceptual diagram for describing another example of a filter associated with the light receiving element of the light-receiving device included in the communication device according to the first example embodiment.

FIG. 11 is a conceptual diagram for describing an example of the light receiving filter 170 used in a case where the spatial optical signal to be received is circularly polarized light. In FIG. 11, a light receiving filter 170-10 and a light receiving filter 170-20 associated with the pair of two light receiving elements 17-1 to 2, respectively, will be described as an example. In the example of FIG. 11, the two light receiving elements 17-1 to 2 are disposed at intervals, but are actually disposed adjacent to each other.

The polarization direction of the optical signal to be received by the light receiving element 17-1 is clockwise in the sheet of FIG. 11. The light receiving filter 170-10 associated with the light receiving element 17-1 includes a wave plate 170-11 and a polarizing plate 170-12. The wave plate 170-11 converts an optical signal of incident clockwise circularly polarized light into linearly polarized light. Of the linearly polarized light converted by the wave plate 170-11, the polarizing plate 170-12 transmits linearly polarized light in the polarization direction in the vertical direction on the sheet of FIG. 10. The optical signal of the polarization component having passed through the light receiving filter 170-10 is received by the light receiving element 17-1.

The polarization direction of the optical signal to be received by the light receiving element 17-2 is counterclockwise in the sheet of FIG. 11. The light receiving filter 170-20 associated with the light receiving element 17-2 includes a filter 170-21 and a filter 170-22. The filter 170-21 converts the optical signal of incident counterclockwise circularly polarized light into linearly polarized light. Of the linearly polarized light converted by the filter 170-21, the filter 170-22 transmits linearly polarized light in the polarization direction in the vertical direction in the sheet of FIG. 10. The optical signal of the polarization component having passed through the light receiving filter 170-20 is received by the light receiving element 17-2. That is, the light receiving element 17-1 and the light receiving element 17-2 receive an optical signal that is derived from a spatial optical signal transmitted from the same transmission source and is polarization-multiplexed as circularly polarized light having polarization directions opposite to each other.

The plurality of light receiving elements 17-1 to M is arranged after the plurality of light receiving filters 170-1 to M, respectively. The plurality of light receiving elements 17-1 to M is disposed in such a way that two light receiving elements 17 form a pair. In the case of FIG. 8, the light receiving element 17-1 and the light receiving element 17-2 form a pair, the light receiving element 17-3 and the light receiving element 17-4 form a pair, and the light receiving element 17-M–1 and the light receiving element 17-M form a pair. The pair of two light receiving elements 17 is disposed adjacent to each other. The plurality of light receiving elements 17-1 to M includes light receiving units that receives the optical signals having passed through the plurality of light receiving filters 170-1 to M, respectively. A light receiving filter 170 is installed in the light receiving unit of each of the plurality of light receiving elements 17-1 to M. The light receiving filters 170 having different polarization states are installed in the pair of two light receiving elements 17. The plurality of light receiving elements 17-1 to M is arranged so that the light emitting surface of the concentrator 161 and the light receiving unit face each other via each of the plurality of light receiving filters 170-1 to M. The light receiving units of the plurality of light receiving elements 17-1 to M are arranged to face the plurality of light receiving filters 170-1 to M, respectively. The optical signals having passed through the plurality of light receiving filters 170-1 to M are received by the light receiving units of the plurality of light receiving elements 17-1 to M, respectively. The pair of two light receiving elements 17 receive optical signals having passed through the light receiving filters 170 having different polarization states. Each of the plurality of light receiving elements 17-1 to M converts the received optical signal into an electric signal (hereinafter, also referred to as a signal). Each of the plurality of light receiving elements 17-1 to M outputs the converted signal to the reception circuit 18. For example, the pair of two light receiving elements 17 among the plurality of light receiving elements 17-1 to M is connected to the reception circuit 18. For example, each of the plurality of light receiving elements 17-1 to M is individually connected to the reception circuit 18. For example, a group of some of the plurality of light receiving elements 17-1 to M may be connected to the reception circuit 18.

The light receiving element 17 receives light in a wavelength region of the spatial optical signal to be received. For example, the light receiving element 17 has sensitivity to light in the visible region. For example, the light receiving element 17 has sensitivity to light in an infrared region. The light receiving element 17 is sensitive to light having a wavelength in a 1.5 μm (micrometer) band, for example. The wavelength band of light to which the light receiving element 17 has sensitivity is not limited to the 1.5 μm band. The wavelength band of the light received by the light receiving element 17 can be set in any manner in accordance with the wavelength of the spatial optical signal to be received. The wavelength band of the light received by the light receiving element 17 may be set to, for example, a 0.8 μm band, a 1.55 μm band, or a 2.2 μm band. The wavelength band of the light received by the light receiving element 17 may be, for example, a band of 0.8 to 1 μm. A shorter wavelength band is advantageous for optical spatial communication during rainfall because absorption by moisture in the atmosphere is small. When the light receiving element 17 is saturated with intense sunlight, the light receiving element cannot read the optical signal derived from the spatial optical signal. Therefore, a color filter that selectively transmits the light in the wavelength band of the spatial optical signal may be installed at the preceding stage of the light receiving element 17.

For example, the light receiving element 17 can be achieved by an element such as a photodiode or a phototransistor. For example, the light receiving element 17 is achieved by an avalanche photodiode. The light receiving element 17 achieved by the avalanche photodiode can support high speed communication. The light receiving element 17 may be achieved by an element other than a photodiode, a phototransistor, or an avalanche photodiode as long as an optical signal can be converted into an electrical signal. In order to improve the communication speed, the light receiving unit of the light receiving element 17 is preferably as small as possible. For example, the light receiving unit of the light receiving element 17 has a square light receiving face having a side of about 5 mm (mm). For example, the light receiving unit of the light receiving element 17 has a circular light receiving face having a diameter of about 0.1 to 0.3 mm. The size and shape of the light receiving unit of the light receiving element 17 may be selected according to the wavelength band, the communication speed, and the like of the spatial optical signal.

The reception circuit 18 acquires a signal output from each of the plurality of light receiving elements 17-1 to M. The reception circuit 18 amplifies a signal from each of the plurality of light receiving elements 17-1 to M. The reception circuit 18 decodes the amplified signal and analyzes a signal from the communication target. For example, the reception circuit 18 analyzes a signal for the pair of two light receiving elements 17 among the plurality of light receiving elements 17-1 to M. For example, the reception circuit 18 collectively analyzes the signals of the plurality of light receiving elements 17-1 to M. In a case where the signals of the plurality of light receiving elements 17-1 to M are collectively analyzed, it is possible to achieve the single-channel light-receiving device 16 that communicates with a single communication target. For example, the reception circuit 18 individually analyzes a signal for each of the plurality of light receiving elements 17-1 to M. In a case where the signal is individually analyzed for each of the plurality of light receiving elements 17-1 to M, it is possible to achieve the multi-channel light-receiving device 16 that simultaneously communicates with a plurality of communication targets. The signal decoded by the reception circuit 18 is used for any purpose. The use of the signal decoded by the reception circuit 18 is not particularly limited.

[Reception Circuit]

Figure 12:
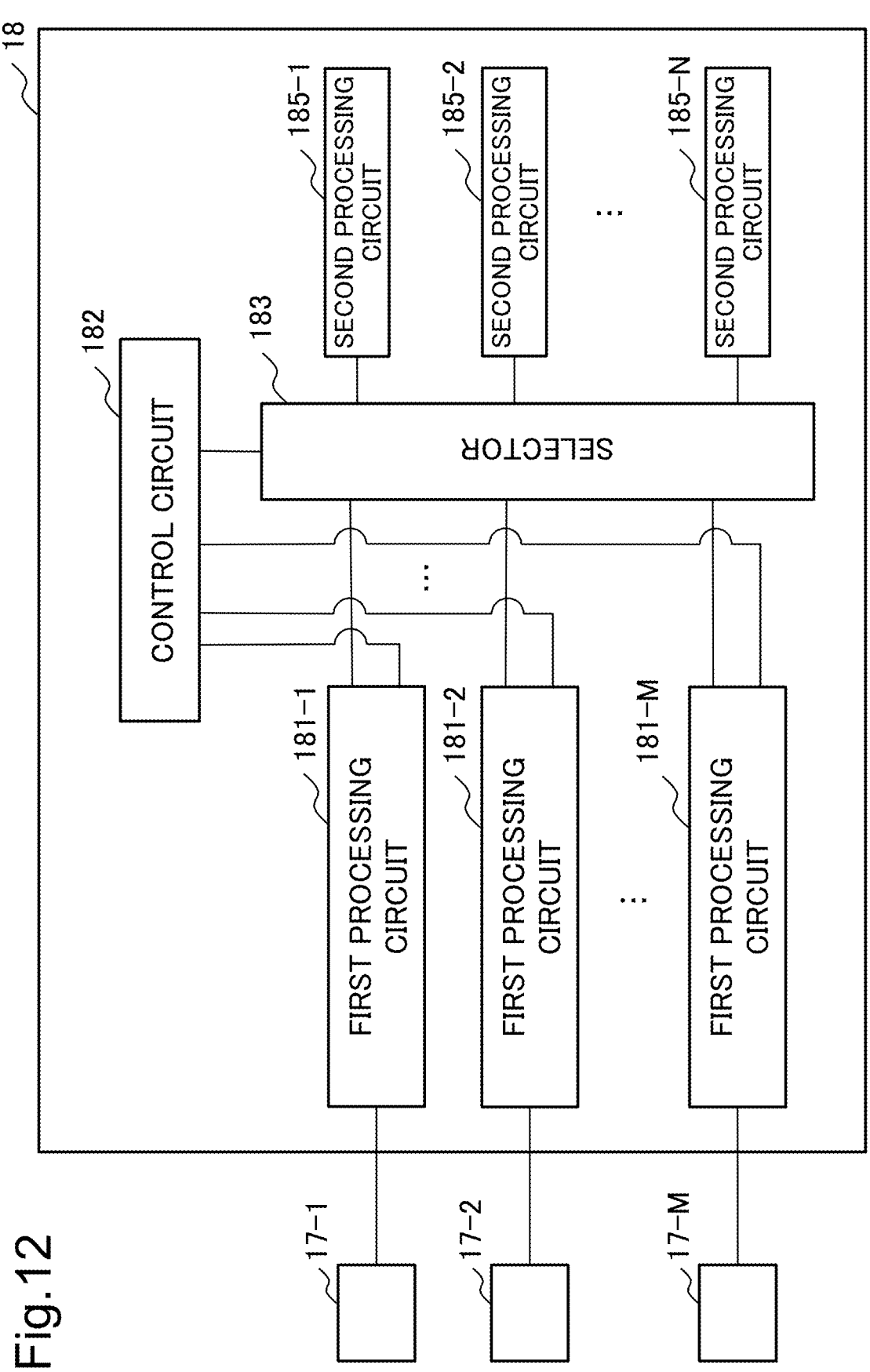
FIG. 12 is a block diagram illustrating an example of a configuration of a reception circuit of the light-receiving device included in the communication device according to the first example embodiment.

Next, an example of a detailed configuration of the reception circuit 18 included in the light-receiving device 16 will be described with reference to the drawings. FIG. 12 is a block diagram illustrating an example of a configuration of the reception circuit 18. In the example of FIG. 12, the number of light receiving elements 17 is M (M is a natural number). FIG. 12 is an example of the configuration of the reception circuit 18, and does not limit the configuration of the reception circuit 18.

The reception circuit 18 includes a plurality of first processing circuits 181-1 to M, a control circuit 182, a selector 183, and a plurality of second processing circuits 185-1 to N (M and N are natural numbers.). The first processing circuit 181 is associated with any one of the plurality of light receiving elements 17-1 to M. The first processing circuit 181 may be configured for each group of the plurality of light receiving elements 17 included in the plurality of light receiving elements 17-1 to M.

For example, the first processing circuit 181 includes a high-pass filter (not illustrated). The high-pass filter acquires a signal from the light receiving element 17. The high-pass filter selectively transmits a signal of a high frequency component related to the wavelength band of the spatial optical signal among the acquired signals. The high-pass filter cuts off a signal derived from ambient light such as sunlight. For example, instead of the high-pass filter, a band-pass filter that selectively transmits a signal in a wavelength band of a spatial optical signal may be configured. When the light receiving element 17 is saturated with intense sunlight, an optical signal cannot be read. Therefore, a color filter that selectively transmits the light in the wavelength band of the spatial optical signal may be installed before the light receiving unit of the light receiving element 17.

For example, the first processing circuit 181 includes an amplifier (not illustrated). The amplifier acquires the signal output from the high-pass filter. The amplifier amplifies the acquired signal. The amplification factor of the signal by the amplifier is not particularly limited.

For example, the first processing circuit 181 includes an output monitor (not illustrated). The output monitor monitors an output value of the amplifier. The output monitor outputs a signal exceeding a predetermined output value among the signals amplified by the amplifier to the selector 183. Among the signals input to the selector 183, the signal to be received is allocated to any one of the plurality of second processing circuits 185-1 to N under the control of the control circuit 182. The signal to be received is a spatial optical signal from a communication device (not illustrated) to be communicated. A signal from the light receiving element 17 that is not used for receiving the spatial optical signal is not output to the second processing circuit 185.

For example, the first processing circuit 181 may include an integrator (not illustrated) as an output monitor (not illustrated). The integrator acquires the signal output from the high-pass filter. The integrator integrates the acquired signal. The integrator outputs the integrated signal to the control circuit 182. The integrator is disposed to measure the intensity of the spatial optical signal received by the light receiving element 17. Since the intensity of the spatial optical signal received in a state where the beam diameter is not narrowed is weaker than that of the signal in a state where the beam diameter is narrowed, it is difficult to measure the voltage of the signal amplified only by the amplifier. By using an integrator, for example, by integrating a signal in a period of several milliseconds to several tens of milliseconds, the voltage of the signal can be increased to a level at which the voltage can be measured.

The control circuit 182 acquires a signal output from each of the plurality of first processing circuits 181-1 to M. In other words, the control circuit 182 acquires a signal derived from an optical signal received by each of the plurality of light receiving elements 17-1 to M. For example, the control circuit 182 compares the readings of the signals from the plurality of light receiving elements 17 adjacent to each other. The control circuit 182 selects the light receiving element 17 having the maximum signal intensity according to the comparison result. The control circuit 182 controls the selector 183 in such a way as to allocate the signal derived from the selected light receiving element 17 to any one of the plurality of second processing circuits 185-1 to N. For example, the control circuit 182 controls the selector 183 in such a way that signals from the pair of two light receiving elements 17 are distributed to the same second processing circuit 185.

In a case where the position of the communication target is identified in advance, the processing of estimating the incoming direction of the spatial optical signal is not performed, and the signals output from the light receiving elements 17-1 to M may be output to any of the preset second processing circuits 185. On the other hand, when the position of the communication target is not specified in advance, the second processing circuit 185 as an output destination of the signals output from the light receiving elements 17-1 to M may be selected. For example, when the control circuit 182 selects the light receiving element 17, the incoming direction of the spatial optical signal can be estimated. That is, the control circuit 182 selecting the light receiving element 17 corresponds to identifying the communication device as the transmission source of the spatial optical signal. Allocating the signal from the light receiving element 17 selected by the control circuit 182 to any one of the plurality of second processing circuits corresponds to associating the identified communication target with the light receiving element 17 that receives the spatial optical signal from the communication target. That is, the control circuit 182 can identify the communication device as the transmission source of the optical signal (spatial optical signal) based on the optical signal received by each of the plurality of light receiving elements 17-1 to M.

The signal amplified by the amplifier included in each of the plurality of first processing circuits 181-1 to M is input to the selector 183. The selector 183 outputs a signal to be received among the input signals to any one of the plurality of second processing circuits 185-1 to N under the control of the control circuit 182. A signal that is not to be received is not output from the selector 183.

A signal from any one of the plurality of light receiving elements 17-1 to N allocated by the control circuit 182 is input to any of the plurality of second processing circuits 185-1 to N. For example, signals from the pair of two light receiving elements 17 are input to each of the plurality of second processing circuits 185-1 to N. Each of the plurality of second processing circuits 185-1 to N decodes the input signal. Each of the plurality of second processing circuits 185-1 to N may be configured to apply some signal process to the decoded signal. Each of the plurality of second processing circuits 185-1 to N may be configured to output to an external signal processing device or the like (not illustrated).

When the selector 183 selects a signal derived from the light receiving element 17 selected by the control circuit 182, one second processing circuit 185 is allocated to one communication target. That is, the control circuit 182 allocates a signal derived from the polarization-multiplexed spatial optical signal from the plurality of communication targets received by the plurality of light receiving elements 17-1 to M to one of the plurality of second processing circuits 185-1 to N. As a result, the light-receiving device 16 can simultaneously read the signals derived from the polarization-multiplexed spatial optical signals from the plurality of communication targets on the individual channels. For example, in order to simultaneously communicate with a plurality of communication targets, spatial optical signals from the plurality of communication targets may be read in time division on a single channel. In the method of the present example embodiment, since spatial optical signals from a plurality of communication targets are simultaneously read in a plurality of channels, a transmission speed is faster than that in a case where a single channel is used.

For example, a configuration may be employed in which the incoming direction of the spatial optical signal is identified by the primary scan with coarse accuracy, and the secondary scan with fine accuracy is performed with respect to the identified direction to identify the accurate position of the communication target. When communication with the communication target is possible, an accurate position of the communication target can be determined by exchanging signals with the communication target. When the position of the communication target is identified in advance, the process of identifying the position of the communication target can be omitted.

[Control Device]

The control device 19 controls the light source 11 and the spatial light modulator 13. For example, the control device 19 is achieved by a microcomputer including a processor and a memory. The control device 19 sets the phase image related to the projected image in the modulation part 130 in accordance with the aspect ratio of the tiling set in the modulation part 130 of the spatial light modulator 13. For example, the control device 19 sets, in the modulation part 130, a phase image related to an image according to a use such as image display, communication, or distance measurement. The phase image of the projected image may be stored in advance in a storage unit (not illustrated). The shape and the size of the image to be projected are not particularly limited.

The control device 19 sets a pattern (phase image) related to the image formed by the projection light 105 in the modulation part 130 of the spatial light modulator 13. The control device 19 sets the phase image for each tile allocated to the modulation part 130 of the spatial light modulator 13. The control device 19 drives the spatial light modulator 13 so that a parameter that determines a difference between a phase of the light 102 with which the modulation part 130 of the spatial light modulator 13 is irradiated and a phase of the modulated light 103 reflected by the modulation part 130 changes, thereby setting a phase image in the modulation part 130. The parameter that determines the difference between the phase of the light 102 with which the modulation part 130 of the spatial light modulator 13 is irradiated and the phase of the modulated light 103 reflected by the modulation part 130 is, for example, a parameter regarding optical characteristics such as a refractive index and an optical path length. For example, the control device 19 adjusts the optical characteristics of the modulation part 130 by changing the voltage applied to the modulation part 130 of the spatial light modulator 13. The phase distribution of the light 102 with which the modulation part 130 of the phase modulation type spatial light modulator 13 is irradiated is modulated according to the optical characteristics of the modulation part 130. A method of driving the spatial light modulator 13 by the control device 19 is determined according to the modulation scheme of the spatial light modulator 13.

The control device 19 drives a light emitter 111 of the light source 11 in a state where the phase image related to the image to be displayed is set in the modulation part 130. The control device 19 individually drives the first light emitter 111-1 and the second light emitter 111-2 included in the light source 11 in accordance with the timing of transmitting the spatial optical signal. As a result, in accordance with the timing at which the phase image is set in the modulation part 130 of the spatial light modulator 13, the light 102-1 to 2 emitted from the light source 11 is applied to the sub-regions set in the first modulation region 131 and the second modulation region 132 of the modulation part 130 of the spatial light modulator 13. The light 102-1 to 2 applied to the sub-regions set in the first modulation region 131 and the second modulation region 132 of the modulation part 130 of the spatial light modulator 13 is modulated according to the phase image set in respective sub-regions. The modulated light 103 modulated by the modulation part 130 of the spatial light modulator 13 is emitted toward the reflection surface 150 of the curved surface mirror 15.

The control device 19 acquires a signal decoded by the light-receiving device 16 or a signal on which a signal process is performed from the light-receiving device 16. The signal acquired from the light-receiving device 16 is derived from the polarization-multiplexed spatial optical signal. The control device 19 executes processing according to the signal acquired from the light-receiving device 16. The processing executed by the control device 19 according to the signal acquired from the light-receiving device 16 is not particularly limited. For example, the control device 19 generates a signal for a communication device (not illustrated) to be communicated with according to a signal acquired from the light-receiving device 16. The control device 19 controls the optical transmission device 10 in such a way as to transmit the spatial optical signal related to the generated signal. For example, the control device 19 may output a signal acquired from the light-receiving device 16 to an external signal processing device or the like (not illustrated).

As described above, the communication device of the present example embodiment includes the optical transmission device, the light-receiving device, and the control device. The optical transmission device includes the light source, the spatial light modulator, the wave plate, and the curved surface mirror. The light source includes the first light emitter and the second light emitter. The first light emitter and the second light emitter emit light toward the modulation part of the spatial light modulator. The spatial light modulator includes a modulation part in which a plurality of modulation regions irradiated with the light emitted from a light source is set. The modulation part of the spatial light modulator is divided into the first modulation region irradiated with the light emitted from the first light emitter and the second modulation region irradiated with the light emitted from the second light emitter. The spatial light modulator modulates the phase of the radiated light in each of the first modulation region and the second modulation region set in the modulation part. The wave plate converts the modulated light modulated in each of the first modulation region and the second modulation region set in the modulation part of the spatial light modulator into polarization states different from each other. The curved surface mirror has a curved reflection surface irradiated with the modulated light modulated in the first modulation region and the second modulation region set in the modulation part of the spatial light modulator. The curved surface mirror reflects the modulated light on the reflection surface, and projects projection light having an enlarged projection angle according to the curvature of the reflection surface. The light-receiving device receives a spatial optical signal transmitted from another communication device. The control device sets a pattern for forming a spatial optical signal to be transmitted toward another communication device in each of the first modulation region and the second modulation region set in the modulation part of the spatial light modulator of the optical transmission device. The control device controls the light source so that the modulation part in which the pattern is set is irradiated with the light. The control device acquires a signal derived from the spatial optical signal received by the light-receiving device.

As described above, the optical transmission device of the present example embodiment converts the modulated light modulated in the plurality of modulation regions set in the modulation part of the spatial light modulator into polarization states different from each other. The projection light projected from the optical transmission device of the present example embodiment includes light components converted into polarization states different from each other. Therefore, the optical transmission device of the present example embodiment can simultaneously transmit a plurality of spatial optical signals different for each polarization state. That is, according to the present example embodiment, it is possible to implement optical spatial communication using multiplexed spatial optical signals.

A optical transmission device according to an aspect of the present example embodiment includes a partition wall that is disposed at least one of boundaries of a plurality of modulation regions and prevents modulated light modulated in the plurality of modulation regions from being mixed. According to the present aspect, since the modulated light modulated in the modulation region separated by the partition wall is not mixed immediately after modulation, generation of high-order light that can be formed by the modulated light can be prevented.

In an aspect of the present example embodiment, the wave plate includes a half-wave plate. The wave plate is disposed on an optical path of the modulated light modulated in one of the first modulation region and the second modulation region. According to the present aspect, by converting the modulated light modulated in the first modulation region and the modulated light modulated in the second modulation region into polarization states different from each other, separable projection light can be transmitted.

In an aspect of the present example embodiment, the wave plate includes a first wave plate and a second wave plate. The first wave plate includes a quarter-wave plate. The first wave plate is disposed on an optical path of the modulated light modulated in the first modulation region. The first wave plate converts the modulated light modulated in the first modulation region into circularly polarized light whose polarization direction is the first rotation direction. The second wave plate includes a quarter-wave plate. The second wave plate is disposed on an optical path of the modulated light modulated in the second modulation region. The second wave plate converts the modulated light modulated in the second modulation region into circularly polarized light whose polarization direction is the second rotation direction. The first rotation direction and the second rotation direction are opposite in rotation direction. According to the present aspect, by converting the modulated light modulated in the first modulation region and the modulated light modulated in the second modulation region into circularly polarized light having opposite rotation directions, it is possible to transmit separable projection light.

A light-receiving device according to an aspect of the present example embodiment includes a concentrator, a plurality of light receiving elements, and a plurality of light receiving filters. The concentrator collects a spatial optical signal transmitted from another communication device. The plurality of light receiving elements receive the spatial optical signal collected by the concentrator. The plurality of light receiving filters is disposed in association with the plurality of light receiving elements, respectively. Each of the plurality of light receiving filters selectively transmit a spatial optical signal to be received by the associated light receiving element. According to the present aspect, it is possible to have a configuration in which the optical signal to be received by the plurality of light receiving elements can be selectively received for the plurality of light receiving elements.

A light receiving filter according to an aspect of the present example embodiment includes a polarizing plate that selectively transmits linearly polarized light in a polarization direction to be received by the associated light receiving element. According to the present aspect, the linearly polarized light in the polarization direction to be received can be received separately from the spatial optical signal.

The light receiving filter according to an aspect of the present example embodiment includes a quarter-wave plate and a polarizing plate. The quarter-wave plate converts circularly polarized light in the rotation direction to be received by the associated light receiving element into linearly polarized light. The polarizing plate selectively transmits the linearly polarized light whose polarization direction is a specific direction in the linearly polarized light converted by the quarter-wave plate. According to the present aspect, the circularly polarized light in the rotation direction to be received can be received separately from the spatial optical signal.

Second Example Embodiment

Next, a communication device according to a second example embodiment will be described with reference to the drawings. The communication device according to the present example embodiment performs polarization multiplexing communication with a plurality of communication targets using four light sources.

(Configuration)

Figure 13:
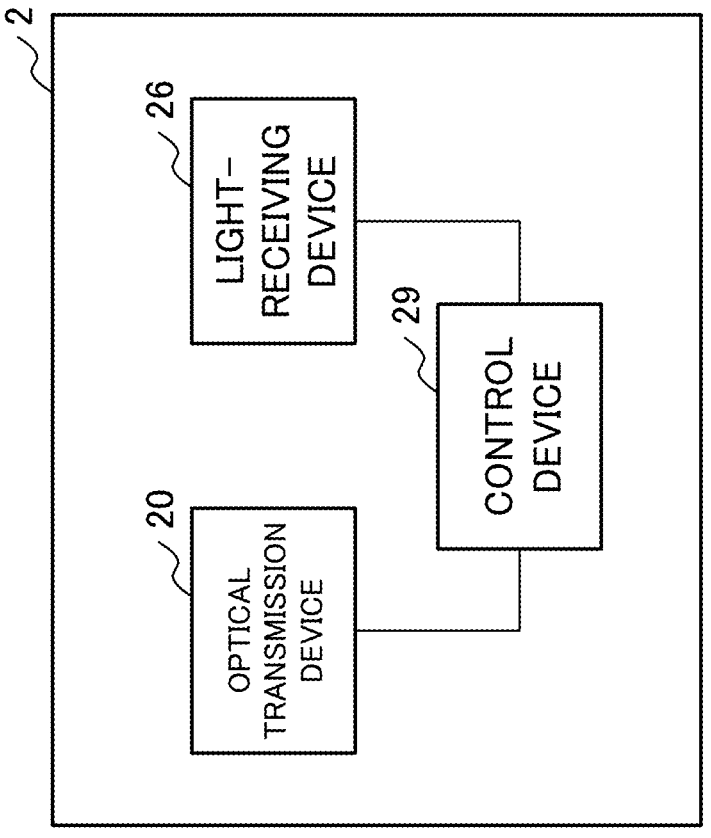
FIG. 13 is a block diagram illustrating an example of a configuration of a communication device according to a second example embodiment.

FIG. 13 is a block diagram illustrating an example of a configuration of a communication device 2 of the present example embodiment. The communication device 2 of the present example embodiment includes an optical transmission device 20, a light-receiving device 26, and a control device 29. The light-receiving device 26 has a configuration similar to that of the light-receiving device 16 of the first example embodiment. Although the details are different, the control device 29 has a configuration substantially similar to that of the control device 19 of the first example embodiment. Hereinafter, the optical transmission device 20 different from that of the first example embodiment will be described in detail.

[Light-Sending Device]

Figure 14:
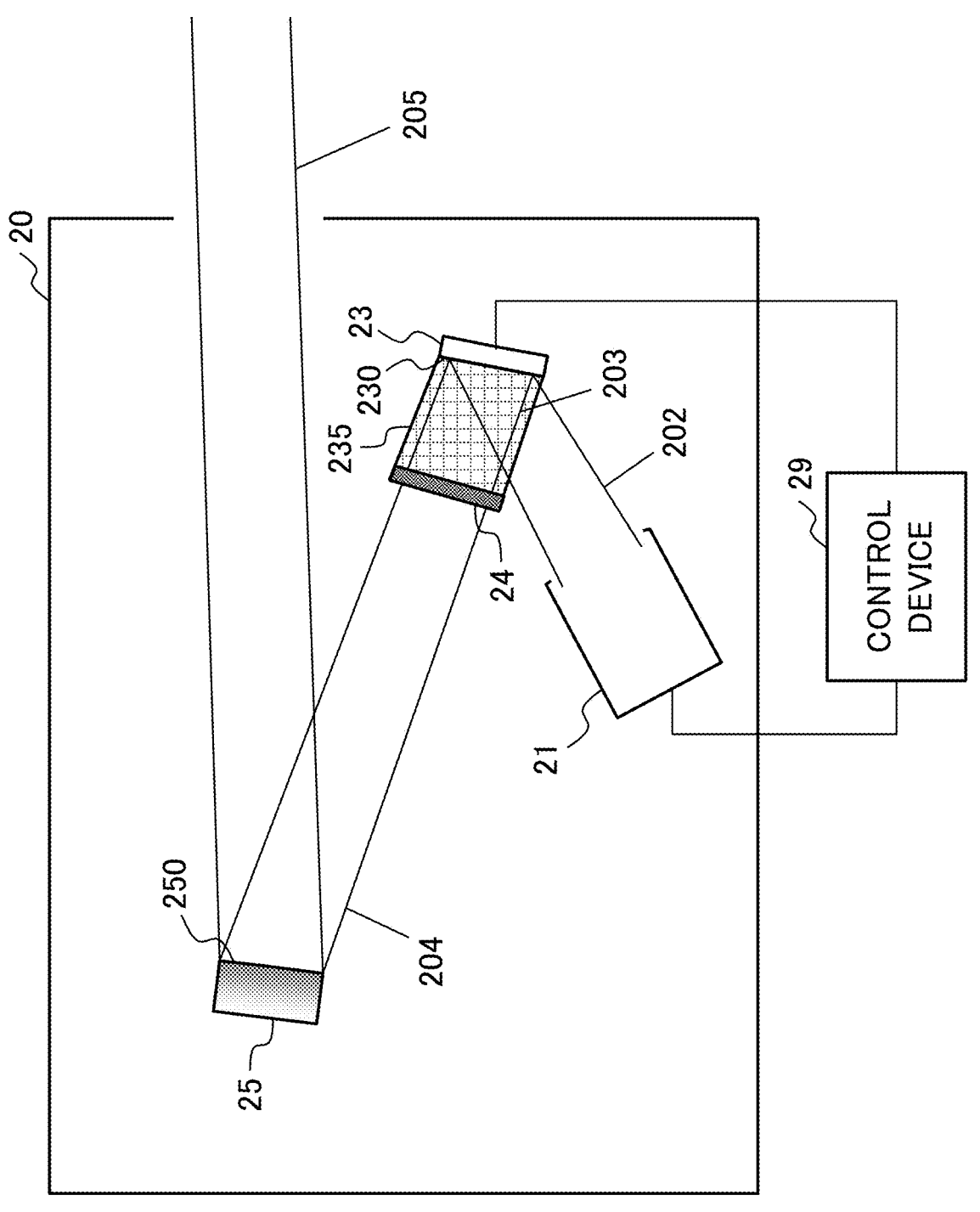
FIG. 14 is a conceptual diagram illustrating an example of a configuration of an optical transmission device included in the communication device according to the second example embodiment.
Figure 15:
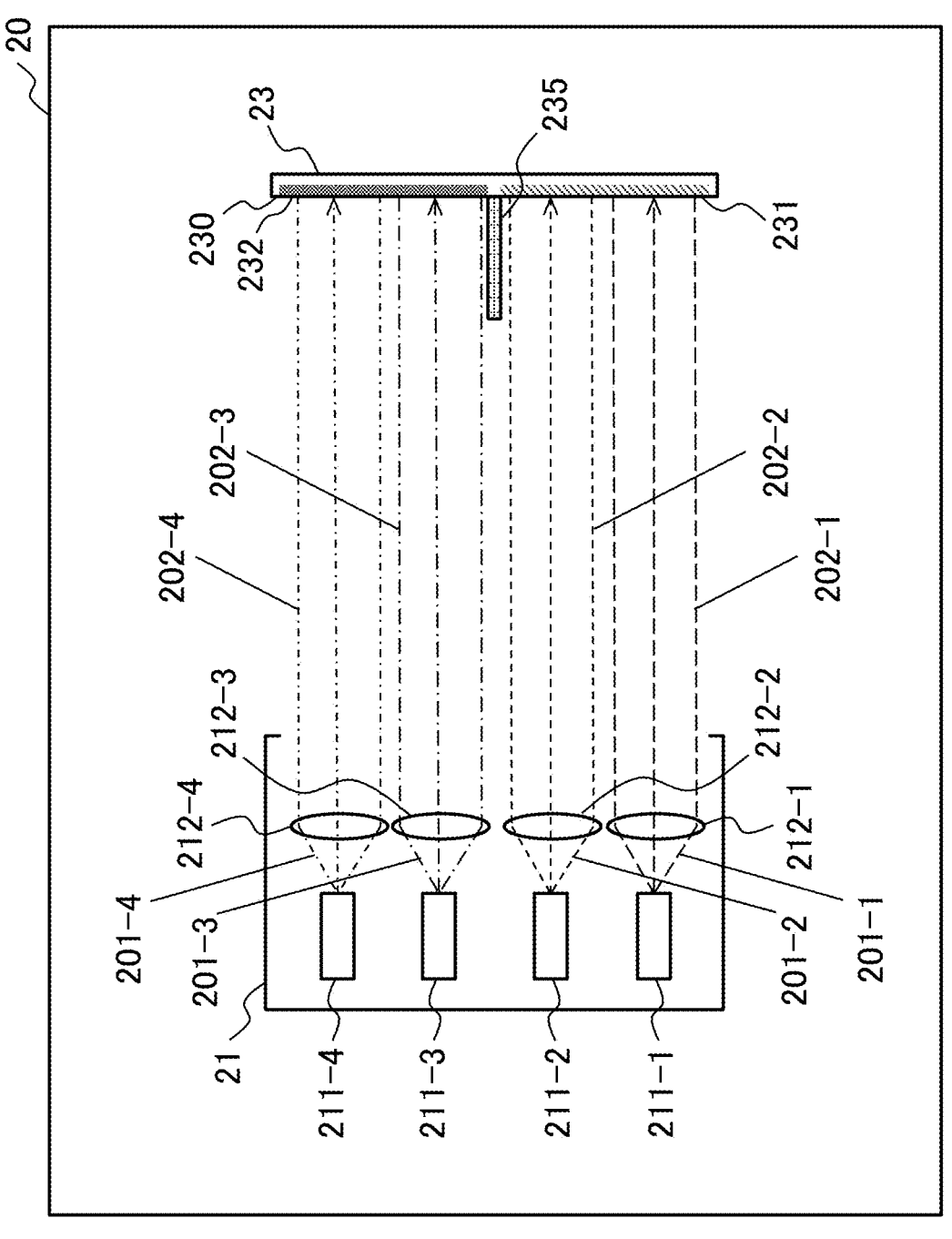
FIG. 15 is a conceptual diagram illustrating an example of an internal configuration of the optical transmission device included in the communication device according to the second example embodiment as viewed from an upper viewpoint.

A configuration of the optical transmission device 20 will be described with reference to the drawings. FIGS. 14 to 15 are conceptual diagrams illustrating an example of a configuration of the optical transmission device 20. The optical transmission device 20 includes a light source 21, a spatial light modulator 23, a wave plate 24, and a curved surface mirror 25. The spatial light modulator 23 includes a modulation part 230. A first modulation region 231 and a second modulation region 232 are set in the modulation part 230 of the spatial light modulator 23. Two sub-regions (first sub-region, second sub-region) are set in each of the first modulation region 231 and the second modulation region 232. FIG. 14 is a side view of the internal configuration of the optical transmission device 20 as viewed from the lateral direction. FIG. 15 is a top view of the internal configuration of the optical transmission device 20 as viewed from above. In FIG. 15, the light source 21 and the spatial light modulator 23 are illustrated, and the wave plate 24 and the curved surface mirror 25 are omitted. FIGS. 14 to 15 are conceptual, and do not accurately represent the positional relationship between the components, the traveling direction of light, and the like.

The light source 21 includes a plurality of light emitters and a plurality of lenses. The plurality of light emitters includes a first light emitter 211-1, a second light emitter 211-2, a third light emitter 211-3, and a fourth light emitter 211-4. The plurality of lenses includes a first lens 212-1, a second lens 212-2, a third lens 212-3, and a fourth lens 212-4. The first light emitter 211-1, the second light emitter 211-2, the third light emitter 211-3, and the fourth light emitter 211-4 are disposed in such a way that the output axes do not intersect with each other in the optical path to the spatial light modulator 23.

The first light emitter 211-1 emits laser light 201-1 in a predetermined wavelength band toward the first lens 212-1 under the control of the control device 29. The laser light 201-1 emitted from the first light emitter 211-1 is polarized light. The first lens 212-1 is disposed on an optical path of the laser light 201-1 emitted from the first light emitter 211-1. The first lens 212-1 enlarges the laser light 201-1 emitted from the first light emitter 211-1 according to the size of the first sub-region of the first modulation region 231 of the modulation part 230 of the spatial light modulator 23. Light 202-1 enlarged by the first lens 212-1 travels toward the first sub-region of the first modulation region 231.

The second light emitter 211-2 emits laser light 201-2 in a predetermined wavelength band toward the second lens 212-2 under the control of the control device 29. The laser light 201-2 emitted from the second light emitter 211-2 is polarized light. The second lens 212-2 is disposed on an optical path of the laser light 201-2 emitted from the second light emitter 211-2. The second lens 212-2 enlarges the laser light 201-2 emitted from the second light emitter 211-2 according to the size of the second sub-region of the first modulation region 231 of the modulation part 230 of the spatial light modulator 23. The first sub-region and the second sub-region are set at different positions in the first modulation region 231. Light 202-2 enlarged by the second lens 212-2 travels toward the second sub-region of the first modulation region 231. Different sub-regions included in the same first modulation region 231 are irradiated with the light 202-1 and the light 202-2.

The third light emitter 211-3 emits laser light 201-3 in a predetermined wavelength band toward the third lens 212-3 under the control of the control device 29. The laser light 201-3 emitted from the third light emitter 211-3 is polarized light. The third lens 212-3 is disposed on an optical path of the laser light 201-3 emitted from the third light emitter 211-3. The third lens 212-3 enlarges the laser light 201-3 emitted from the third light emitter 211-3 according to the size of the first sub-region of the second modulation region 232 of the modulation part 230 of the spatial light modulator 23. Light 202-3 enlarged by the third lens 212-3 travels toward the first sub-region of the second modulation region 232.

The fourth light emitter 211-4 emits laser light 201-4 in a predetermined wavelength band toward the fourth lens 212-4 under the control of the control device 29. The laser light 201-4 emitted from the fourth light emitter 211-4 is polarized light. The polarization directions of the light with which the modulation part 230 of the spatial light modulator 23 is irradiated are required to be set to be the same. Therefore, the polarization directions of the laser light 201-1 to 4 are set to be the same in the modulation part 230. The fourth lens 212-4 is disposed on an optical path of the laser light 201-4 emitted from the fourth light emitter 211-4. The fourth lens 212-4 enlarges the laser light 201-4 emitted from the fourth light emitter 211-4 according to the size of the second sub-region of the second modulation region 232 of the modulation part 230 of the spatial light modulator 23. The first sub-region and the second sub-region are set at different positions in the second modulation region 232. Light 202-4 enlarged by the fourth lens 212-4 travels toward the second sub-region of the second modulation region 232. Different sub-regions included in the same second modulation region 232 are irradiated with the light 202-3 and the light 202-4.

The wavelengths of the laser light 201-1 to 4 emitted from the first light emitter 211-1, the second light emitter 211-2, the third light emitter 211-3, and the fourth light emitter 211-4 are not particularly limited, and may be selected according to the application. The wavelengths of the laser light 201-1 to 4 may be the same or different. In the present example embodiment, since the light 202-1 to 4 is emitted toward the same spatial light modulator 23, polarization directions of the laser light 201-1 to 4 emitted to the modulation part 230 are the same. For example, the first light emitter 211-1, the second light emitter 211-2, the third light emitter 211-3, and the fourth light emitter 211-4 emit the laser light 201-1 to 4 in visible and infrared wavelength bands. For example, in the case of near infrared rays of 800 to 900 nanometers (nm), the laser class can be increased, so that the sensitivity can be improved by about one digit as compared with other wavelength bands. For example, a high-output laser light source can be used for infrared rays in a wavelength band of 1.55 micrometers (μm). As an infrared laser light source in a wavelength band of 1.55 μm, an aluminum gallium arsenide phosphorus (AlGaAsP)-based laser light source, an indium gallium arsenide (In-GaAs)-based laser light source, or the like can be used. The longer the wavelengths of the laser light 201-1 to 4 are, the larger the diffraction angle can be made and the higher the energy can be set.

The spatial light modulator 23 has a configuration similar to that of the spatial light modulator 13 of the first example embodiment. The spatial light modulator 23 includes the modulation part 230. The first modulation region 231 and the second modulation region 232 are set in the modulation part 230. Each of the first modulation region 231 and the second modulation region 232 is divided into at least two sub-regions. The first modulation region 231 is irradiated with the light 202-1 to 2. Different sub-regions of the first modulation region 231 are irradiated with the light 202-1 to 2. The light 202-1 to 2 is modulated by different sub-regions of the first modulation region 231 and emitted as the modulated light 203-1 to 2. The second modulation region 232 is irradiated with the light 202-3 to 4. Different sub-regions of the second modulation region 232 are irradiated with the light 202-3 to 4. The light 202-3 to 4 are modulated by different sub-regions of the second modulation region 232 and emitted as modulated light 203-3 to 4.

A partition wall 235 is disposed between the first modulation region 231 and the second modulation region 232. The partition wall 235 stands perpendicular to the surface of the modulation part 230. The partition wall 235 divides the modulation part 230 into two in such a way that the modulated light 203-1 to 2 modulated in the first modulation region 231 and the modulated light 203-3 to 4 modulated in the second modulation region 232 are not mixed immediately after being modulated by the modulation part 230. A pattern (also referred to as a phase image) related to an image displayed by projection light 205 is set in each of the first modulation region 231 and the second modulation region 232 under the control of the control device 29. When the spatial light modulator 23 is used, a high-order image is generated as in the diffraction grating because the diffraction phenomenon is used. The high-order image is not clear due to low power, but is visually recognized. The partition wall 235 prevents a high-order image that can be displayed on the face to be projected from generating.

Figure 16:
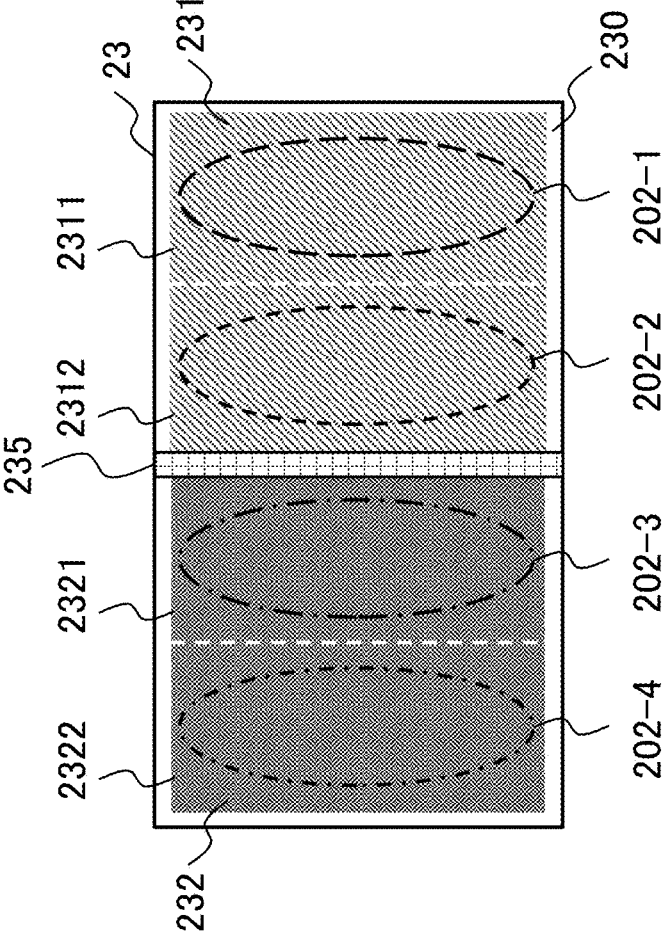
FIG. 16 is a conceptual diagram for describing an example of an irradiation range of light with which a modulation region is irradiated set in a modulation part of a spatial light modulator of the optical transmission device included in the communication device of the second example embodiment.

FIG. 16 illustrates an example of the first modulation region 231 and the second modulation region 232 set in the modulation part 230 of the spatial light modulator 23. In the example of FIG. 16, two sub-regions are set in each of the first modulation region 231 and the second modulation region 232. As illustrated in FIG. 16, when two irradiation ranges of light 202 are set in each of the first modulation region 231 and the second modulation region 232, polarization multiplexing communication can be performed simultaneously with two communication targets.

In FIG. 16, the first modulation region 231 is irradiated with the light 202-1 to 2 emitted from the light source 21. A first sub-region 2311 related to the light 202-1 and a second sub-region 2312 related to the light 202-2 are allocated to the first modulation region 231. A pattern (phase image) for converting the light 202-1 into the modulated light 203-1 is set in the first sub-region 2311 of the first modulation region 231. A phase image related to an image formed by the modulated light 203-1 is set in the first sub-region 2311 of the first modulation region 231. A phase image for converting the light 202-2 into modulated light 203-2 is set in the second sub-region 2312 of the first modulation region 231. A phase image related to an image formed by the modulated light 203-2 is set in the second sub-region 2312 of the first modulation region 231.

In FIG. 16, the second modulation region 232 is irradiated with the light 202-3 to 4 emitted from the light source 21. A first sub-region 2321 related to the light 202-3 and a second sub-region 2322 related to the light 202-4 are allocated to the second modulation region 232. A phase image for converting the light 202-3 into the modulated light 203-3 is set in the first sub-region 2321 of the second modulation region 232. A phase image related to an image formed by the modulated light 203-3 is set in the first sub-region 2321 of the second modulation region 232. A phase image for converting the light 202-4 into the modulated light 203-4 is set in the second sub-region 2322 of the second modulation region 232. A phase image related to an image formed by the modulated light 203-4 is set in the second sub-region 2322 of the second modulation region 232.

Each of the first modulation region 231 and the second modulation region 232 allocated to the modulation part 230 of the spatial light modulator 23 is divided into a plurality of regions (also referred to as tiling). For example, each of the first modulation region 231 and the second modulation region 232 is divided into rectangular regions (also referred to as tiles) having a desired aspect ratio. Each of the plurality of tiles includes a plurality of pixels. A phase image is tiled to each of the plurality of tiles set in the first modulation region 231 and the second modulation region 232. For example, a phase image generated in advance is set in each of the plurality of tiles. A phase image related to a projected image is set to each of the plurality of tiles.

When the modulation part 230 is irradiated with the light 202 in a state where the phase images are set for the plurality of tiles, the modulated light 203 that forms an image related to the phase image of each tile is emitted. As the number of tiles set in the modulation part 230 increases, a clear image can be displayed. However, when the number of pixels of each tile decreases, the resolution decreases. Therefore, the size and number of tiles set in the modulation part 230 are set according to the application.

The modulated light 203-1 to 2 modulated in the first modulation region 231 and the modulated light 203-3 to 4 modulated in the second modulation region 232 are separated by the partition wall 235 immediately after being emitted from the modulation part 230. The modulated light 203-1 to 2 and the modulated light 203-3 to 4 can be set in such a way as to be mixed with each other after being emitted from modulation part 230, or can be set in such a way as not to be mixed with each other. The mixing situation of the modulated light 203-1 to 4 after being emitted from modulation part 230 can be set by adjusting the emission direction of light 202 from the light source 21.

The wave plate 24 has a configuration similar to that of the wave plate 14 of the first example embodiment. The wave plate 24 is disposed between the spatial light modulator 23 and the curved surface mirror 25. In the example of FIG. 14, the wave plate 24 is disposed substantially parallel to the surface of the modulation part 230 by the partition wall 235. When linearly polarized light is emitted from the optical transmission device 20, a half-wave plate is used as the wave plate 24. In a case where circularly polarized light is emitted from the optical transmission device 20, a quarter-wave plate is used as the wave plate 24.

Figure 17:
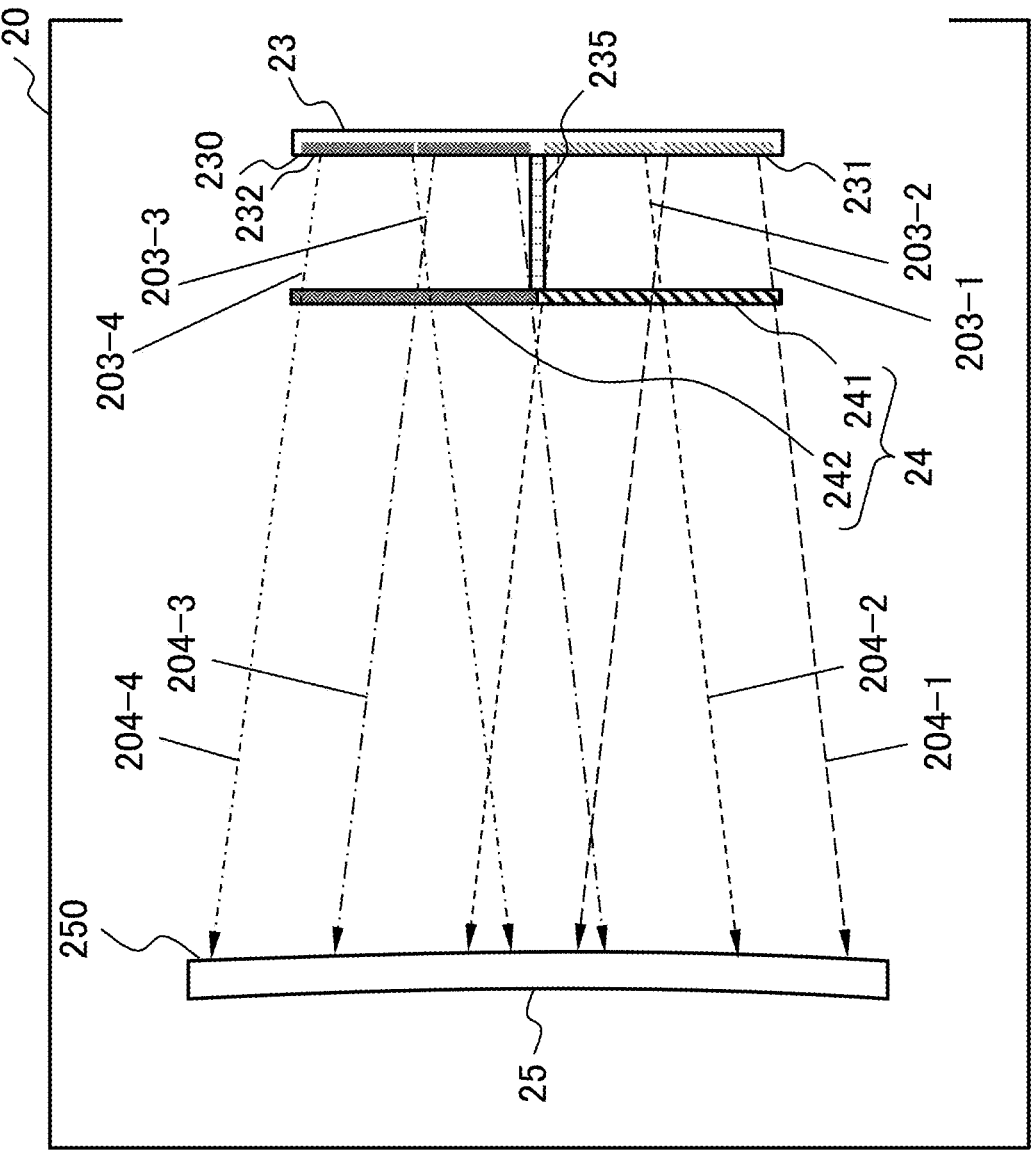
FIG. 17 is a conceptual diagram illustrating another example of an internal configuration of the optical transmission device included in the communication device of the second example embodiment as viewed from an upper viewpoint.

FIG. 17 is a conceptual diagram of the internal configuration of the optical transmission device 20 as viewed from above. In FIG. 17, the light source 21 is omitted. FIG. 17 is conceptual, and does not accurately represent the positional relationship between the components, the traveling direction of light, and the like. The wave plate 24 includes a first wave plate 241 and a second wave plate 242. The first wave plate 241 and the second wave plate 242 have different polarization characteristics.

The first wave plate 241 is disposed in association with the first modulation region 231. The modulated light 203-1 to 2 modulated in first modulation region 231 passes through the first wave plate 241 before reaching a reflection surface 250 of the curved surface mirror 25. The modulated light 203-1 to 2 having passed through the first wave plate 241 turn to light 204-1 to 2 according to the polarization characteristic of the first wave plate 241. The light 204-1 to 2 having passed through the first wave plate 241 form an image related to the phase image set in the sub-region of the first modulation region 231 on the reflection surface 250 of the curved surface mirror 25.

The second wave plate 242 is disposed in association with the second modulation region 232. The modulated light 203-3 to 4 modulated in second modulation region 232 passes through the second wave plate 242 before reaching the reflection surface 250 of the curved surface mirror 25. The modulated light 203-3 to 4 having passed through the second wave plate 242 turn to light 204-3 to 4 according to the polarization characteristic of the second wave plate 242. The light 204-3 to 4 having passed through the second wave plate 242 form an image related to the phase image set in the sub-region of the second modulation region 232 on the reflection surface 250 of the curved surface mirror 25.

The polarization states of the modulated light 203-1 to 2 passing through the first wave plate 241 and the polarization states of the modulated light 203-3 to 4 passing through the second wave plate 242 are different from each other. That is, the modulated light 203-1 to 2 and the modulated light 203-3 to 4 having passed through the wave plate 24 turn to the light 204-1 to 2 and the light 204-3 to 4 in different polarization states.

For example, when linearly polarized light is transmitted from the optical transmission device 20, the first wave plate 241 is a half-wave plate. For example, nothing is installed on the second wave plate 242. The polarization directions of the modulated light 203-1 to 2 passing through the first wave plate 241 are rotated by 90 degrees. The modulated light 203-3 to 4 passing through the second wave plate 242 travel in the same polarization direction. For example, an element made of a transparent glass or plastic material that does not affect the polarization state may be disposed on the second wave plate 242. The polarization directions of the light 204-1 to 2 passing through the first wave plate 241 and the polarization directions of the light 204-3 to 4 passing through the second wave plate 242 are orthogonal to each other. Therefore, the projection light 205 derived from the light 204-1 to 2 passing through the first wave plate 241 and the projection light 205 derived from the light 204-3 to 4 passing through the second wave plate 242 can be separated on the reception side of the spatial optical signal.

For example, when circularly polarized light is transmitted from the optical transmission device 20, the first wave plate 241 and the second wave plate 242 are quarter-wave plates whose optical axes are orthogonal to each other. The light 204-1 to 2 having passed through the first wave plate 241 and the light 204-3 to 4 having passed through the second wave plate 242 are converted into circularly polarized light having opposite rotation directions. Therefore, the spatial optical signal derived from the light 204-1 to 2 passing through the first wave plate 241 and the spatial optical signal derived from the light 204-3 to 4 passing through the second wave plate 242 can be separated on the reception side of the spatial optical signal.

The curved surface mirror 25 has a configuration similar to that of the curved surface mirror 15 of the first example embodiment. The curved surface mirror 25 is a reflecting mirror having the curved reflection surface 250. The reflection surface 250 of the curved surface mirror 25 has a curvature in accordance with the projection angle of the projection light 205. In the example of FIG. 14, the reflection surface 250 of the curved surface mirror 25 has a shape of a side face of a cylinder. For example, the reflection surface 250 of the curved surface mirror 25 may be a spherical surface. For example, the reflection surface 250 of the curved surface mirror 25 may be a free-form surface. For example, the reflection surface 250 of the curved surface mirror 25 may have a shape in which a plurality of curved surfaces is combined instead of a single curved surface. For example, the reflection surface 250 of the curved surface mirror 25 may have a shape in which a curved surface and a flat face are combined.

The curved surface mirror 25 is disposed with the reflection surface 250 facing the modulation part 230 of the spatial light modulator 23. In other words, curved surface mirror 25 is disposed on the optical paths of the modulated light 203-1 to 4. The reflection surface 250 of the curved surface mirror 25 is irradiated with the light 203-1 to 4 that has passed through the wave plate 24 in the modulated light 204-1 to 4 modulated by the modulation part 230 of the spatial light modulator 23. The light 204-1 to 2 is light that has passed through the first wave plate 241 in the modulated light 203-1 to 2 modulated by the first modulation region 231 of the modulation part 230 of the spatial light modulator 23. The light 204-3 to 4 is light that has passed through the second wave plate 242 in the modulated light 203-3 to 4 modulated by the second modulation region 232 of the modulation part 230 of the spatial light modulator 23. At least one of the light 204-1 to 4 passes through the wave plate 24, whereby polarization state is changed. That is, the light 204-1 to 2 and the light 204-3 to 4 turn to different polarization states.

Figure 18:
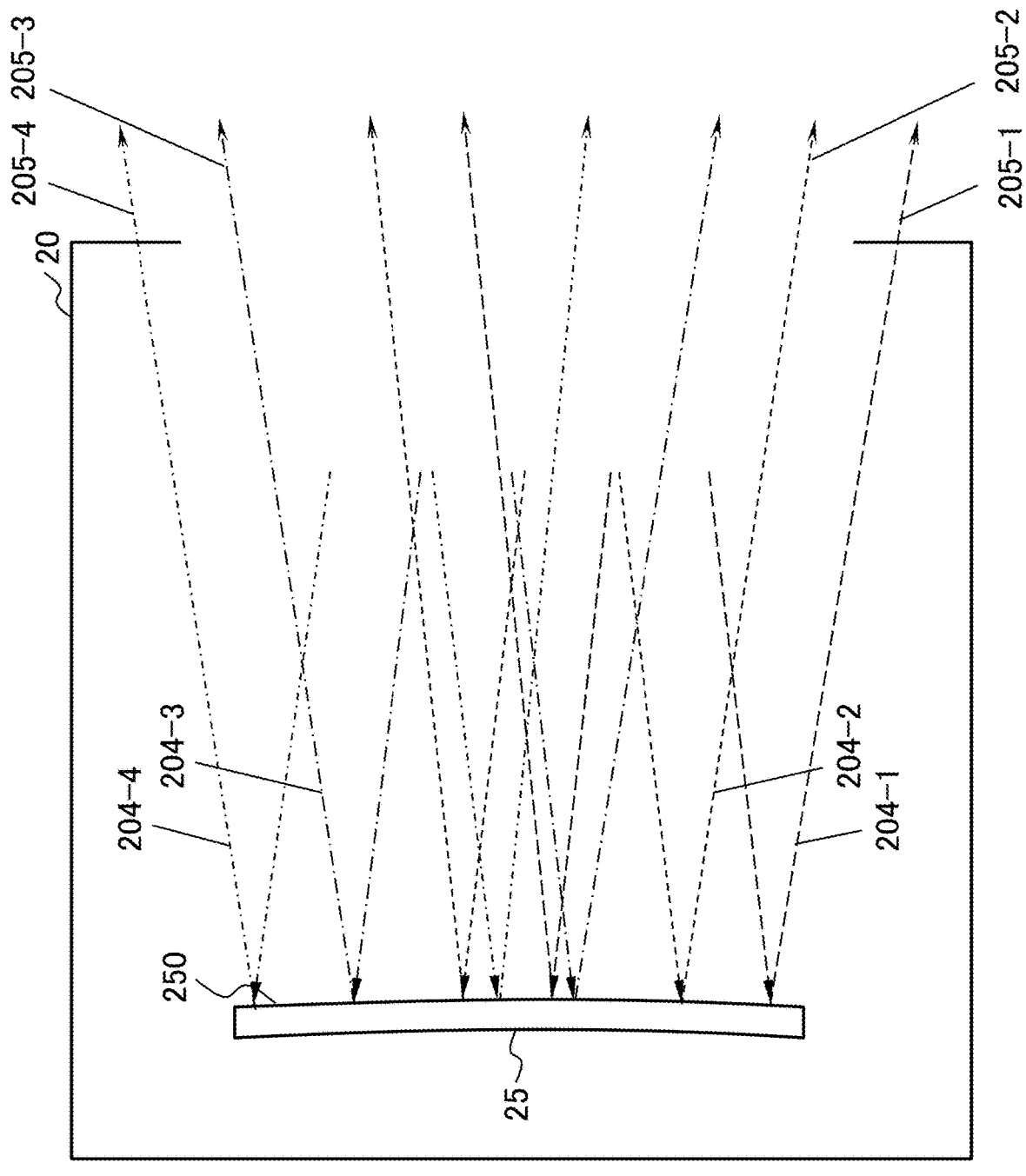
FIG. 18 is a conceptual diagram for describing projection light projected by an optical transmission device included in a communication device of the second example embodiment.

The light (projection light 205) reflected by the reflection surface 250 of the curved surface mirror 25 is enlarged and projected at an enlargement ratio in accordance with the curvature of the reflection surface 250. FIG. 18 is a conceptual diagram illustrating an example of projection of the projection light 205 reflected by the reflection surface 250. FIG. 18 is conceptual, and does not accurately represent the traveling direction of light and the like. The projection light 205 is enlarged along the horizontal direction (the vertical direction of the sheet of FIG. 18) according to the curvature of the irradiation range of light 204 on the reflection surface 250 of the curved surface mirror 25. The reflection surface 250 is irradiated with each of the light 204-1 to 4 constituting the light 204. Each of the light 204-1 to 4 is individually reflected by the reflection surface 250. The light 204-1 is reflected by the reflection surface 250 and projected as the projection light 205-1. The light 204-2 is reflected by the reflection surface 250 and projected as the projection light 205-2. The light 204-3 is reflected by the reflection surface 250 and projected as the projection light 205-3. The light 204-4 is reflected by the reflection surface 250 and projected as the projection light 205-4. Each of the light 204-1 to 4 is projected as the projection light 205-1 to 4 at a projection angle in accordance with the curvature of the reflection surface 250.

For example, a shielder (not illustrated) or a 0th-order light remover (not illustrated) may be disposed on the optical paths of the modulated light 203, the light 204, and the projection light 205. Since the shielder and the 0th-order light remover are similar to those of the first example embodiment, the description thereof is omitted.

Figure 19:
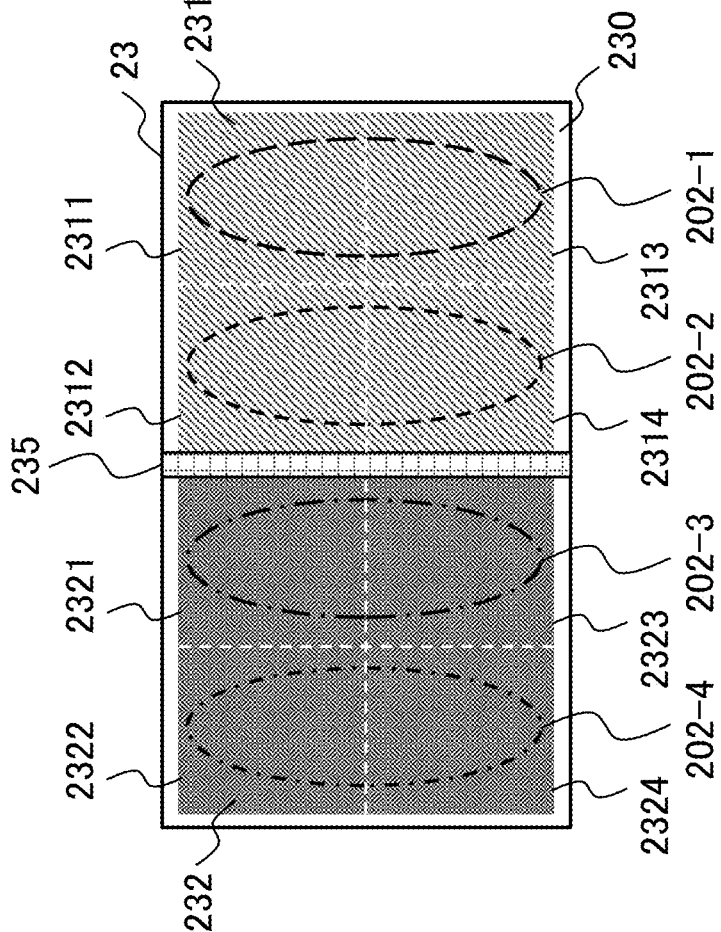
FIG. 19 is a conceptual diagram for describing an example of dividing modulation regions set in modulation parts of a first spatial light modulator and a second spatial light modulator of the optical transmission device included in the communication device of the second example embodiment.

FIG. 19 illustrates another example of the first modulation region 231 and the second modulation region 232 set in the modulation part 230 of the spatial light modulator 23. In the example of FIG. 19, each of the first modulation region 231 and the second modulation region 232 is divided into four. In the example of FIG. 19, four sub-regions are set in each of the first modulation region 231 and the second modulation region 232.

In FIG. 19, the first modulation region 231 is irradiated with the light 202-1 to 2 emitted from the light source 21. The first sub-region 2311, the second sub-region 2312, a third sub-region 2313, and a fourth sub-region 2314 are allocated to the first modulation region 231. That is, the first modulation region 231 is divided into four sub-regions. Phase images different from each other are set in the four sub-regions. The first sub-region 2311 and the third sub-region 2313 are irradiated with the light 202-1. The second sub-region 2312 and the fourth sub-region 2314 are irradiated with the light 202-2.

In FIG. 19, the second modulation region 232 is irradiated with the light 202-3 to 4 emitted from the light source 21. The first sub-region 2321, the second sub-region 2322, a third sub-region 2323, and a fourth sub-region 2324 are allocated to the second modulation region 232. That is, the second modulation region 232 is divided into four sub-regions. Phase images different from each other are set in the four sub-regions. The first sub-region 2321 and the third sub-region 2323 are irradiated with the light 202-3. The second sub-region 2322 and the fourth sub-region 2324 are irradiated with the light 202-4. As illustrated in FIG. 19, when each of the first modulation region 231 and the second modulation region 232 is divided into four and the irradiation range of the light 202 is set to two, polarization multiplexing communication can be performed simultaneously with four communication targets.

As described above, the communication device of the present example embodiment includes the optical transmission device, the light-receiving device, and the control device. The optical transmission device includes the light source, the spatial light modulator, the wave plate, and the curved surface mirror. The light source includes a first light emitter, a second light emitter, a third light emitter, and a fourth light emitter. The first light emitter, the second light emitter, the third light emitter, and the fourth light emitter emit light toward a modulation part of the spatial light modulator. The spatial light modulator includes a modulation part in which a plurality of modulation regions irradiated with the light emitted from a light source is set. The modulation part of the spatial light modulator is divided into a first modulation region and a second modulation region. The first modulation region includes a region irradiated with each of the light emitted from the first light emitter and the light emitted from the second light emitter. The second modulation region includes a region irradiated with each of the light emitted from the third light emitter and the light emitted from the fourth light emitter. The spatial light modulator modulates the phase of the radiated light in each of the first modulation region and the second modulation region set in the modulation part. The wave plate converts the modulated light modulated in each of the first modulation region and the second modulation region set in the modulation part of the spatial light modulator into polarization states different from each other. The curved surface mirror has a curved reflection surface irradiated with the modulated light modulated in the first modulation region and the second modulation region set in the modulation part of the spatial light modulator. The curved surface mirror reflects the modulated light on the reflection surface, and projects projection light having an enlarged projection angle according to the curvature of the reflection surface. The light-receiving device receives a spatial optical signal transmitted from another communication device. The control device sets a pattern for forming a spatial optical signal to be transmitted toward another communication device in each of the first modulation region and the second modulation region set in the modulation part of the spatial light modulator of the optical transmission device. The control device controls the light source so that the modulation part in which the pattern is set is irradiated with the light. The control device acquires a signal derived from the spatial optical signal received by the light-receiving device.

As described above, the optical transmission device of the present example embodiment converts the modulated light modulated in the plurality of modulation regions set in the modulation part of the spatial light modulator into polarization states different from each other. The projection light projected from the optical transmission device of the present example embodiment includes light components converted into polarization states different from each other. Therefore, the optical transmission device of the present example embodiment can simultaneously transmit a plurality of spatial optical signals different for each polarization state. That is, according to the present example embodiment, it is possible to implement optical spatial communication using multiplexed spatial optical signals. The optical transmission device of the present example embodiment includes twice as many light emitters as the optical transmission device of the first example embodiment. Therefore, according to the communication device of the present example embodiment, it is possible to communicate with more communication targets than in the first example embodiment.

Third Example Embodiment

Figure 20:
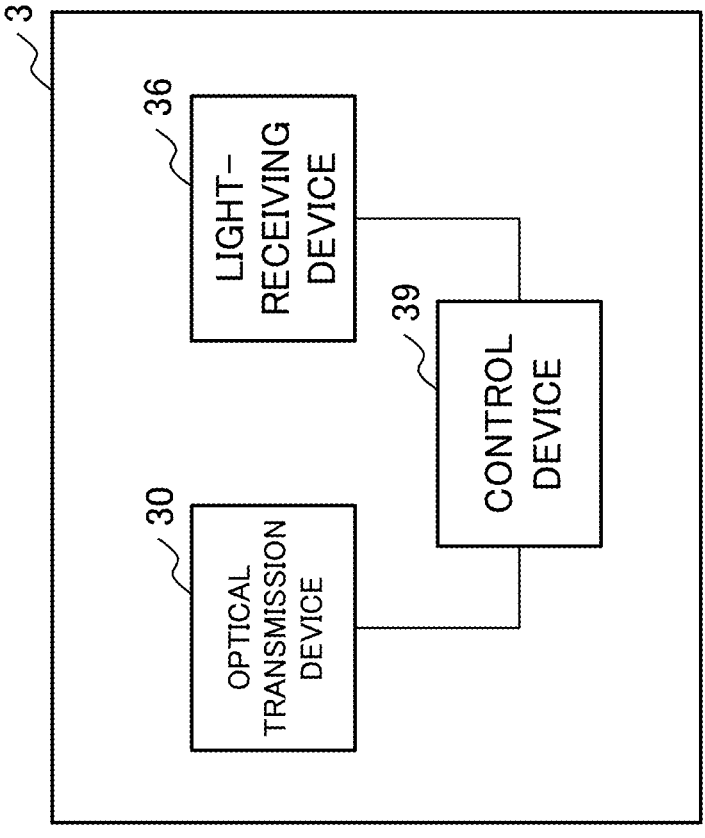
FIG. 20 is a block diagram illustrating an example of a configuration of a communication device according to a third example embodiment.
Figure 21:
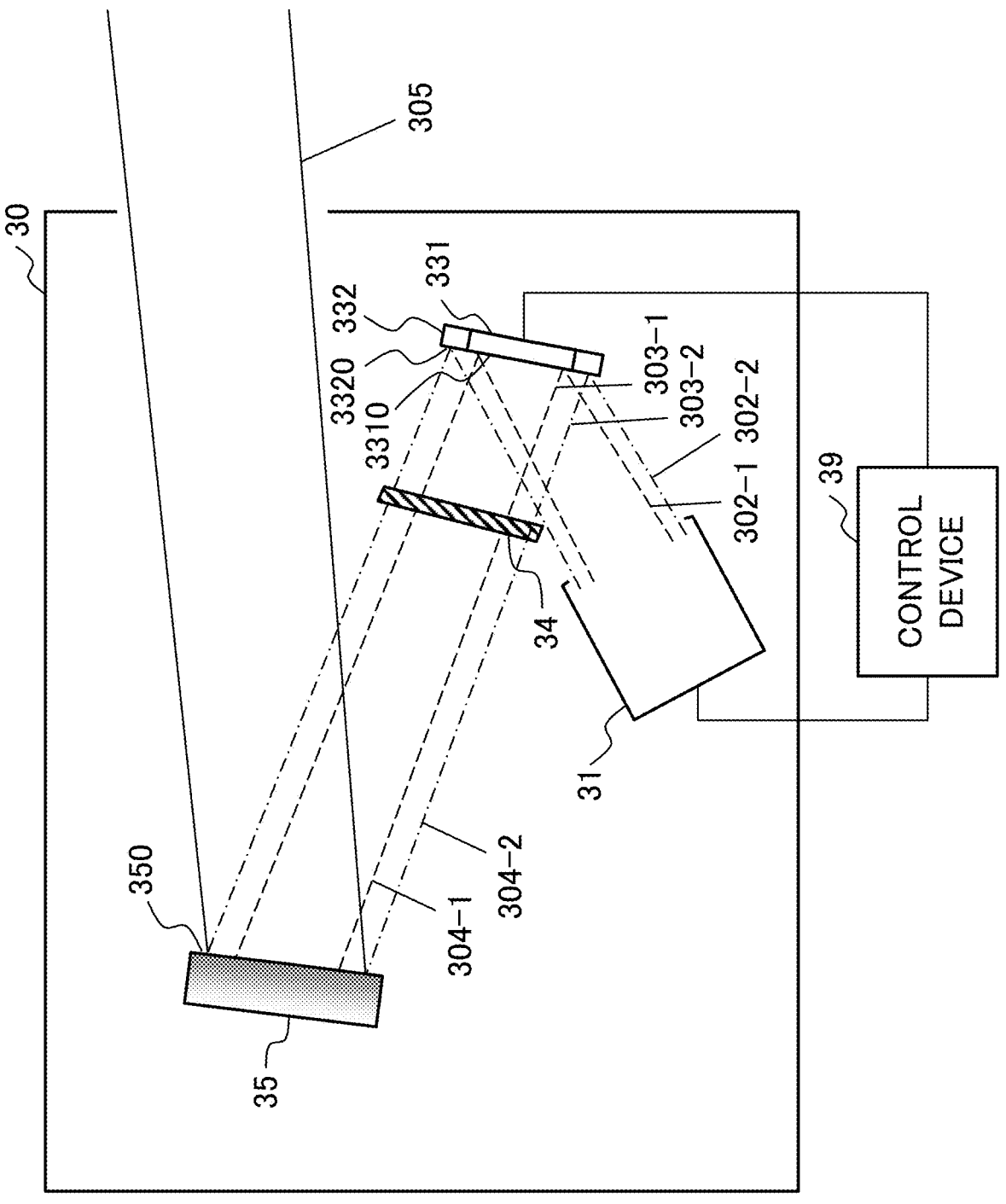
FIG. 21 is a conceptual diagram illustrating an example of a configuration of an optical transmission device included in the communication device according to the third example embodiment.
Figure 22:
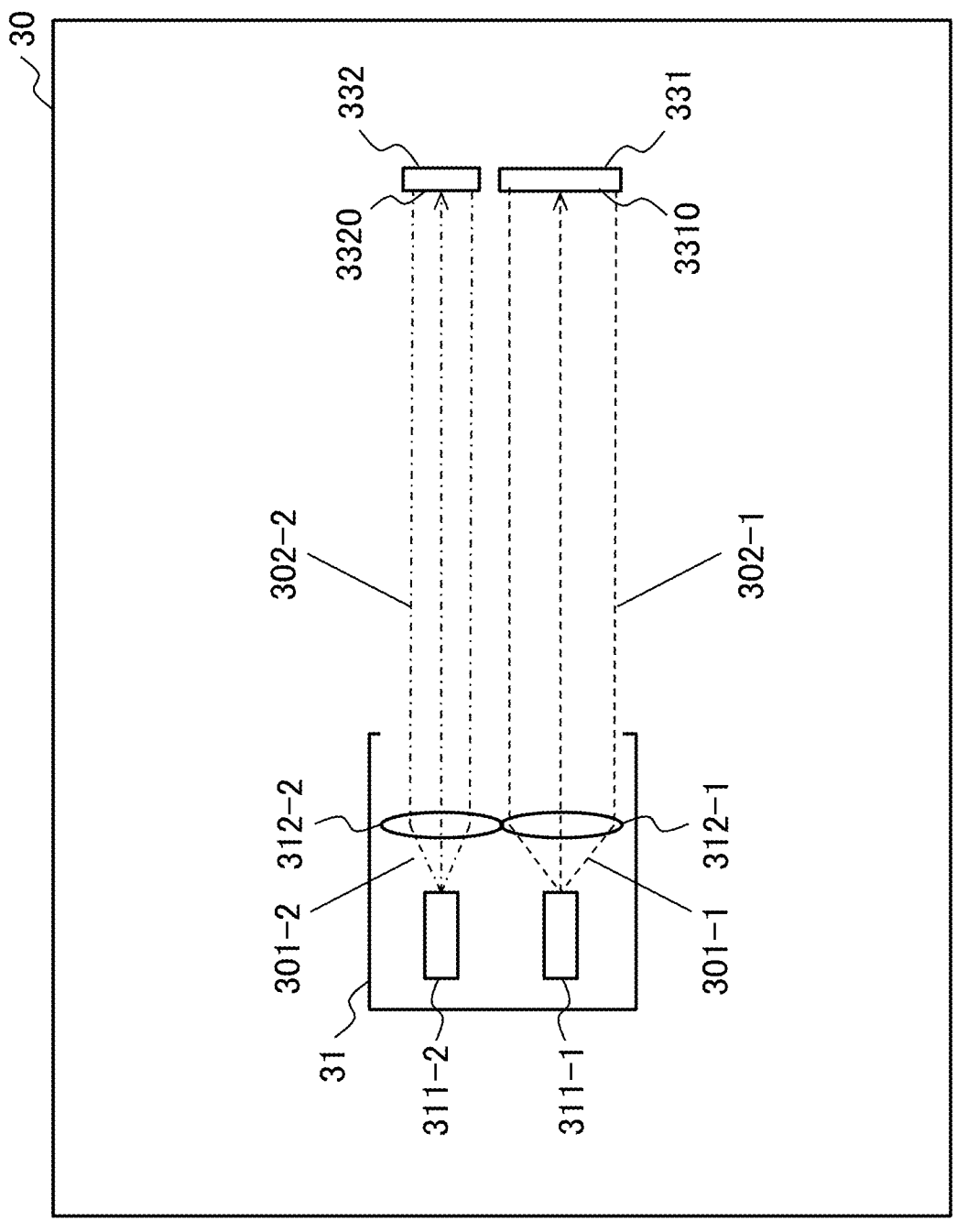
FIG. 22 is a conceptual diagram illustrating an example of an internal configuration of the optical transmission device included in the communication device according to the third example embodiment as viewed from an upper viewpoint.

Next, a communication device according to a third example embodiment will be described with reference to the drawings. The communication device according to the present example embodiment performs polarization multiplexing communication with a plurality of communication targets using two spatial light modulators.
(Configuration)
FIG. 20 is a block diagram illustrating an example of a configuration of a communication device 3 of the present example embodiment. The communication device 3 of the present example embodiment includes an optical transmission device 30, a light-receiving device 36, and a control device 39. The light-receiving device 36 has a configuration similar to that of the light-receiving device 16 of the first example embodiment. Although the details are different, the control device 39 has a configuration substantially similar to that of the control device 39 of the first example embodiment. Hereinafter, the optical transmission device 30 different from that of the first example embodiment will be described in detail.
[Light-Sending Device]
A configuration of the optical transmission device 30 will be described with reference to the drawings. FIGS. 21 to 22 are conceptual diagrams illustrating an example of a configuration of the optical transmission device 30. The optical transmission device 30 includes a light source 31, a first spatial light modulator 331, a second spatial light modulator 332, a wave plate 34, and a curved surface mirror 35. The first spatial light modulator 331 includes a modulation part 3310. The second spatial light modulator 332 includes a modulation part 3320. The first spatial light modulator 331 and the second spatial light modulator 332 have the similar configuration. The first spatial light modulator 331 and the second spatial light modulator 332 are disposed in such a way that long sides thereof are perpendicular to each other. That is, the first spatial light modulator 331 and the second spatial light modulator 332 are disposed in such a way that polarization directions are orthogonal to each other. FIG. 21 is a side view of the internal configuration of the optical transmission device 30 as viewed from the lateral direction. FIG. 22 is a top view of the internal configuration of the optical transmission device 30 as viewed from above. In FIG. 22, the light source 31, the first spatial light modulator 331, and the second spatial light modulator 332 are illustrated, and the wave plate 34 and the curved surface mirror 35 are omitted. FIGS. 21 to 22 are conceptual diagrams illustrating a positional relationship among the components, and do not accurately represent the traveling direction of light or the like.

The light source 31 includes a first light emitter 311-1, a second light emitter 311-2, a first lens 312-1, and a second lens 312-2. The first light emitter 311-1 and the second light emitter 311-2 are disposed in such a way that the output axes do not cross each other in the optical path to the first spatial light modulator 331 and the second spatial light modulator 332.

The first light emitter 311-1 emits laser light 301-1 in a predetermined wavelength band toward the first lens 312-1 under the control of the control device 39. The laser light 301-1 emitted from the first light emitter 311-1 is polarized light. The first lens 312-1 is disposed on an optical path of the laser light 301-1 emitted from the first light emitter 311-1. The first lens 312-1 enlarges the laser light 301-1 emitted from the first light emitter 311-1 according to the size of the modulation part 3310 of the first spatial light modulator 331. Light 302-1 enlarged by the first lens 312-1 travels toward the modulation part 3310 of the first spatial light modulator 331.

The second light emitter 311-2 emits laser light 301-2 in a predetermined wavelength band toward the second lens 312-2 under the control of the control device 39. The laser light 301-2 emitted from the second light emitter 311-2 is polarized light. In the present example embodiment, the first spatial light modulator 331 and the second spatial light modulator 332 are disposed in such a way that polarization directions are orthogonal to each other. Therefore, the polarization direction of the laser light 301-1 emitted from the first light emitter 311-1 and the polarization direction of the laser light 301-2 emitted from the second light emitter 311-2 are set to be orthogonal to each other. The second lens 312-2 is disposed on an optical path of the laser light 301-2 emitted from the second light emitter 311-2. The second lens 312-2 enlarges the laser light 301-2 emitted from the second light emitter 311-2 according to the size of the modulation part 3320 of the second spatial light modulator 332. Light 302-2 enlarged by the second lens 312-2 travels toward the modulation part 3320 of the second spatial light modulator 332.

The wavelengths of the laser light 301-1 to 2 emitted from the first light emitter 311-1 and the second light emitter 311-2 are not particularly limited, and may be selected according to the application. The wavelengths of the laser light 301-1 to 2 may be the same or different. In the present example embodiment, since the light 302-1 to 2 is emitted toward the first spatial light modulator 331 and the second spatial light modulator 332 disposed in such a way that the polarization directions are orthogonal to each other, the polarization directions of the laser light 301-1 to 2 are also orthogonal to each other. For example, the first light emitter 311-1 and the second light emitter 311-2 emit the laser light 301-1 to 2 in visible and infrared wavelength bands. For example, in the case of near infrared rays of 800 to 900 nanometers (nm), the laser class can be increased, so that the sensitivity can be improved by about one digit as compared with other wavelength bands. For example, a high-output laser light source can be used for infrared rays in a wavelength band of 1.55 micrometers (μm). As an infrared laser light source in a wavelength band of 1.55 μm, an aluminum gallium arsenide phosphorus (AlGaAsP)-based laser light source, an indium gallium arsenide (InGaAs)-based laser light source, or the like can be used. The longer the wavelength of the laser light 301-1 to 2 is, the larger the diffraction angle can be made and the higher the energy can be set.

The first spatial light modulator 331 has a configuration similar to that of the spatial light modulator 13 of the first example embodiment. The first spatial light modulator 331 includes a modulation part 3310. The modulation part 3310 is irradiated with the light 302-1. As in the first and second example embodiments, modulation regions or sub-regions of equal to or more than two may be set in the modulation part 3310. The modulation part 3310 is irradiated with the light 302-1. The light 302-1 is modulated by the modulation part 3310 and emitted as modulated light 303-1.

The second spatial light modulator 332 has a configuration similar to that of the spatial light modulator 13 of the first example embodiment. The first spatial light modulator 331 and the second spatial light modulator 332 may have the same specifications or different specifications. In the present example embodiment, an example in which the first spatial light modulator 331 and the second spatial light modulator 332 have the same specifications will be described. The second spatial light modulator 332 includes the modulation part 3320. The modulation part 3320 is irradiated with the light 302-2. As in the first and second example embodiments, modulation regions or sub-regions of equal to or more than two may be set in the modulation part 3320. The modulation part 3320 is irradiated with the light 302-2. The light 302-2 is modulated by the modulation part 3320 and emitted as modulated light 303-2.

The first spatial light modulator 331 and the second spatial light modulator 332 are disposed in such a way that long sides thereof are perpendicular to each other. The surface of the modulation part 3310 of the first spatial light modulator 331 and the surface of the modulation part 3320 of the second spatial light modulator 332 are disposed in the same direction. The first spatial light modulator 331 and the second spatial light modulator 332 may be disposed at an interval, or may be disposed without an interval. A partition wall (not illustrated) may be disposed between the first spatial light modulator 331 and the second spatial light modulator 332. For example, the partition wall stands perpendicular to the surface of the modulation part 3310 of the first spatial light modulator 331 and the surface of the modulation part 3320 of the second spatial light modulator 332.

Figure 23:
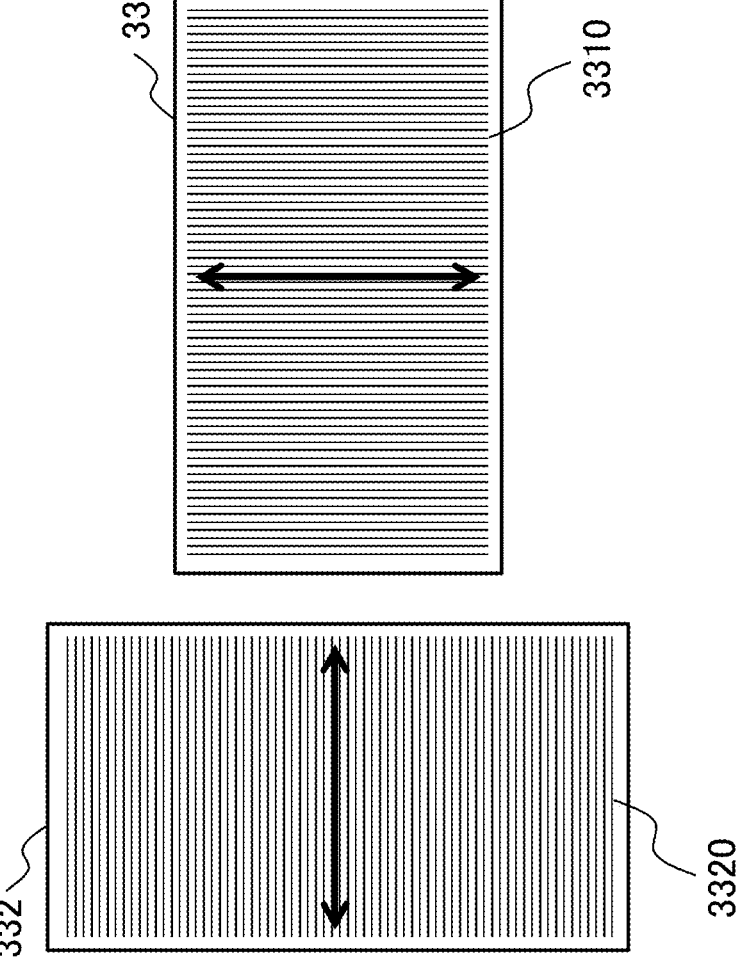
FIG. 23 is a conceptual diagram for describing an example of polarization directions of modulation parts of a first spatial light modulator and a second spatial light modulator of the optical transmission device included in the communication device of the third example embodiment.

FIG. 23 is a conceptual diagram illustrating an arrangement example of the first spatial light modulator 331 and the second spatial light modulator 332. The first spatial light modulator 331 and the second spatial light modulator 332 are disposed in such a way that long sides thereof are perpendicular to each other. In the example of FIG. 23, it is assumed that the first spatial light modulator 331 and the second spatial light modulator 332 have the same specifications. That is, in the case of arrangement as illustrated in FIG. 23, the polarization direction of the modulation part 3310 of the first spatial light modulator 331 and the polarization direction of the modulation part 3320 of the second spatial light modulator 332 are orthogonal to each other. A pattern (phase image) related to the image formed by the modulated light 303-1 is set in the modulation part 3310 of the first spatial light modulator 331. A phase image related to an image formed by the modulated light 303-2 is set in the modulation part 3320 of the second spatial light modulator 332. As illustrated in FIG. 23, when the first spatial light modulator 331 and the second spatial light modulator 332 are disposed in such a way that the long sides are perpendicular to each other, polarization multiplexing communication can be performed simultaneously with two communication targets.

Each of the modulation part 3310 of the first spatial light modulator 331 and the modulation part 3320 of the second spatial light modulator 332 is divided into a plurality of regions (also referred to as tiling). For example, each of the modulation part 3310 and the modulation part 3320 is divided into rectangular regions (also referred to as tiles) having a desired aspect ratio. Each of the plurality of tiles includes a plurality of pixels. A phase image is tiled to each of the plurality of tiles set in the modulation part 3310 and the modulation part 3320. For example, a phase image generated in advance is set in each of the plurality of tiles. A phase image related to a projected image is set to each of the plurality of tiles.

When the modulation part 3310 and the modulation part 3320 are irradiated with the light 302 in a state where the phase image is set for the plurality of tiles, the modulated light 303 that forms an image related to the phase image of each tile is emitted. As the number of tiles set in the modulation part 3310 and the modulation part 3320 increases, a clear image can be displayed. However, when the number of pixels of each tile decreases, the resolution decreases. Therefore, the size and number of tiles set in the modulation part 3310 and the modulation part 3320 are set according to the application.

The modulated light 303-1 modulated by modulation part 3310 and the modulated light 303-2 modulated by modulation part 3320 can be set to be mixed with each other or not mixed with each other after being emitted. The mixing situation of the modulated light 303-1 to 2 after being emitted from the modulation part 3310 and the modulation part 3320 can be set by adjusting the emission direction of light 302 from the light source 31.

The wave plate 34 is disposed between the first spatial light modulator 331 and the second spatial light modulator 332, and the curved surface mirror 35. The wave plate 34 is disposed at a position where the light 302-1 to 2 is not incident and the modulated light 303-1 to 2 modulated by the first spatial light modulator 331 and the second spatial light modulator 332 is incident. For example, the wave plate 34 may be disposed substantially parallel to the surfaces of the modulation part 3310 and the modulation part 3320 by the partition walls of the first and second example embodiments. In a case where circularly polarized light is emitted from the optical transmission device 30, a quarter-wave plate is used as the wave plate 34. Since the polarization directions of the modulated light 303-1 modulated by the first spatial light modulator 331 and the modulated light 303-2 modulated by the second spatial light modulator 332 are orthogonal to each other, when a single wave plate 34 (quarter-wave plate) is inserted, circularly polarized light of opposite rotation is obtained. When linearly polarized light is emitted from the optical transmission device 30, the wave plate 34 is not disposed. Since the polarization directions of the modulated light 303-1 modulated by the first spatial light modulator 331 and the modulated light 303-2 modulated by the second spatial light modulator 332 are orthogonal to each other, linearly polarized light orthogonal to each other can be obtained without the wave plate 34.

Figure 24:
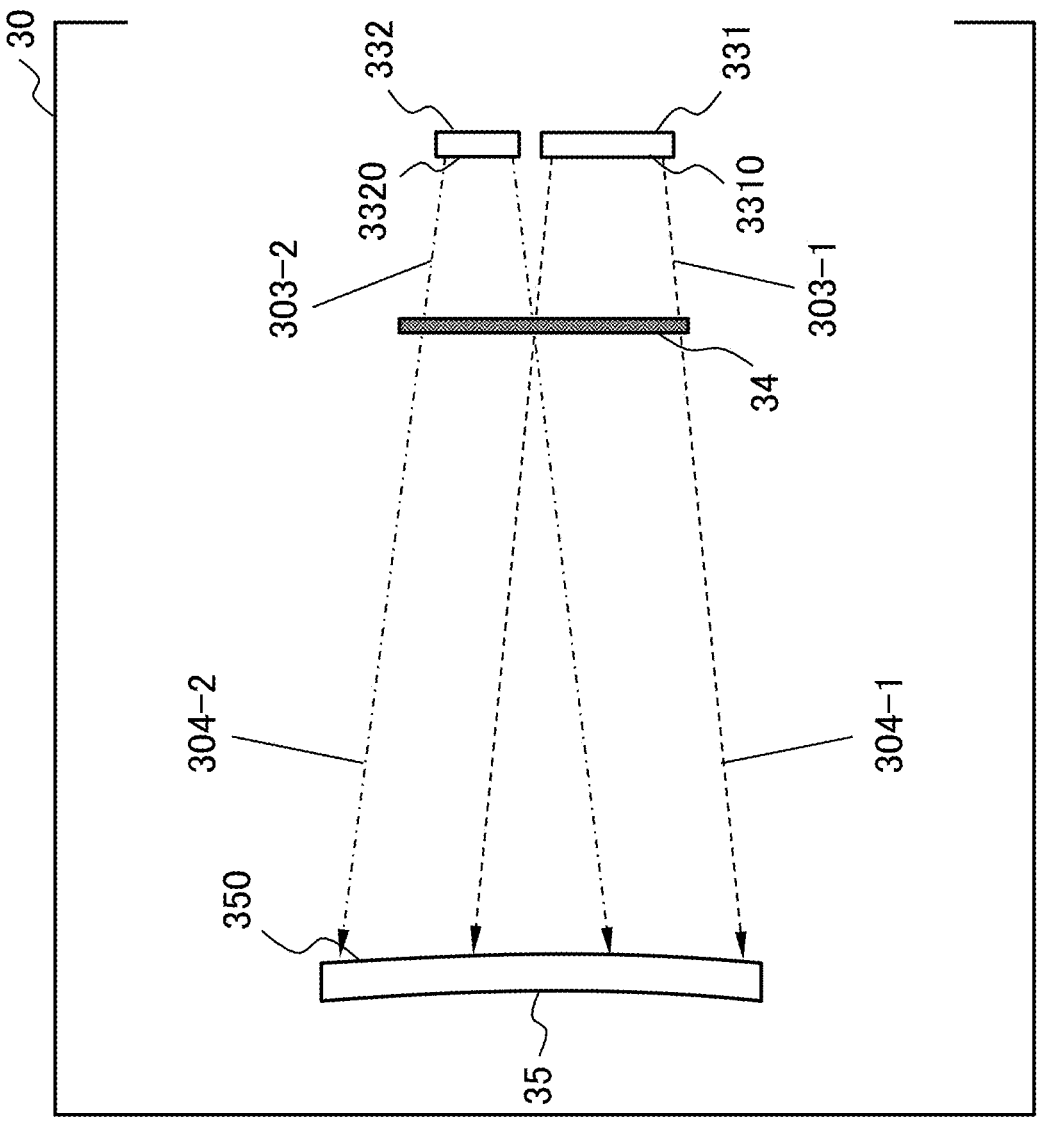
FIG. 24 is a conceptual diagram illustrating another example of an internal configuration of the optical transmission device included in the communication device of the third example embodiment as viewed from an upper viewpoint.

FIG. 24 is a conceptual diagram of the internal configuration of the optical transmission device 30 as viewed from above. In FIG. 24, the light source 31 is omitted. FIG. 24 is conceptual, and does not accurately represent the positional relationship between the components, the traveling direction of light, and the like.

The modulated light 303-1 modulated by the modulation part 3310 of the first spatial light modulator 331 passes through the wave plate 34 before reaching a reflection surface 350 of the curved surface mirror 35. The modulated light 303-1 having passed through the wave plate 34 turns to light 304-1 related to the polarization characteristic of the wave plate 34. The light 304-1 having passed through the wave plate 34 forms an image related to the phase image set in the modulation part 3310 of the first spatial light modulator 331 on the reflection surface 350 of the curved surface mirror 35.

The modulated light 303-2 modulated by the modulation part 3320 of the second spatial light modulator 332 passes through the wave plate 34 before reaching the reflection surface 350 of the curved surface mirror 35. The modulated light 303-2 having passed through the wave plate 34 turns to light 304-2 related to the polarization characteristic of the wave plate 34. The light 304-2 having passed through the wave plate 34 forms an image related to the phase image set in the modulation part 3320 of the second spatial light modulator 332 on the reflection surface 350 of the curved surface mirror 35.

The polarization states of the light 304-1 to 2 having passed through the wave plate 34 are different from each other. That is, the wave plate 34 changes the modulated light 303-1 to 2 into the light 304-1 to 2 in different polarization states. The light 304-1 to 2 having passed through the wave plate 34 can be separated on the reception side of the spatial optical signal because the polarization states are different.

The curved surface mirror 35 has a configuration similar to that of the curved surface mirror 15 of the first example embodiment. The curved surface mirror 35 is a reflecting mirror having the curved reflection surface 350. The reflection surface 350 of the curved surface mirror 35 has a curvature in accordance with the projection angle of projection light 305. In the example of FIG. 21, the reflection surface 350 of the curved surface mirror 35 has a shape of a side face of a cylinder. For example, the reflection surface 350 of the curved surface mirror 35 may be a spherical surface. For example, the reflection surface 350 of the curved surface mirror 35 may be a free-form surface. For example, the reflection surface 350 of the curved surface mirror 35 may have a shape in which a plurality of curved surfaces is combined instead of a single curved surface. For example, the reflection surface 350 of the curved surface mirror 35 may have a shape in which a curved surface and a flat face are combined.

The curved surface mirror 35 is disposed with the reflection surface 350 facing the modulation part 3310 of the first spatial light modulator 331 and the modulation part 3320 of the second spatial light modulator 332. In other words, curved surface mirror 35 is disposed on the optical paths of the modulated light 303-1 to 2. The reflection surface 350 of the curved surface mirror 35 is irradiated with the light 304-1 to 2 that has passed through the wave plate 34 in the modulated light 303-1 to 2 modulated by the modulation part 3310 of the first spatial light modulator 331 and the modulation part 3320 of the second spatial light modulator 332. The light 304-1 is light that has passed through the wave plate 34 in the modulated light 303-1 modulated by the modulation part 3310 of the first spatial light modulator 331. The light 304-2 is light that has passed through the wave plate 34 in the modulated light 303-2 modulated by the modulation part 3320 of the second spatial light modulator 332.

Figure 25:
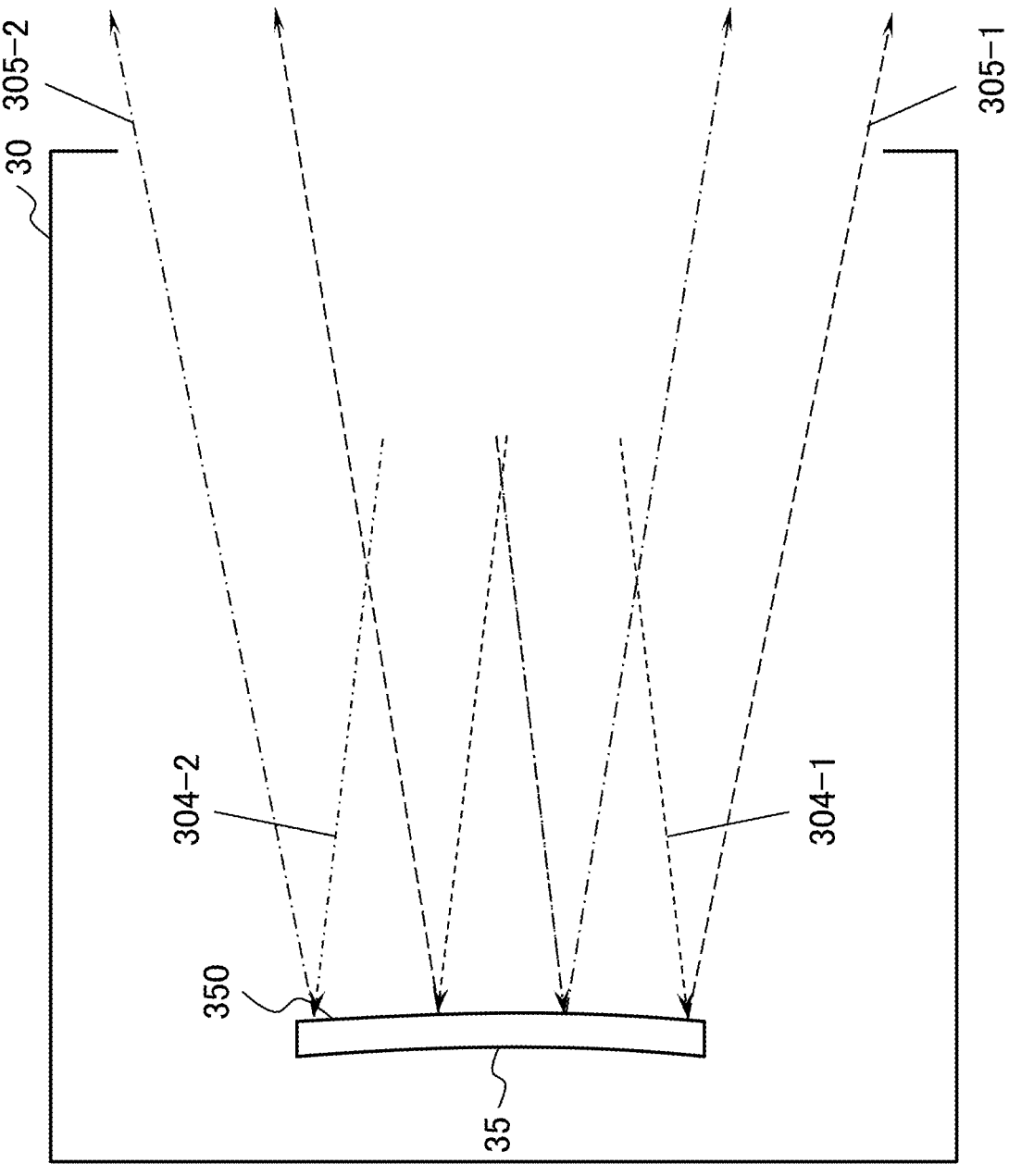
FIG. 25 is a conceptual diagram for describing projection light projected by the optical transmission device included in the communication device of the third example embodiment.

The light (projection light 305) reflected by the reflection surface 350 of the curved surface mirror 35 is enlarged and projected at an enlargement ratio in accordance with the curvature of the reflection surface 350. FIG. 25 is a conceptual diagram illustrating an example of projection of projection light 305 reflected by the reflection surface 350. FIG. 25 is conceptual, and does not accurately represent the traveling direction of light and the like. Projection light 305 is enlarged along the horizontal direction (the vertical direction of the sheet of FIG. 25) according to the curvature of the irradiation range of light 304 on the reflection surface 350 of the curved surface mirror 35. The reflection surface 350 is irradiated with each of the light 304-1 to 2 constituting the light 304. Each of the light 304-1 to 2 is individually reflected by the reflection surface 350. The light 304-1 is reflected by the reflection surface 350 and projected as the projection light 305-1. The light 304-2 is reflected by the reflection surface 350 and projected as the projection light 305-2. Each of the light 304-1 to 2 is projected as the projection light 305-1 to 2 at a projection angle in accordance with the curvature of the reflection surface 350. In the example of FIG. 25, the respective projection ranges of the projection light 305-1 to 2 overlap with each other, but the polarization states of the projection light 305-1 to 2 are different, so that the light can be separated on the reception side of the spatial optical signal.

For example, a shielder (not illustrated) or a 0th-order light remover (not illustrated) may be disposed on the optical paths of the modulated light 303, the light 304, and the projection light 305. Since the shielder and the 0th-order light remover are similar to those of the first example embodiment, the description thereof is omitted.

Figure 26:
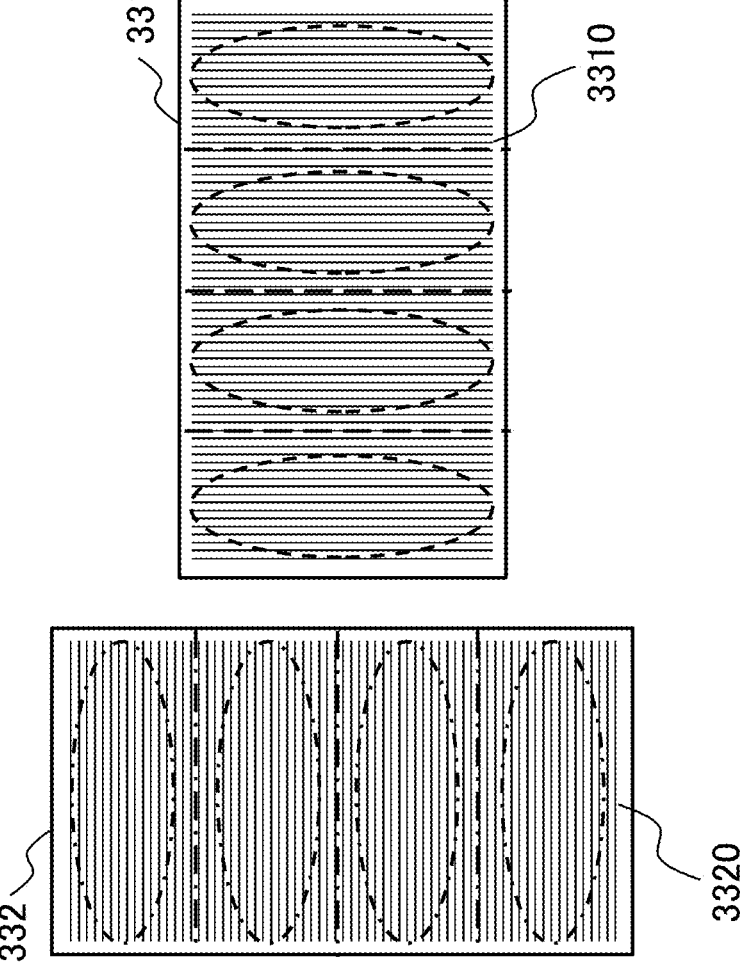
FIG. 26 is a conceptual diagram for describing an example of an irradiation range of light with which a modulation region is irradiated set in modulation parts of a first spatial light modulator and a second spatial light modulator of the optical transmission device included in the communication device of the third example embodiment.

FIG. 26 illustrates an example in which four irradiation ranges are set for each of the modulation part 3310 of the first spatial light modulator 331 and the modulation part 3320 of the second spatial light modulator 332. In the example of FIG. 26, it is assumed that the modulation part 3310 and the modulation part 3320 are irradiated with the light 302 based on laser light 301 emitted independently from eight light emitters 311 (not illustrated). Each of the modulation part 3310 and the modulation part 3320 is irradiated with the light 302 based on the laser light 301 emitted from four light emitters 311 (not illustrated). In FIG. 26, the irradiation range of the light 302 is indicated by an ellipse. As illustrated in FIG. 26, four irradiation ranges are set for each of the modulation part 3310 and the modulation part 3320. By setting different phase images in the respective irradiation ranges, polarization multiplexing communication can be performed simultaneously with the four communication targets.

Figure 27:
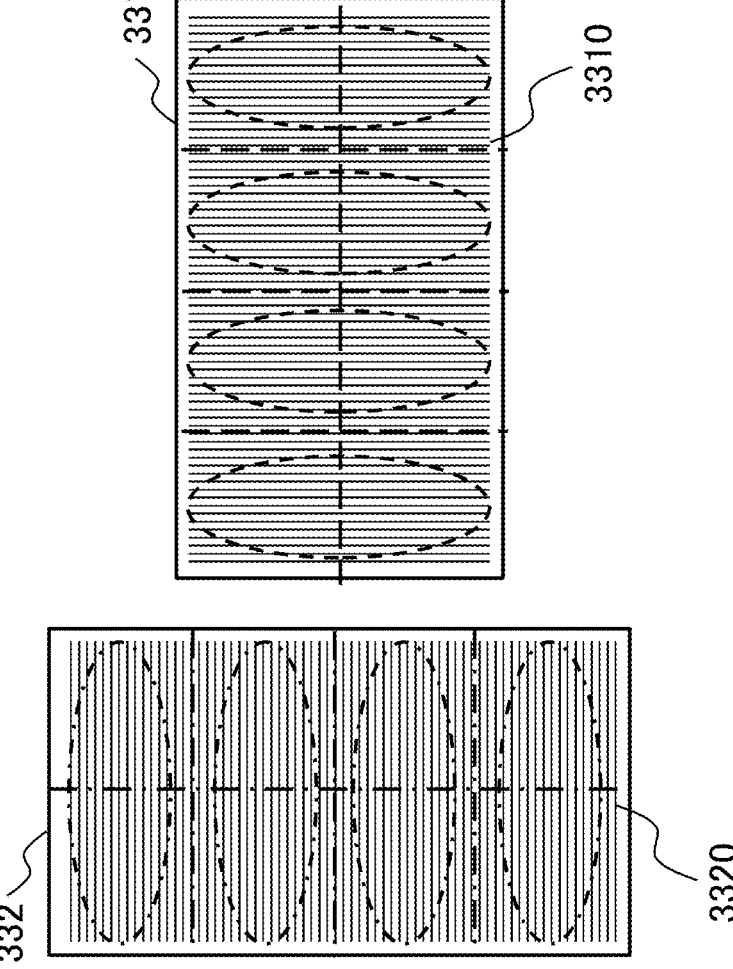
FIG. 27 is a conceptual diagram for describing an example of dividing modulation regions set in modulation parts of a first spatial light modulator and a second spatial light modulator of the optical transmission device included in a communication device of the third example embodiment.

FIG. 27 illustrates another example in which four irradiation ranges are set for each of the modulation part 3310 of the first spatial light modulator 331 and the modulation part 3320 of the second spatial light modulator 332. In the example of FIG. 27, it is assumed that the modulation part 3310 and the modulation part 3320 are irradiated with the light 302 based on the laser light 301 emitted independently from eight light emitters 311 (not illustrated). Each of the modulation part 3310 and the modulation part 3320 is irradiated with the light 302 based on the laser light 301 emitted from four light emitters 311 (not illustrated). In FIG. 27, the irradiation range of the light 302 is indicated by an ellipse. In the example of FIG. 27, each of the modulation part 3310 and the modulation part 3320 is divided into eight. A pattern (phase image) related to an image formed by the radiated light 302 is set in each of the eight divided regions of the modulation part 3310. Phase images related to the images formed by the radiated light 302 are also set in the respective regions of the eight divided modulation parts 3320. In the example of FIG. 27, two regions in the minor axis direction are irradiated with the same light 302. As illustrated in FIG. 27, when each of the modulation part 3310 and the modulation part 3320 is divided into eight, and different phase images are set in the respective irradiation ranges, polarization multiplexing communication can be performed simultaneously with the eight communication targets.

As described above, the communication device of the present example embodiment includes the optical transmission device, the light-receiving device, and the control device. The optical transmission device includes the light source, the spatial light modulator, the wave plate, and the curved surface mirror. The light source includes a first light emitter and a second light emitter. The first light emitter and the second light emitter emit light toward the modulation part of the spatial light modulator. The spatial light modulator includes a first spatial light modulator and a second spatial light modulator. The first spatial light modulator and the second spatial light modulator are disposed in such a way that polarization directions are not parallel to each other. Each of the first spatial light modulator and the second spatial light modulator has a modulation part in which a modulation region irradiated with the light emitted from the light source is set. A first modulation region is set in the modulation part of the first spatial light modulator. A second modulation region is set in the modulation part of the second spatial light modulator. The first spatial light modulator and the second spatial light modulator modulate the phases of the radiated light by respective modulation parts. The wave plate converts the modulated light modulated in the first modulation region set in the modulation part of the first spatial light modulator and the modulated light modulated in the second modulation region set in the modulation part of the second spatial light modulator into polarization states different from each other. The curved surface mirror has a curved reflection surface irradiated with modulated light modulated in the first modulation region and the second modulation region. The curved surface mirror reflects the modulated light on the reflection surface, and projects projection light having an enlarged projection angle according to the curvature of the reflection surface. The light-receiving device receives a spatial optical signal transmitted from another communication device. The control device sets a pattern for forming a spatial optical signal to be transmitted toward another communication device in the modulation parts of the first spatial light modulator and the second spatial light modulator of the optical transmission device. The control device controls the light source in such a way that the modulation parts of the first spatial light modulator and the second spatial light modulator in which the patterns are set are irradiated with the light. The control device acquires a signal derived from the spatial optical signal received by the light-receiving device.

The optical transmission device of the present example embodiment converts the modulated light modulated in the modulation regions set in the modulation parts of the first spatial light modulator and the second spatial light modulator into polarization states different from each other. The projection light projected from the optical transmission device of the present example embodiment includes light components converted into polarization states different from each other. Therefore, the optical transmission device of the present example embodiment can simultaneously transmit a plurality of spatial optical signals different for each polarization state. That is, according to the present example embodiment, it is possible to implement optical spatial communication using multiplexed spatial optical signals. According to the optical transmission device of the present example embodiment, since the polarization directions of the first spatial light modulator and the second spatial light modulator are different from each other, clockwise/counter-clockwise circularly polarized light can be transmitted using a single quarter-wave plate. Furthermore, according to the optical transmission device of the present example embodiment, by allocating the light emitted from the plurality of light emitters to the modulation parts of the first spatial light modulator and the second spatial light modulator, it is possible to communicate with more communication targets.

Fourth Example Embodiment

Next, a communication device according to a fourth example embodiment will be described with reference to the drawings. The communication device according to the present example embodiment performs optical spatial communication using spatial optical signals of a plurality of wavelength bands.
(Configuration)

Figure 28:
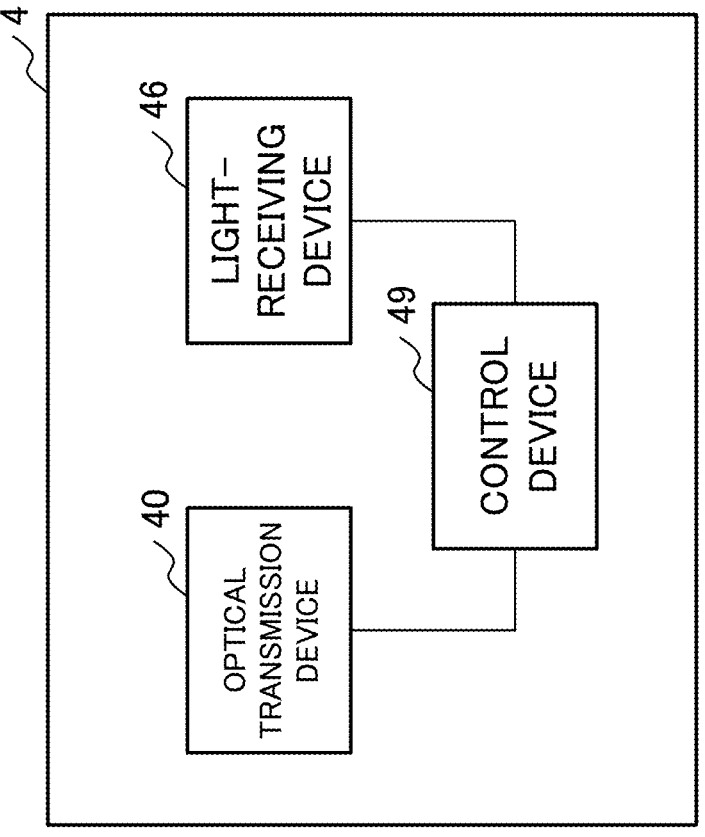
FIG. 28 is a block diagram illustrating an example of a configuration of a communication device according to a fourth example embodiment.

FIG. 28 is a block diagram illustrating an example of a configuration of a communication device 4 of the present example embodiment. The communication device 4 of the present example embodiment includes an optical transmission device 40, a light-receiving device 46, and a control device 49. Hereinafter, the optical transmission device 40 and the light-receiving device 46 will be individually described. Although the details are different, the control device 49 has a configuration similar to that of the control device 19 of the first example embodiment, and thus the description thereof will be omitted.
[Light-Sending Device]

Figure 29:
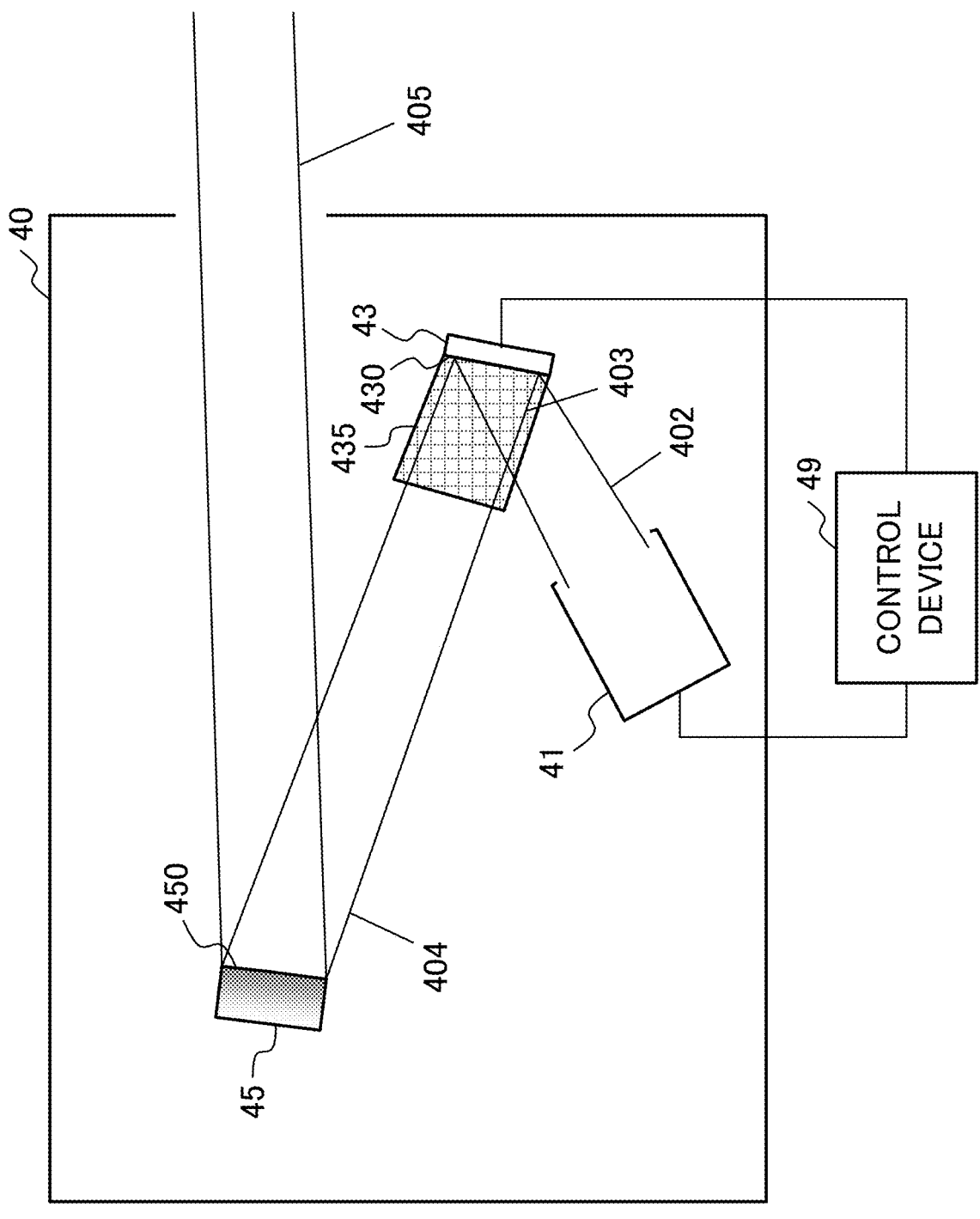
FIG. 29 is a conceptual diagram illustrating an example of a configuration of an optical transmission device included in the communication device according to the fourth example embodiment.
Figure 30:
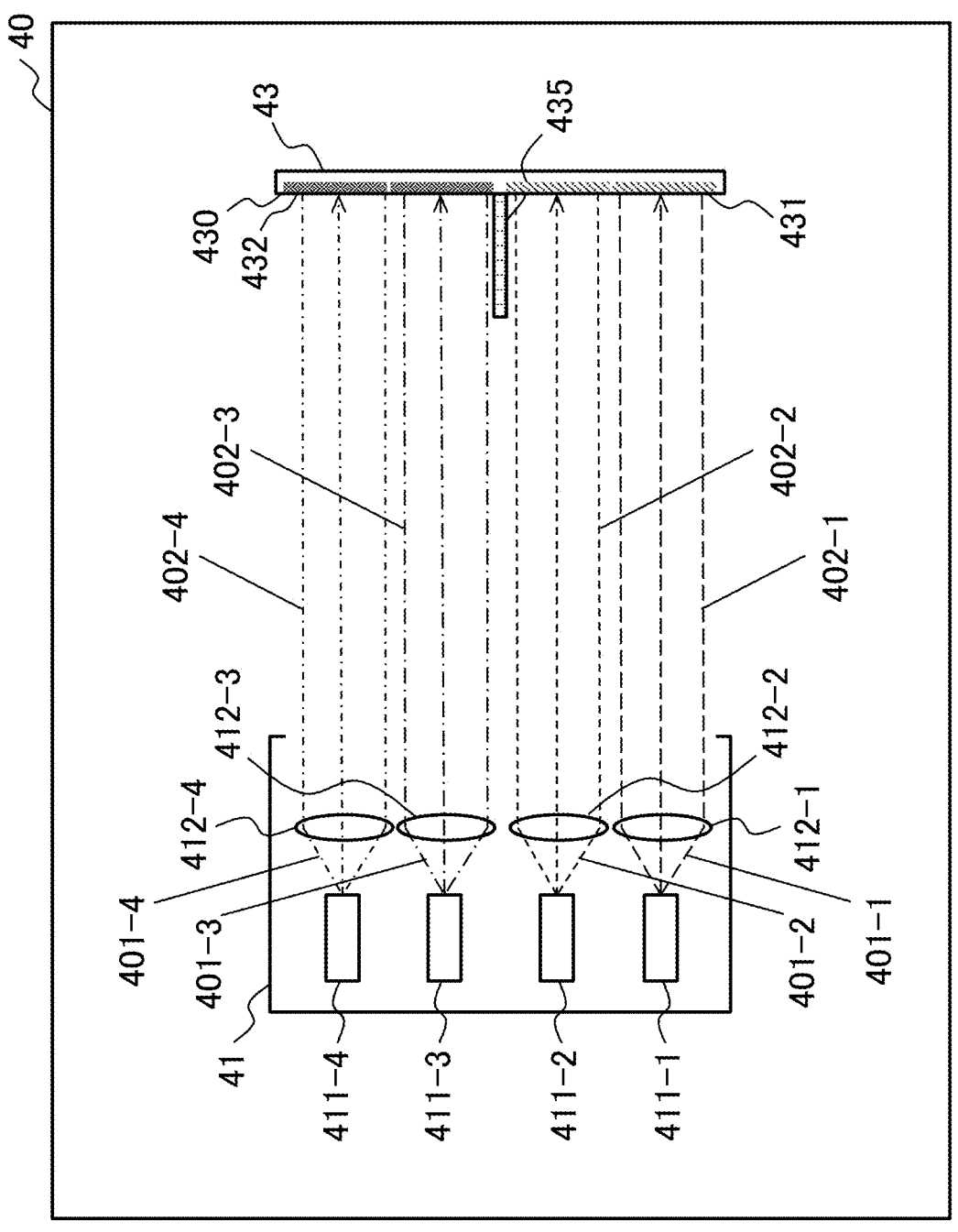
FIG. 30 is a conceptual diagram illustrating an example of an internal configuration of the optical transmission device included in the communication device according to the fourth example embodiment as viewed from an upper viewpoint.

First, a configuration of the optical transmission device 40 will be described with reference to the drawings. FIGS. 29 to 30 are conceptual diagrams illustrating an example of a configuration of the optical transmission device 40. The optical transmission device 40 includes a light source 41, a spatial light modulator 43, and a curved surface mirror 45. The spatial light modulator 43 includes a modulation part 430. A first modulation region 431 and a second modulation region 432 are set in the modulation part 430 of the spatial light modulator 43. Two sub-regions (first sub-region, second sub-region) are set in each of the first modulation region 431 and the second modulation region 432. FIG. 29 is a side view of the internal configuration of the optical transmission device 40 as viewed from the lateral direction. FIG. 30 is a top view of the internal configuration of the optical transmission device 40 as viewed from above. In FIG. 30, the light source 41 and the spatial light modulator 43 are illustrated, and the curved surface mirror 45 is omitted. FIGS. 29 to 30 are conceptual, and do not accurately represent the positional relationship between the components, the traveling direction of light, and the like.

The light source 41 includes a plurality of light emitters and a plurality of lenses. The plurality of light emitters includes a first light emitter 411-1, a second light emitter 411-2, a third light emitter 411-3, and a fourth light emitter 411-4. The first light emitter 411-1, the second light emitter 411-2, the third light emitter 411-3, and the fourth light emitter 411-4 emit light in different wavelength bands. The plurality of lenses includes a first lens 412-1, a second lens 412-2, a third lens 412-3, and a fourth lens 412-4. The first light emitter 411-1, the second light emitter 411-2, the third light emitter 411-3, and the fourth light emitter 411-4 are disposed in such a way that the output axes do not intersect with each other in the optical path to the spatial light modulator 43. The light emitted from the plurality of light emitters is modulated with different phase images set in different modulation regions (sub-regions) allocated to the modulation part 430 of the spatial light modulator 43, and is projected in the same direction.

The first light emitter 411-1 emits laser light 401-1 in a predetermined wavelength band toward the first lens 412-1 under the control of the control device 49. The wavelength band of the laser light 401-1 is L1. The laser light 401-1 emitted from the first light emitter 411-1 is polarized light. The first lens 412-1 is disposed on an optical path of the laser light 401-1 emitted from the first light emitter 411-1. The first lens 412-1 enlarges the laser light 401-1 emitted from the first light emitter 411-1 according to the size of the first sub-region of the first modulation region 431 of the modulation part 430 of the spatial light modulator 43. Light 402-1 enlarged by the first lens 412-1 travels toward the first sub-region of the first modulation region 431.

The second light emitter 411-2 emits laser light 401-2 in a predetermined wavelength band toward the second lens 412-2 under the control of the control device 49. The wavelength band of the laser light 401-2 is L2. The laser light 401-2 emitted from the second light emitter 411-2 is polarized light. The second lens 412-2 is disposed on an optical path of the laser light 401-2 emitted from the second light emitter 411-2. The second lens 412-2 enlarges the laser light 401-2 emitted from the second light emitter 411-2 according to the size of the second sub-region of the first modulation region 431 of the modulation part 430 of the spatial light modulator 43. The first sub-region and the second sub-region are set at different positions in the first modulation region 431. Light 402-2 enlarged by the second lens 412-2 travels toward the second sub-region of the first modulation region 431. Different sub-regions included in the same first modulation region 431 are irradiated with the light 402-1 and the light 402-2.

The third light emitter 411-3 emits laser light 401-3 in a predetermined wavelength band toward the third lens 412-3 under the control of the control device 49. The wavelength band of the laser light 401-3 is L3. The laser light 401-3 emitted from the third light emitter 411-3 is polarized light.

The third lens 412-3 is disposed on an optical path of the laser light 401-3 emitted from the third light emitter 411-3. The third lens 412-3 enlarges the laser light 401-3 emitted from the third light emitter 411-3 according to the size of the first sub-region of the second modulation region 432 of the modulation part 430 of the spatial light modulator 43. Light 402-3 enlarged by the third lens 412-3 travels toward the first sub-region of the second modulation region 432.

The fourth light emitter 411-4 emits laser light 401-4 in a predetermined wavelength band toward the fourth lens 412-4 under the control of the control device 49. The wavelength band of the laser light 401-2 is L4. The laser light 401-4 emitted from the fourth light emitter 411-4 is polarized light. The polarization directions of the light with which the modulation part 430 of the spatial light modulator 43 is irradiated are required to be set to be the same. Therefore, the polarization directions of the laser light 401-1 to 4 are set to be the same in the modulation part 430. The fourth lens 412-4 is disposed on an optical path of the laser light 401-4 emitted from the fourth light emitter 411-4. The fourth lens 412-4 enlarges the laser light 401-4 emitted from the fourth light emitter 411-4 according to the size of the second sub-region of the second modulation region 432 of the modulation part 430 of the spatial light modulator 43. The first sub-region and the second sub-region are set at different positions in the second modulation region 432. Light 402-4 enlarged by the fourth lens 412-4 travels toward the second sub-region of the second modulation region 432. Different sub-regions included in the same second modulation region 432 are irradiated with the light 402-3 and the light 402-4.

Wavelength bands of the laser light 401-1 to 4 emitted from the first light emitter 411-1, the second light emitter 411-2, the third light emitter 411-3, and the fourth light emitter 411-4, respectively, are different from each other. In the present example embodiment, since the light 402-1 to 4 is emitted toward the same spatial light modulator 43, polarization directions of the laser light 401-1 to 4 emitted to the modulation part 430 are the same. For example, the first light emitter 411-1, the second light emitter 411-2, the third light emitter 411-3, and the fourth light emitter 411-4 emit the laser light 401-1 to 4 in visible and infrared wavelength bands. For example, in the case of near infrared rays of 800 to 900 nanometers (nm), the laser class can be increased, so that the sensitivity can be improved by about one digit as compared with other wavelength bands. For example, a high-output laser light source can be used for infrared rays in a wavelength band of 1.55 micrometers (μm). As an infrared laser light source in a wavelength band of 1.55 μm, an aluminum gallium arsenide phosphorus (AlGaAsP)-based laser light source, an indium gallium arsenide (InGaAs)-based laser light source, or the like can be used. The longer the wavelengths of the laser light 401-1 to 4 are, the larger the diffraction angle can be made and the higher the energy can be set.

The spatial light modulator 43 has a configuration similar to that of the spatial light modulator 13 of the first example embodiment. The spatial light modulator 43 includes the modulation part 430. The first modulation region 431 and the second modulation region 432 are set in the modulation part 430. Each of the first modulation region 431 and the second modulation region 432 is divided into at least two sub-regions. The first modulation region 431 is irradiated with the light 402-1 to 2. Different sub-regions of the first modulation region 431 are irradiated with the light 402-1 to 2. The light 402-1 to 2 is modulated by different sub-regions of the first modulation region 431 and emitted as the modulated light 403-1 to 2. The second modulation region 432 is irradiated with the light 402-3 to 4. Different sub-regions of the second modulation region 432 are irradiated with the light 402-3 to 4. The light 402-3 to 4 are modulated by different sub-regions of the second modulation region 432 and emitted as the modulated light 403-3 to 4.

A partition wall 435 is disposed between the first modulation region 431 and the second modulation region 432. The partition wall 435 stands perpendicular to the surface of the modulation part 430. The partition wall 435 divides the modulation part 430 into two in such a way that the modulated light 403-1 to 2 modulated in the first modulation region 431 and the modulated light 403-3 to 4 modulated in the second modulation region 432 are not mixed immediately after being modulated by the modulation part 430. A pattern (also referred to as a phase image) for modulating the light 402-1 to 4 to the modulated light 403-1 to 4 is set in each of the plurality of sub-regions allocated to the first modulation region 431 and the second modulation region 432 under the control of the control device 49. When the spatial light modulator 43 is used, a high-order image is generated as in the diffraction grating because the diffraction phenomenon is used. The high-order image is not clear due to low power, but it is difficult to make them completely invisible. The partition wall 435 prevents a high-order image that can be displayed on the face to be projected from generating.

Figure 31:
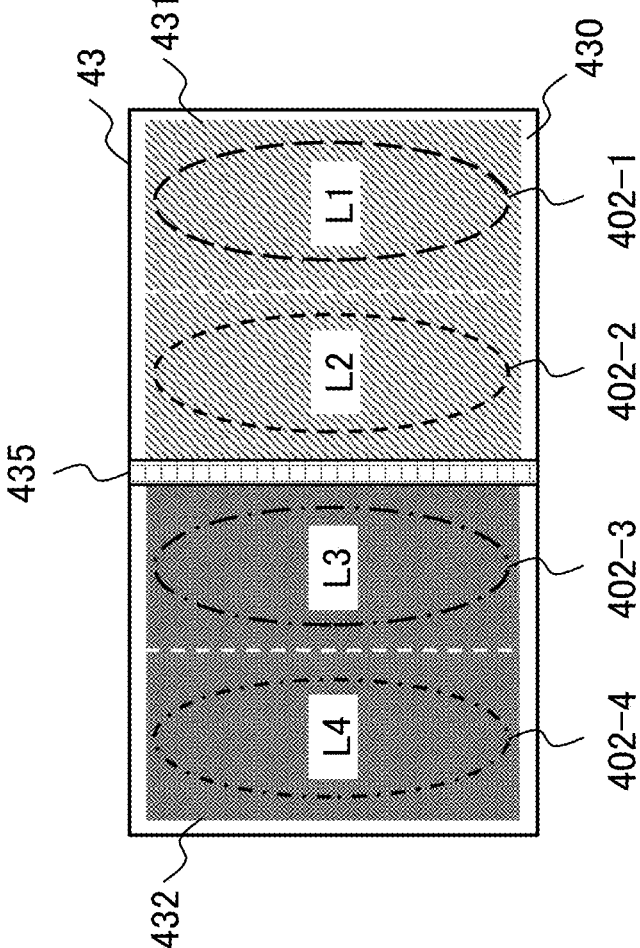
FIG. 31 is a conceptual diagram for describing an example of an irradiation range of light with which a modulation region is irradiated set in a modulation part of a spatial light modulator of the optical transmission device included in the communication device of the fourth example embodiment.

FIG. 31 illustrates an example of the first modulation region 431 and the second modulation region 432 set in the modulation part 430 of the spatial light modulator 43. FIG. 31 illustrates wavelength bands (L1, L2, L3, L4) of light 402-1 to 4 applied to the inside of the irradiation regions of light 402-1 to 4 with which the first modulation region 431 and the second modulation region 432 are irradiated. A phase image related to an image formed by each of the modulated light 403-1 to 2 is set in each of the two sub-regions allocated to the first modulation region 431. A phase image related to an image formed by each of the modulated light 403-3 to 4 is set in each of the two sub-regions allocated to the second modulation region 432. The phase images set in the plurality of sub-regions allocated to the first modulation region 431 and the second modulation region 432 may be the same or different. As illustrated in FIG. 31, when light 402-1 to 4 in four different wavelength bands is used, wavelength multiplexing communication can be performed simultaneously with four communication targets.

Each of the first modulation region 431 and the second modulation region 432 allocated to the modulation part 430 of the spatial light modulator 43 is divided into a plurality of regions (also referred to as tiling). For example, each of the first modulation region 431 and the second modulation region 432 is divided into rectangular regions (also referred to as tiles) having a desired aspect ratio. Each of the plurality of tiles includes a plurality of pixels. The phase image is tiled in each of the plurality of tiles included in at least two sub-regions set in each of the first modulation region 431 and the second modulation region 432. For example, a phase image generated in advance is set in each of the plurality of tiles. A phase image related to a projected image is set to each of the plurality of tiles.

When the modulation part 430 is irradiated with the light 402 in a state where the phase images are set for the plurality of tiles, the modulated light 403 that forms an image related to the phase image of each tile is emitted. As the number of tiles set in the modulation part 430 increases, a clear image can be displayed. However, when the number of pixels of each tile decreases, the resolution decreases. Therefore, the size and number of tiles set in the modulation part 430 are set according to the application.

The modulated light 403-1 to 2 modulated in the first modulation region 431 and the modulated light 403-3 to 4 modulated in the second modulation region 432 are separated by the partition wall 435 immediately after being emitted from the modulation part 430. The modulated light 403-1 to 2 and the modulated light 403-3 to 4 can be set in such a way as to be mixed with each other, or can be set in such a way as not to be mixed with each other after being emitted from modulation part 430. The mixing situation of the modulated light 403-1 to 4 after being emitted from modulation part 430 can be set by adjusting the emission direction of light 402 from the light source 41.

Figure 32:
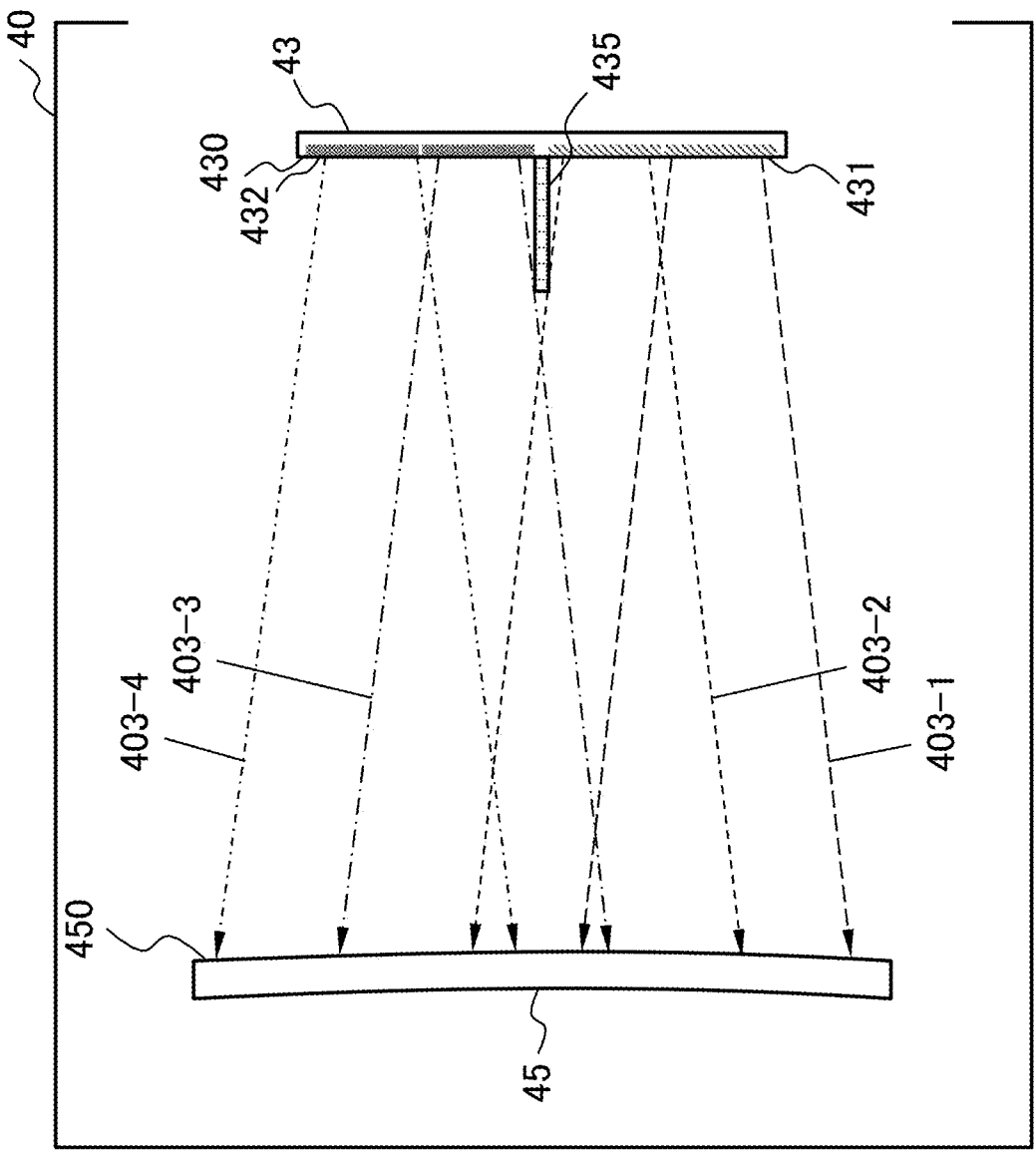
FIG. 32 is a conceptual diagram illustrating another example of an internal configuration of the optical transmission device included in the communication device of the fourth example embodiment as viewed from an upper viewpoint.

FIG. 32 is a conceptual diagram of the internal configuration of the optical transmission device 40 as viewed from above. In FIG. 32, the light source 41 is omitted. FIG. 32 is conceptual, and does not accurately represent the positional relationship between the components, the traveling direction of light, and the like. The modulated light 403-1 to 2 modulated in first modulation region 431 form an image related to the phase image set in the sub-region of the first modulation region 431 on a reflection surface 450 of the curved surface mirror 45. The modulated light 403-3 to 4 modulated in second modulation region 432 form an image related to the phase image set in the sub-region of the second modulation region 432 on the reflection surface 450 of the curved surface mirror 45. The modulated light 403-1 to 4 is light in different wavelength bands.

The curved surface mirror 45 is disposed with the reflection surface 450 facing modulation part 430 of the spatial light modulator 43. In other words, curved surface mirror 45 is disposed on the optical paths of the modulated light 403-1 to 4. The reflection surface 450 of the curved surface mirror 45 is irradiated with the modulated light 403-1 to 4 modulated by the modulation part 430 of the spatial light modulator 43.

Figure 33:
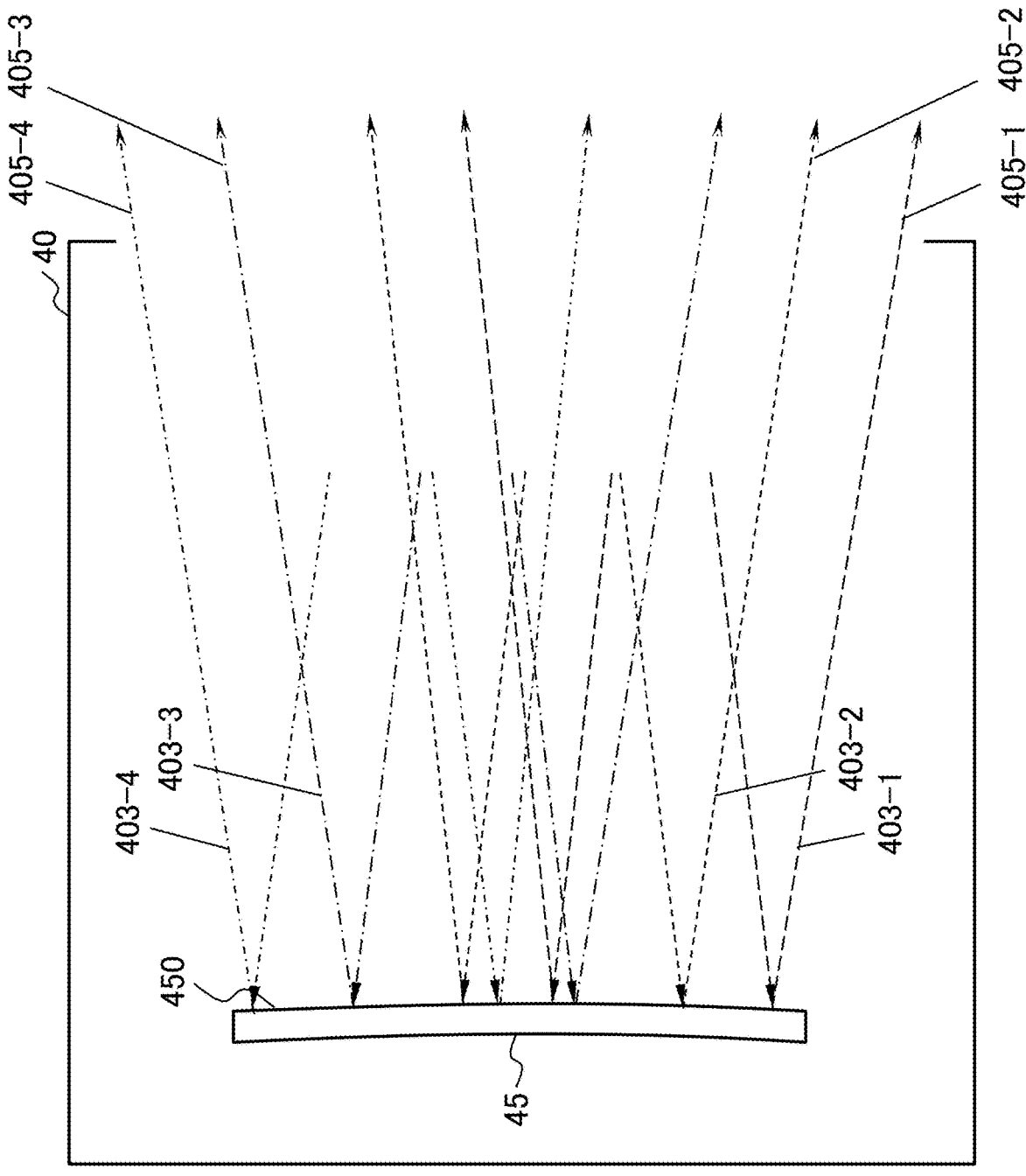
FIG. 33 is a conceptual diagram for describing projection light projected by the optical transmission device included in the communication device of the fourth example embodiment.

The light (projection light 405) reflected by the reflection surface 450 of the curved surface mirror 45 is enlarged and projected at an enlargement ratio in accordance with the curvature of the reflection surface 450. FIG. 33 is a conceptual diagram illustrating an example of projection of the projection light 405 reflected by the reflection surface 450. FIG. 33 is conceptual, and does not accurately represent the traveling direction of light and the like. The projection light 405 is enlarged along the horizontal direction (the vertical direction of the sheet of FIG. 33) according to the curvature of the irradiation range of the modulated light 403 on the reflection surface 450 of the curved surface mirror 45. The reflection surface 450 is irradiated with each of the modulated light 403-1 to 4. Each of the modulated light 403-1 to 4 is individually reflected by the reflection surface 450. The modulated light 403-1 is reflected by the reflection surface 450 and projected as the projection light 405-1. The modulated light 403-2 is reflected by the reflection surface 450 and projected as the projection light 405-2. The modulated light 403-3 is reflected by the reflection surface 450 and projected as the projection light 405-3. The modulated light 403-4 is reflected the by the reflection surface 450 and projected as the projection light 405-4. Each of the modulated light 403-1 to 4 is projected as the projection light 405-1 to 4 at a projection angle in accordance with the curvature of the reflection surface 450. In the example of FIG. 33, the projection ranges of the projection light 405-1 to 4 overlap with each other, but the wavelength bands of the projection light 405-1 to 4 are different from each other, so that the light can be separated. The projection light 405-1 to 4 may be projected in different directions in which projection ranges do not overlap each other.

For example, a shielder (not illustrated) or a 0th-order light remover (not illustrated) may be disposed on the optical path of the modulated light 403 or the projection light 405. Since the shielder and the 0th-order light remover are similar to those of the first example embodiment, the description thereof is omitted.

Figure 34:
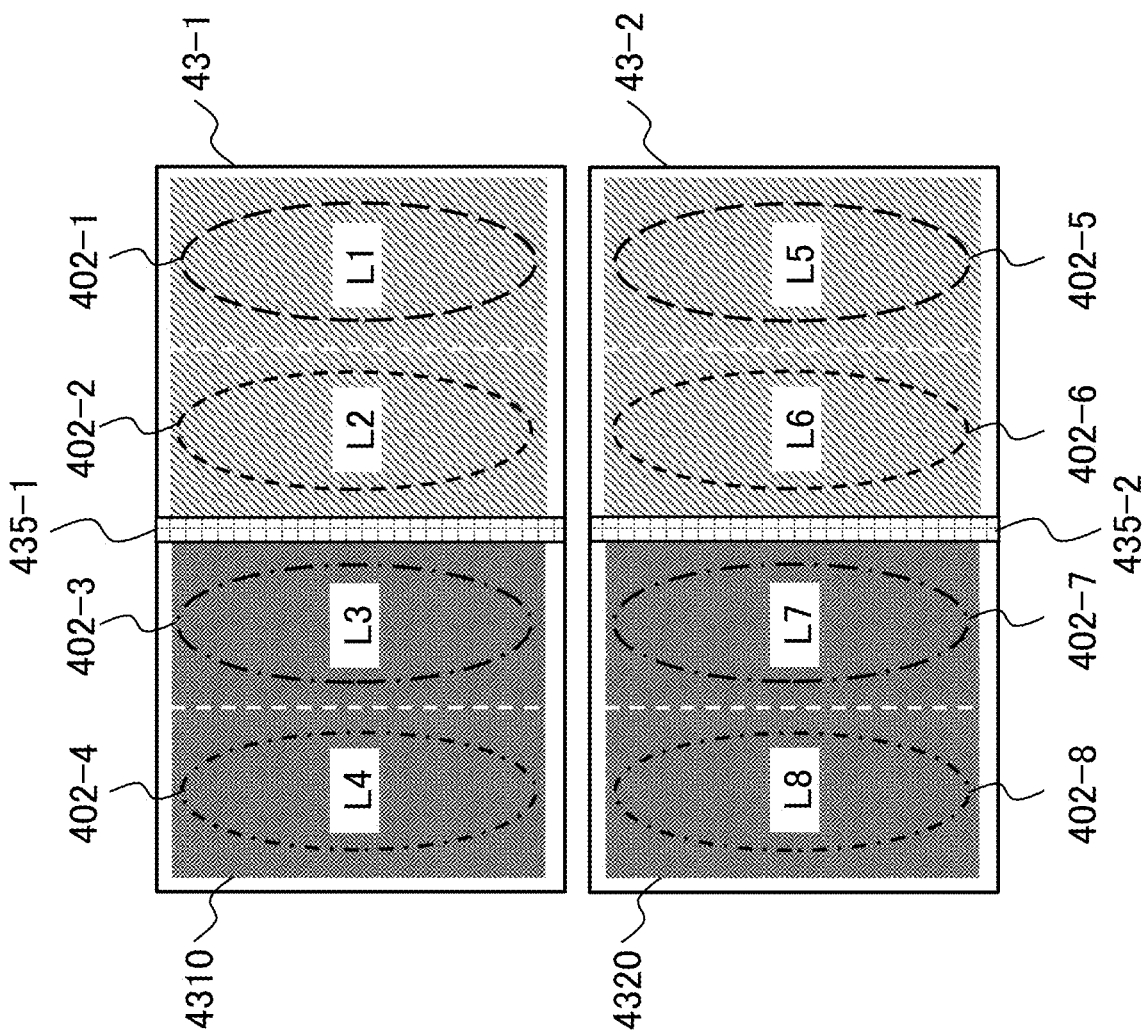
FIG. 34 is a conceptual diagram for describing an example of a configuration of a spatial light modulator of the optical transmission device included in the communication device of the fourth example embodiment.

FIG. 34 illustrates an example in which two spatial light modulators 43 (first spatial light modulator 43-1, second spatial light modulator 43-2) are used. In the example of FIG. 34, two spatial light modulators 43 (first spatial light modulator 43-1, second spatial light modulator 43-2) are irradiated with the light 402-1 to 8 in eight wavelength bands from eight light sources 41 (not illustrated). A modulation part 4310 of the first spatial light modulator 43-1 is irradiated with the light 402-1 to 4. The modulation part 4310 of the first spatial light modulator 43-1 is divided into sub-regions associated with the light 402-1 to 4. A modulation part 4320 of the second spatial light modulator 43-2 is irradiated with the light 402-5 to 8. The modulation part 4320 of the second spatial light modulator 43-2 is divided into sub-regions associated with the light 402-5 to 8. FIG. 34 illustrates wavelength bands (L1, L2, L3, L4, L5, L6, L7, L8) of the light 402-1 to 8 inside irradiation regions of the light 402-1 to 8 with which the first spatial light modulator 43-1 and the second spatial light modulator 43-2 are irradiated. Phase images related to the light 402-1 to 8 are set in the plurality of sub-regions set in the modulation part 4310 of the first spatial light modulator 43-1 and the modulation part 4320 of the second spatial light modulator 43-2. In a state in which the phase images are set in the plurality of sub-regions of the modulation part 4310 and the modulation part 4320, the sub-regions associated are irradiated with the light 402-1 to 8, whereby the modulated light 403-1 to 8 is emitted.

In the example of FIG. 34, a partition wall 435-1 is provided in the first spatial light modulator 43-1, and a partition wall 435-2 is provided in the second spatial light modulator 43-2. As illustrated in FIG. 34, when the two spatial light modulators 43 (first spatial light modulator 43-1, second spatial light modulator 43-2) are used to irradiate each of the two spatial light modulators 43 with light 402 in four wavelength bands, wavelength multiplexing communication can be performed simultaneously with the eight communication targets. For example, in a case where two of the light 402 in the eight wavelength bands are used for communication with the same communication target, wavelength multiplexing communication can be performed simultaneously with the four communication targets.

[Light-Receiving Device]

Figure 35:
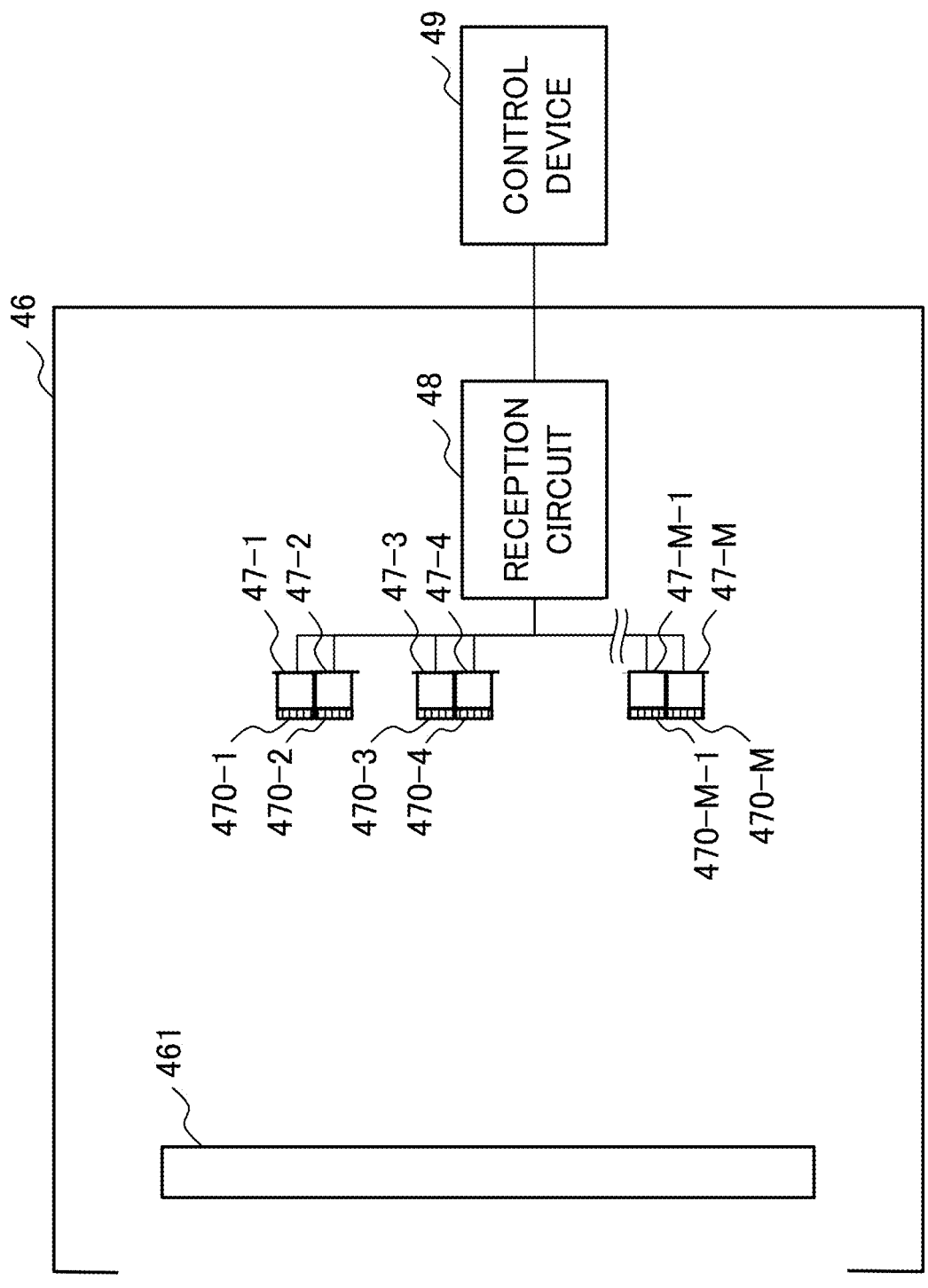
FIG. 35 is a conceptual diagram illustrating an example of a configuration of the light-receiving device included in the communication device according to the fourth example embodiment.

Next, a configuration of the light-receiving device 46 will be described with reference to the drawings. FIG. 35 is a conceptual diagram for describing a configuration of the light-receiving device 46. The light-receiving device 46 includes a concentrator 461, a plurality of light receiving elements 47-1 to M, a plurality of light receiving filters 470-1 to M, and a reception circuit 48 (M is a natural number of equal to or more than two). The plurality of light receiving elements 47-1 to M is disposed in such a way that two light receiving elements 47 form a pair. The pair of two light receiving elements 47 is disposed adjacent to each other. The pair of two light receiving elements 47 receives polarization-multiplexed optical signals transmitted from the same transmission source. FIG. 35 is a plan view of the internal configuration of the light-receiving device 46 when viewed from above. The position of the reception circuit 48 is not particularly limited. The reception circuit 48 may be disposed inside the light-receiving device 46 or may be disposed outside the light-receiving device 46. The control device 49 may include the function of the reception circuit 48.

The concentrator 461 is an optical element that collects a spatial optical signal arriving from the outside. The spatial optical signal is incident on the incident surface of the concentrator 461. The optical signal collected by the concentrator 461 is collected toward a region where the plurality of light receiving elements 47-1 to M is disposed. For example, the concentrator 461 is a lens that collects an incident spatial optical signal. For example, the concentrator 461 is a light beam control element that guides the incident spatial optical signal toward the light receiving units of the plurality of light receiving elements 47-1 to M. For example, the concentrator 461 may have a configuration in which a lens or a light beam control element is combined. The configuration of the concentrator 461 is not particularly limited as long as the spatial optical signal can be collected toward the region where the plurality of light receiving elements 47-1 to M is disposed. For example, a mechanism for guiding the optical signal collected by the concentrator 461 toward the light receiving units of the plurality of light receiving elements 47-1 to M may be added.

Each of the plurality of light receiving filters 470-1 to M is disposed before the plurality of light receiving elements 47-1 to M. The plurality of light receiving filters 470-1 to M is arranged in association with the light receiving units of the plurality of light receiving elements 47-1 to M, respectively. For example, the plurality of light receiving filters 470-1 to M is disposed to overlap the light receiving units of the plurality of light receiving elements 47-1 to M, respectively. The light receiving filters 470-1 to M are selected according to the wavelength band of the spatial optical signal to be received. For example, when the wavelength band of the spatial optical signal to be received is L1, a light receiving filter 470 including a band pass filter that selectively transmits the light in the L1 wavelength band is selected. For example, in a case where the wavelength band of the spatial optical signal to be received is L2, the light receiving filter 470 including a band pass filter that selectively transmits light in the L2 wavelength band is selected. For example, when the wavelength band of the spatial optical signal to be received is L3, the light receiving filter 470 including a band pass filter that selectively transmits light in the L3 wavelength band is selected. For example, when the wavelength band of the spatial optical signal to be received is L4, the light receiving filter 470 including the band pass filter that selectively transmits the light of the L4 wavelength band is selected. In accordance with the wavelength characteristic of each of the plurality of light receiving filters 470-1 to M, an optical signal in a wavelength band related to each of the plurality of light receiving filters 470-1 to M is received by the light receiving unit of each of the plurality of light receiving elements 47-1 to M.

The light receiving element 47 has a configuration similar to that of the light receiving element 17 of the first example embodiment. The plurality of light receiving elements 47-1 to M is arranged after the plurality of light receiving filters 470-1 to M, respectively. The plurality of light receiving elements 47-1 to M is disposed in such a way that two light receiving elements 47 form a pair. In the case of FIG. 35, the light receiving element 47-1 and the light receiving element 47-2 form a pair, the light receiving element 47-3 and the light receiving element 47-4 form a pair, and the light receiving element 47-1 to M and the light receiving element 47 to M form a pair. The pair of two light receiving elements 47 is disposed adjacent to each other. The plurality of light receiving elements 47-1 to M includes the light receiving units that receive the optical signals having passed through the plurality of light receiving filters 470-1 to M, respectively. A light receiving filter 470 is installed in the light receiving unit of each of the plurality of light receiving elements 47-1 to M. The light receiving filters 470 having different polarization states are installed in the pair of two light receiving elements 47. The plurality of light receiving elements 47-1 to M is arranged so that the light emitting surface of the concentrator 461 and the light receiving unit face each other via each of the plurality of light receiving filters 470-1 to M. The light receiving units of the plurality of light receiving elements 47-1 to M are arranged to face the plurality of light receiving filters 470-1 to M, respectively. The optical signals having passed through the plurality of light receiving filters 470-1 to M are received by the light receiving units of the plurality of light receiving elements 47-1 to M. The pair of two light receiving elements 47 simultaneously receive optical signals having passed through the light receiving filters 470 having different polarization states, the optical signals having different wavelength bands. Each of the plurality of light receiving elements 47-1 to M converts the received optical signal into an electric signal (hereinafter, also referred to as a signal). Each of the plurality of light receiving elements 47-1 to M outputs the converted signal to the reception circuit 48. For example, the pair of two light receiving elements 47 among the plurality of light receiving elements 47-1 to M is connected to the reception circuit 48. For example, each of the plurality of light receiving elements 47-1 to M is individually connected to the reception circuit 48. For example, a group of some of the plurality of light receiving elements 47-1 to M may be connected to the reception circuit 48.

The reception circuit 48 has a configuration similar to that of the reception circuit 18 of the first example embodiment. The reception circuit 48 acquires a signal output from each of the plurality of light receiving elements 47-1 to M. The reception circuit 48 amplifies a signal from each of the plurality of light receiving elements 47-1 to M. The reception circuit 48 decodes the amplified signal and analyzes a signal from the communication target. For example, the reception circuit 48 analyzes signals for the pair of two light receiving elements 47 among the plurality of light receiving elements 47-1 to M. For example, the reception circuit 48 collectively analyzes the signals of the plurality of light receiving elements 47-1 to M. In a case where the signals of the plurality of light receiving elements 47-1 to M are collectively analyzed, it is possible to achieve the single-channel light-receiving device 46 that communicates with a single communication target. For example, the reception circuit 48 individually analyzes a signal for each of the plurality of light receiving elements 47-1 to M. In a case where signals are individually analyzed for each of the plurality of light receiving elements 47-1 to M, it is possible to achieve the multi-channel light-receiving device 46 that simultaneously communicates with a plurality of communication targets. The signal decoded by the reception circuit 48 is used for any purpose. The use of the signal decoded by the reception circuit 48 is not particularly limited.

[Wavelength Multiplexing+Polarization Multiplexing]

Figure 36:
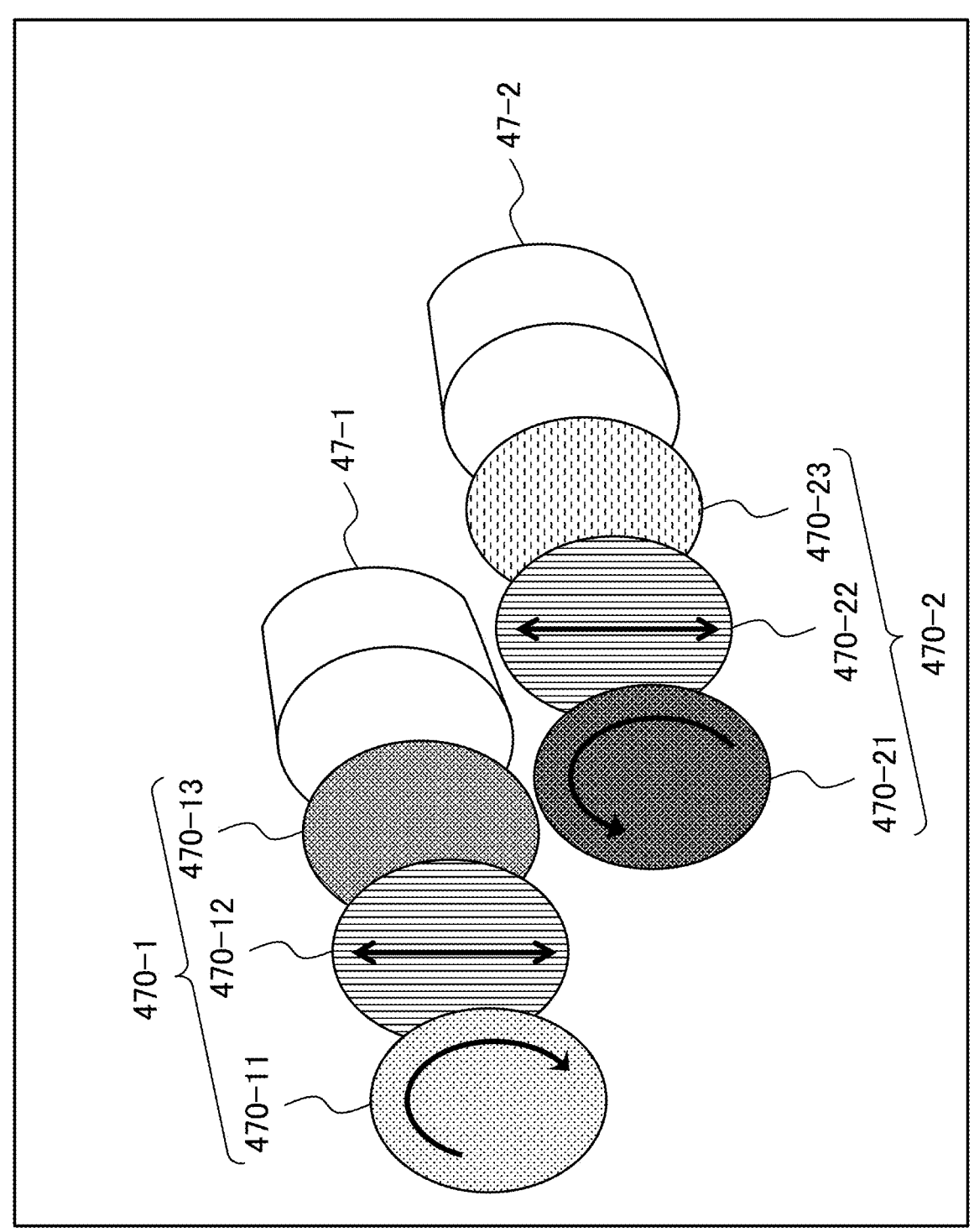
FIG. 36 is a conceptual diagram for describing an example of a filter associated with a light receiving element of the light-receiving device included in the communication device according to the fourth example embodiment.

Next, an example of combining wavelength multiplexing and polarization multiplexing will be described with reference to the drawings. FIG. 36 is a conceptual diagram for describing a configuration example of the light receiving filter 470 in a case where wavelength multiplexing and polarization multiplexing are combined. In FIG. 36, a light receiving filter 470-1 and a light receiving filter 470-2 associated with the pair of two light receiving elements 47-1 to 2, respectively, will be described as an example. In the example of FIG. 36, the two light receiving elements 47-1 to 2 are disposed at intervals, but are actually disposed adjacent to each other.

The polarization direction of the optical signal to be received by the light receiving element 47-1 is clockwise in the sheet of FIG. 36. The light receiving filter 470-1 associated with the light receiving element 47-1 includes a wave plate 470-11, a polarizing plate 470-12, and a band pass filter 470-13. The wave plate 470-11 converts an optical signal of incident clockwise circularly polarized light into linearly polarized light. The polarizing plate 470-12 transmits linearly polarized light in a polarization direction in the vertical direction with respect to the sheet of FIG. 36 in the linearly polarized light converted by the wave plate 470-11. The band pass filter 470-13 selectively transmits light in a wavelength band to be received. The optical signal of the polarization component having passed through the light receiving filter 470-1 is received by a light receiving element 47-1.

The polarization direction of the optical signal to be received by the light receiving element 47-2 is counterclockwise in the sheet of FIG. 36. The light receiving filter 470-2 associated with the light receiving element 47-2 includes a wave plate 470-21, a polarizing plate 470-22, and a band pass filter 470-23. The wave plate 470-21 converts an optical signal of incident counterclockwise circularly polarized light into linearly polarized light. The polarizing plate 470-22 transmits linearly polarized light in a polarization direction in the vertical direction with respect to the sheet of FIG. 36 in the linearly polarized light converted by the wave plate 470-21. The band pass filter 470-23 selectively transmits light in a wavelength band to be received. The optical signal of the polarization component having passed through the light receiving filter 470-2 is received by a light receiving element 47-2. That is, the light receiving element 47-1 and the light receiving element 47-2 receive circularly polarized light having polarization directions opposite to each other and transmitted from the same transmission source, that is, optical signals derived from spatial optical signals having different wavelength bands.

Figure 37:
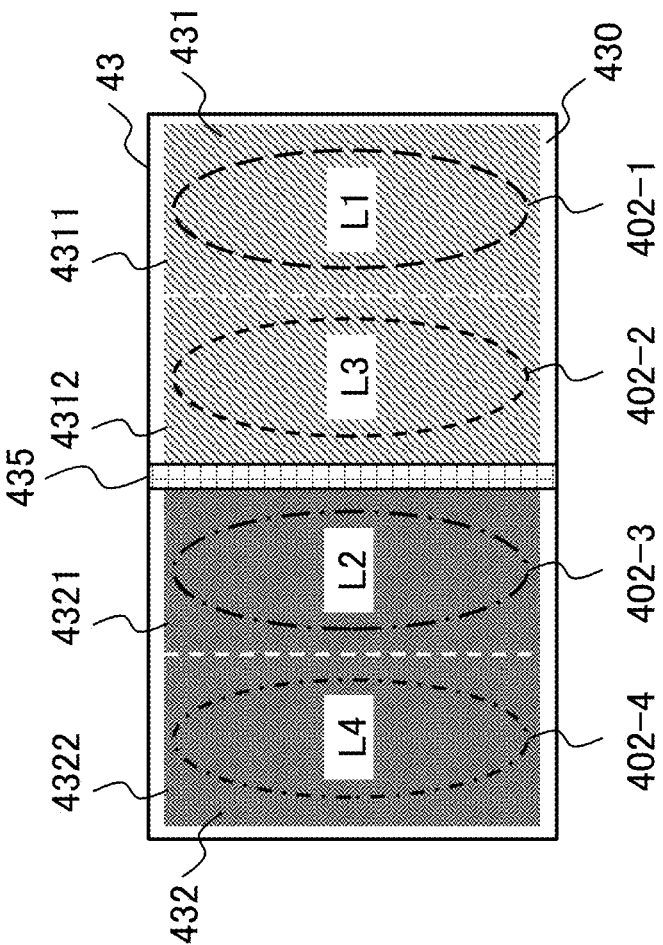
FIG. 37 is a conceptual diagram for describing an example of an irradiation range of light with which a modulation region is irradiated set in a modulation part of a spatial light modulator of the optical transmission device included in the communication device of the fourth example embodiment.

FIG. 37 is a conceptual diagram for describing region division of the modulation part 430 of the spatial light modulator 43 in an example of combining wavelength multiplexing communication and polarization multiplexing communication. In the example of FIG. 37, the first modulation region 431 and the second modulation region 432 are set in the modulation part 430 of the spatial light modulator 43. Each of the first modulation region 431 and the second modulation region 432 is divided into two sub-regions (first sub-region, second sub-region). FIG. 37 illustrates wavelength bands (L1, L3, L2, L4) of light 402-1 to 4 applied to the inside of the irradiation regions of light 402-1 to 4 with which the first modulation region 431 and the second modulation region 432 are irradiated.

The first modulation region 431 is irradiated with the light 402-1 to 2 emitted from the light source 41. A first sub-region 4311 related to the light 402-1 and a second sub-region 4312 related to the light 402-2 are allocated to the first modulation region 431. A pattern (phase image) for converting the light 402-1 into the modulated light 403-1 is set in the first sub-region 4311 of the first modulation region 431. A phase image related to an image formed by the modulated light 403-1 is set in the first sub-region 4311 of the first modulation region 431. A phase image for converting the light 402-2 into the modulated light 403-2 is set in the second sub-region 4312 of the first modulation region 431. A phase image related to an image formed by the modulated light 403-2 is set in the second sub-region 4312 of the first modulation region 431. The modulated light 403-1 to 2 modulated in the first modulation region 431 passes through a wave plate (not illustrated) that converts the modulated light into counterclockwise circularly polarized light.

The second modulation region 432 is irradiated with the light 402-3 to 4 emitted from the light source 41. A first sub-region 4321 related to the light 402-3 and a second sub-region 4322 related to the light 402-4 are allocated to the second modulation region 432. A phase image for converting the light 402-3 into the modulated light 403-3 is set in the first sub-region 4321 of the second modulation region 432. A phase image related to an image formed by the modulated light 403-3 is set in the first sub-region 4321 of the second modulation region 432. A phase image for converting the light 402-4 into the modulated light 403-4 is set in the second sub-region 4322 of the second modulation region 432. A phase image related to an image formed by the modulated light 403-4 is set in the second sub-region 4322 of the second modulation region 432. The modulated light 403-3 to 4 modulated in the second modulation region 432 passes through a wave plate (not illustrated) that converts the modulated light into clockwise circularly polarized light. In the example of FIG. 37, the irradiation ranges of the modulated light 403-1 to 2 are set in the first modulation region 431, and the irradiation ranges of the modulated light 403-3 to 4 are set in the second modulation region 432. Then, the modulated light 403-1 to 2 modulated in the first modulation region 431 and the modulated light 403-3 to 4 modulated in the second modulation region 432 are converted into circularly polarized light having opposite rotation directions.

Figure 38:
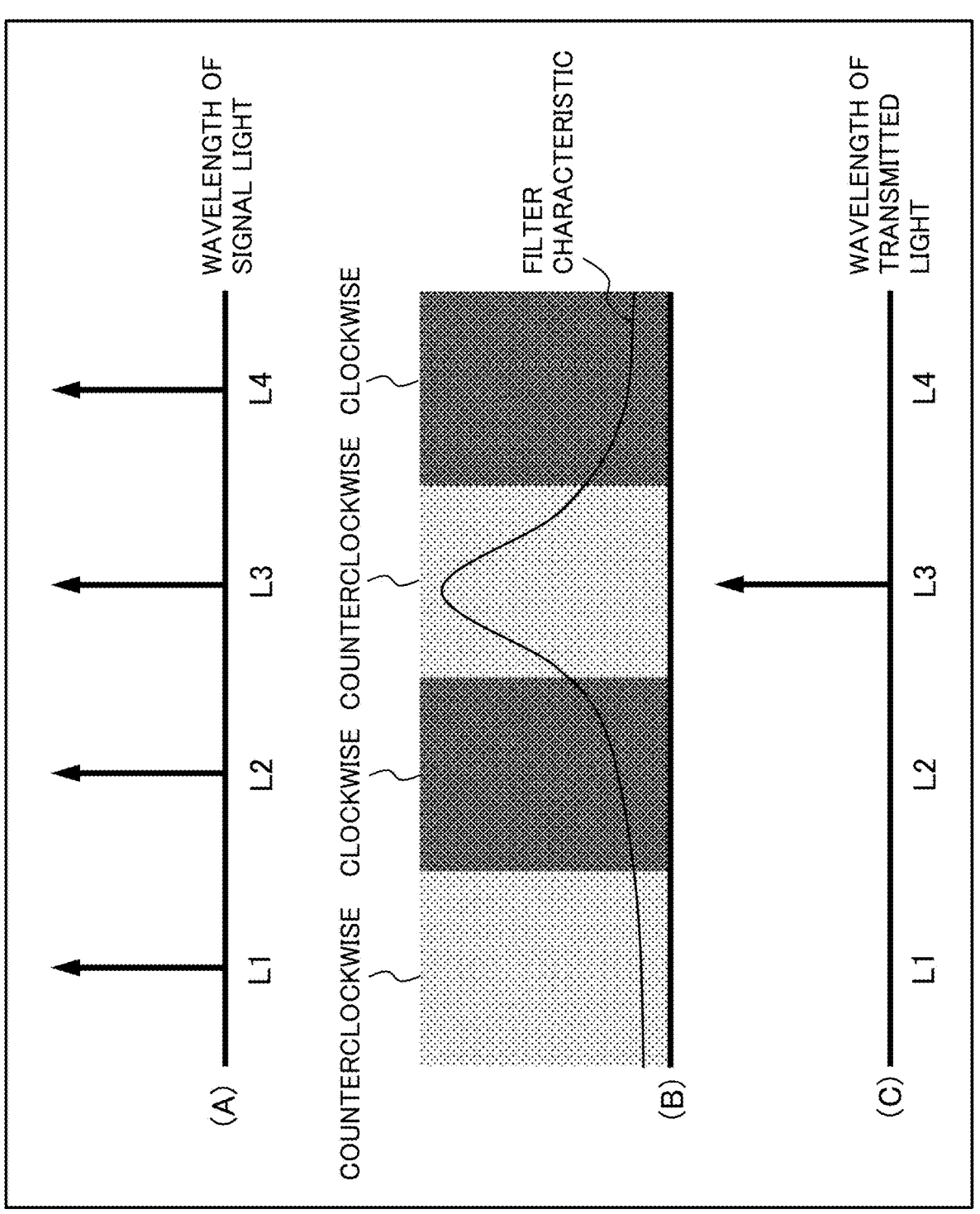
FIG. 38 is a conceptual diagram for describing an effect obtained by combining polarization multiplexing and wavelength multiplexing using the optical transmission device included in the communication device of the fourth example embodiment.

FIG. 38 is a conceptual diagram for describing an effect obtained by combining wavelength multiplexing and polarization multiplexing. FIG. 38(A) illustrates wavelength bands included in signal light. The signal light includes light in a wavelength band L1, a wavelength band L2, a wavelength band L3, and a wavelength band L4. FIG. 38(B) is a conceptual diagram illustrating an example of a combination with a band pass filter wave plate. The band pass filter has a filter characteristic of transmitting light in a wavelength band having a distribution centered on the wavelength band L3. When only the band pass filter is used, although the amount of light passing therethrough is small, the light in the wavelength band L2 or the wavelength band L4 close to the wavelength band L3 passes therethrough. FIG. 38(C) is a conceptual diagram illustrating an example of a wavelength of transmitted light passing through a filter in which a band pass filter and a wave plate are combined. When the modulation part 430 of the spatial light modulator 43 is divided into regions as illustrated in FIG. 37, the polarization directions of light in adjacent wavelength bands can be alternately set to be different. Therefore, crosstalk of light in adjacent wavelength bands hardly occurs. That is, when the modulation part 430 of the spatial light modulator 43 is divided into regions as illustrated in FIG. 37, wavelength multiplexing and polarization multiplexing can be combined. When wavelength multiplexing and polarization multiplexing are combined, crosstalk in the wavelength bands that are likely to occur due to wavelength multiplexing can be suppressed.

As described above, the communication device of the present example embodiment includes the optical transmission device, the light-receiving device, and the control device. The optical transmission device includes the light source, the spatial light modulator, the wave plate, and the curved surface mirror. The light source includes a plurality of light emitters that emits light in different wavelength bands. The plurality of light emitters emit light toward a modulation part of the spatial light modulator. The spatial light modulator includes a modulation part in which a plurality of modulation regions irradiated with the light emitted from a light source is set. The modulation part of the spatial light modulator is divided into a first modulation region and a second modulation region. The spatial light modulator modulates the phase of the radiated light in each of the first modulation region and the second modulation region set in the modulation part. The wave plate converts the modulated light modulated in each of the first modulation region and the second modulation region set in the modulation part of the spatial light modulator into polarization states different from each other. The curved surface mirror has a curved reflection surface irradiated with the modulated light modulated in the first modulation region and the second modulation region set in the modulation part of the spatial light modulator. The curved surface mirror reflects the modulated light on the reflection surface, and projects projection light having an enlarged projection angle according to the curvature of the reflection surface. The light-receiving device receives a spatial optical signal transmitted from another communication device. The control device sets a pattern for forming a spatial optical signal to be transmitted toward another communication device in each of the first modulation region and the second modulation region set in the modulation part of the spatial light modulator of the optical transmission device. The control device controls the light source so that the modulation part in which the pattern is set is irradiated with the light. The control device acquires a signal derived from the spatial optical signal received by the light-receiving device.

As described above, the optical transmission device of the present example embodiment converts the modulated light in the plurality of wavelength bands modulated by each of the plurality of modulation regions set in the modulation part of the spatial light modulator into polarization states different from each other. The projection light projected from the optical transmission device of the present example embodiment includes light in a plurality of wavelength bands converted into polarization states different from each other. Therefore, the optical transmission device of the present example embodiment can simultaneously transmit spatial optical signals in a plurality of wavelength bands different for each polarization state. That is, according to the present example embodiment, it is possible to implement optical spatial communication combined with wavelength multiplexing communication and polarization multiplexing communication.

A light-receiving device according to an aspect of the present example embodiment includes a concentrator, a plurality of light receiving elements, and a plurality of light receiving filters. The concentrator collects a spatial optical signal transmitted from another communication device. The plurality of light receiving elements receive the spatial optical signal collected by the concentrator. The plurality of light receiving filters is disposed in association with the plurality of light receiving elements, respectively. Each of the plurality of light receiving filters includes a band pass filter that selectively transmits light in a wavelength band to be received by the associated light receiving element. Each of the plurality of light receiving filters selectively transmits the spatial optical signal in the wavelength band to be received by the associated light receiving element. According to the present aspect, it is possible to have a configuration in which the optical signal in the wavelength band to be received by each of the plurality of light receiving elements is selectively received for the plurality of light receiving elements.

Fifth Example Embodiment

Figure 39:
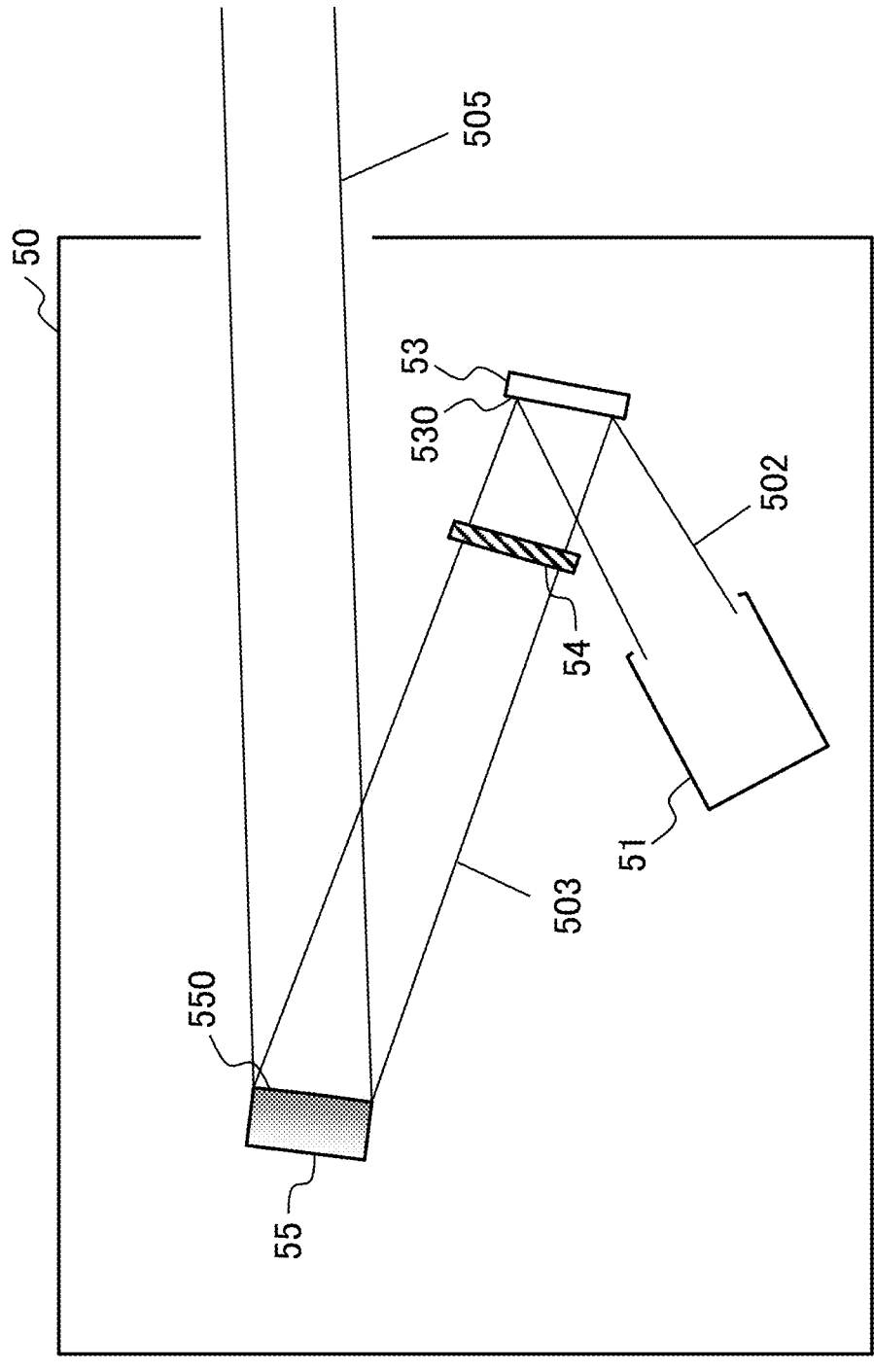
FIG. 39 is a block diagram illustrating an example of a configuration of an optical transmission device according to a fifth example embodiment.

Next, an optical transmission device according to a fifth example embodiment will be described with reference to the drawings. The communication device of the present example embodiment has a simplified configuration of the optical transmission devices of the first to fourth example embodiments. FIG. 39 is a block diagram illustrating an example of an optical transmission device 50 of the present example embodiment. The optical transmission device 50 includes a light source 51, a spatial light modulator 53, a wave plate 54, and a curved surface mirror 55.

The light source 51 emits light 502 toward a modulation part 530 of the spatial light modulator 53. The spatial light modulator 53 includes the modulation part 530 in which a plurality of modulation regions irradiated with the light 502 emitted from the light source 51 is set. The spatial light modulator 53 modulates the phase of the radiated light 502 with each of the plurality of modulation regions set in the modulation part 530. The wave plate 54 is disposed on the optical path of modulated light 503 modulated by each of the plurality of modulation regions set in the modulation part 530 of the spatial light modulator 53. The wave plate 54 converts the modulated light 503 modulated in the plurality of modulation regions into polarization states different from each other. The curved surface mirror 55 has a curved reflection surface 550 irradiated with the modulated light 503 converted into the polarization states different from each other. The curved surface mirror 55 reflects the modulated light 503 converted into the polarization states different from each other at a projection angle in accordance with the curvature of the reflection surface 550.

As described above, the optical transmission device of the present example embodiment converts the modulated light modulated in the plurality of modulation regions set in the modulation part of the spatial light modulator into polarization states different from each other. The projection light projected from the optical transmission device of the present example embodiment includes light components converted into polarization states different from each other. Therefore, the optical transmission device of the present example embodiment can simultaneously transmit a plurality of spatial optical signals different for each polarization state. That is, according to the present example embodiment, it is possible to implement optical spatial communication using multiplexed spatial optical signals.

(Hardware)

A hardware configuration for executing control and processing according to each example embodiment of the present disclosure will be described using an information processing device 90 of FIG. 40 as an example. The information processing device 90 in FIG. 40 is a configuration example for performing control and a process of each example embodiment, and does not limit the scope of the present disclosure.

Figure 40:
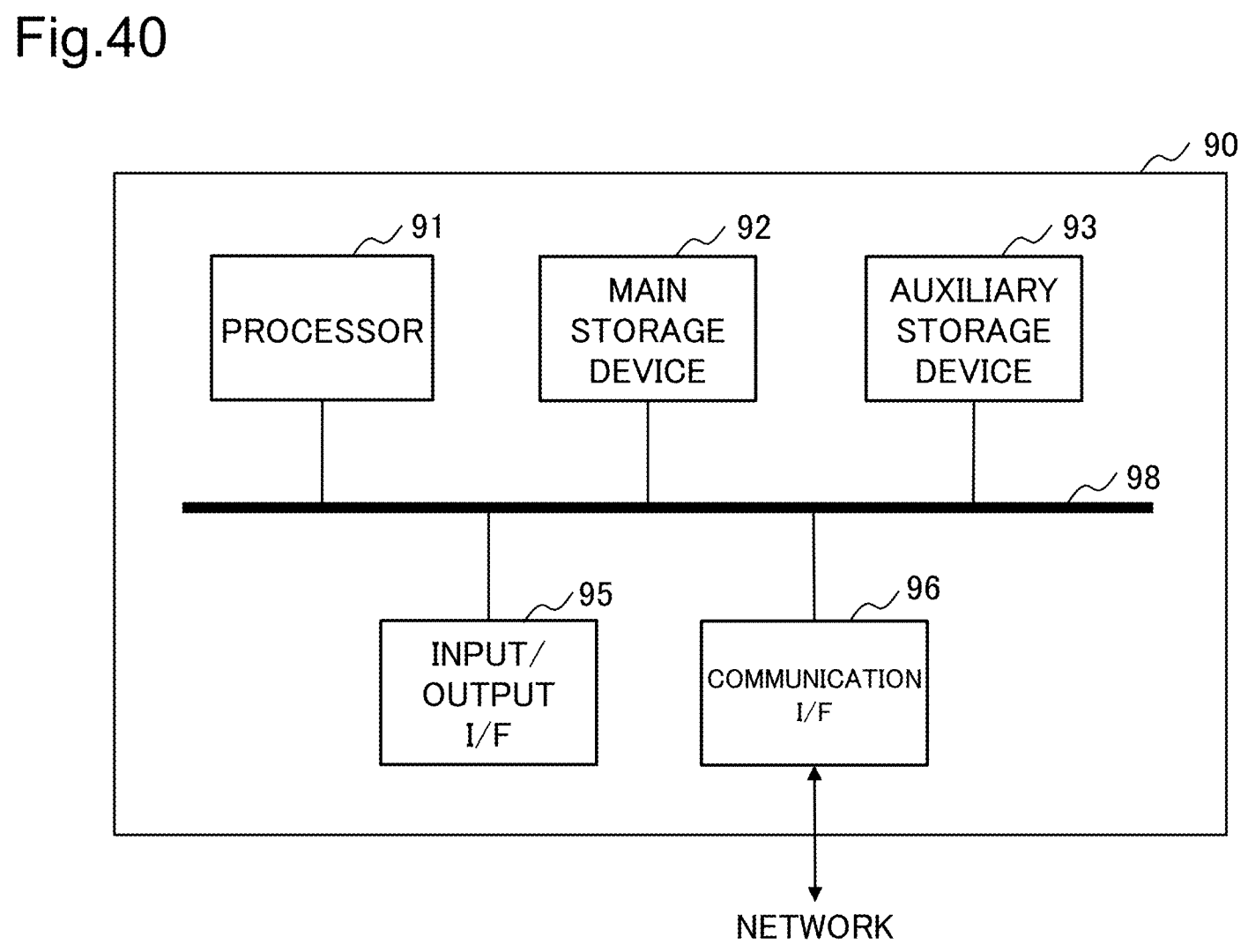

As illustrated in FIG. 40, the information processing device 90 includes a processor 91, a main storage device 92, an auxiliary storage device 93, an input/output interface 95, and a communication interface 96. In FIG. 40, the interface is abbreviated as an interface (I/F). The processor 91, the main storage device 92, the auxiliary storage device 93, the input/output interface 95, and the communication interface 96 are data-communicably connected to each other via a bus 98. The processor 91, the main storage device 92, the auxiliary storage device 93, and the input/output interface 95 are connected to a network such as the Internet or an intranet via the communication interface 96.

The processor 91 develops the program stored in the auxiliary storage device 93 or the like in the main storage device 92. The processor 91 executes the program developed in the main storage device 92. In the present example embodiment, a software program installed in the information processing device 90 may be used. The processor 91 executes control and processing according to each example embodiment.

The main storage device 92 has an area in which a program is developed. A program stored in the auxiliary storage device 93 or the like is developed in the main storage device 92 by the processor 91. For example, the main storage device 92 is achieved by a volatile memory. An example of the volatile memory includes a dynamic random access memory (DRAM). For example, a nonvolatile memory may be configured/added to the main storage device 92. An example of the nonvolatile memory includes a magnetoresistive random access memory (MRAM).

The auxiliary storage device 93 stores various pieces of data such as programs. The auxiliary storage device 93 is achieved by a local disk such as a hard disk or a flash memory. Various pieces of data may be stored in the main storage device 92, and the auxiliary storage device 93 may be omitted.

The input/output interface 95 is an interface that connects the information processing device 90 with a peripheral device based on a standard or a specification. The communication interface 96 is an interface that connects to an external system or a device through a network such as the Internet or an intranet in accordance with a standard or a specification. The input/output interface 95 and the communication interface 96 may be shared as an interface connected to an external device.

An input device such as a keyboard, a mouse, or a touch panel may be connected to the information processing device 90 as necessary. These input devices are used to input of information and settings. In a case where the touch panel is used as the input device, the display screen of the display device may also serve as the interface of the input device. Data communication between the processor 91 and the input device may be mediated by the input/output interface 95.

The information processing device 90 may be provided with a display device that displays information. In a case where a display device is provided, the information processing device 90 preferably includes a display control device (not illustrated) that controls display of the display device. The display device may be connected to the information processing device 90 via the input/output interface 95.

The information processing device 90 may be provided with a drive device. The drive device mediates reading of data and a program from the recording medium, writing of a processing result of the information processing device 90 to the recording medium, and the like between the processor 91 and the recording medium (program recording medium). The drive device may be connected to the information processing device 90 via the input/output interface 95.

The above is an example of a hardware configuration for enabling control and processing according to each example embodiment of the present invention. The hardware configuration of FIG. 40 is an example of a hardware configuration for executing control and processing according to each example embodiment, and does not limit the scope of the present invention. The control according to each example embodiment and the program executed by the processing computer are also included in the scope of the present invention. A program recording medium in which the program according to each example embodiment is recorded is also included in the scope of the present invention. The recording medium can be achieved by, for example, an optical recording medium such as a compact disc (CD) or a digital versatile disc (DVD). The recording medium may be achieved by a semiconductor recording medium such as a universal serial bus (USB) memory or a secure digital (SD) card. The recording medium may be achieved by a magnetic recording medium such as a flexible disk, or another recording medium. In a case where the program executed by the processor is recorded in the recording medium, the recording medium corresponds to a program recording medium.

The components of each example embodiment may be combined in any manner. The components of each example embodiment may be achieved by software or may be achieved by a circuit.

While the present invention is described with reference to example embodiments thereof, the present invention is not limited to these example embodiments. Various modifications that can be understood by those of ordinary skill in the art can be made to the configuration and details of the present invention within the scope of the present invention.

Some or all of the above example embodiments may be described as the following Supplementary Notes, but are not limited to the following.

(Supplementary Note 1)

A optical transmission device including
a light source,
a spatial light modulator including a modulation part where a plurality of modulation regions that is irradiated with the light emitted from the light source is set, the spatial light modulator modulating a phase of the radiated light in each of the plurality of modulation regions that is set in the modulation part,
a wave plate disposed in an optical path of modulated light that is modulated in each of the plurality of modulation regions set in the modulation part of the spatial light modulator, the wave plate converting the modulated light that is modulated in each of the plurality of modulation regions to mutually different polarization states, and
a curved surface mirror having a curved reflection surface irradiated with the modulated light that is converted to the mutually different polarization states, the curved surface mirror reflecting the modulated light converted to the mutually different polarization states at a projection angle in accordance with a curvature of the reflection surface.

(Supplementary Note 2)

The optical transmission device according to Supplementary Note 1, further including a partition wall that is disposed in at least any one of boundaries of the plurality of modulation regions and prevents the modulated light modulated in each of the plurality of modulation regions from being mixed.

(Supplementary Note 3)

The optical transmission device according to Supplementary Note 1 or 2, wherein
the light source includes
a first light emitter and a second light emitter, and wherein
the modulation part of the spatial light modulator
is divided into a first modulation region irradiated with light emitted from the first light emitter and a second modulation region irradiated with light emitted from the second light emitter.

(Supplementary Note 4)

The optical transmission device according to Supplementary Note 1 or 2, wherein
the light source includes
a first light emitter, a second light emitter, a third light emitter, and a fourth light emitter, and wherein
the modulation part of the spatial light modulator
is divided into a first modulation region including a sub-region irradiated with light emitted from each of the first light emitter and light emitted from the second light emitter, and a second modulation region including a sub-region irradiated with each of light emitted from the third light emitter and light emitted from the fourth light emitter.

(Supplementary Note 5)

The optical transmission device according to Supplementary Note 3 or 4, wherein
the wave plate
includes a half-wave plate, and is installed on an optical path of the modulated light modulated in any one of the first modulation region and the second modulation region.

(Supplementary Note 6)

The optical transmission device according to Supplementary Note 3 or 4, wherein
the wave plate includes
a first wave plate that includes a quarter-wave plate, is installed on an optical path of the modulated light modulated in the first modulation region, and converts the modulated light modulated in the first modulation region into circularly polarized light whose polarization direction is a first rotation direction, and
a second wave plate that includes a quarter-wave plate, is installed on an optical path of the modulated light modulated in the second modulation region, and converts the modulated light modulated in the second modulation region into circularly polarized light whose polarization direction is a second rotation direction, and wherein
a rotation direction of the first rotation direction is opposite to a rotation direction of the second rotation direction.

(Supplementary Note 7)

The optical transmission device according to any one of Supplementary Notes 3 to 6, wherein
the spatial light modulator includes
a first spatial light modulator in which the first modulation region is set, and a second spatial light modulator in which the second modulation region is set, and wherein
the first spatial light modulator and the second spatial light modulator are disposed in such a way that polarization directions are perpendicular to each other.

(Supplementary Note 8)

The optical transmission device according to any one of Supplementary Notes 1 to 7, wherein the light source includes a plurality of light emitters that emits light in different wavelength bands.

(Supplementary Note 9)

A communication device including the optical transmission device according to any one of Supplementary Notes 1 to 8, a light-receiving device that receives a spatial optical signal transmitted from a communication target, and a control device that sets a pattern for forming a spatial optical signal to be transmitted toward the communication target in each of a plurality of modulation regions set in a modulation part of a spatial light modulator of the optical transmission device, controls a light source of the optical transmission device in such a way that the modulation part in which the pattern is set is irradiated with light, and acquires a signal derived from the spatial optical signal received by the light-receiving device.

(Supplementary Note 10)

The communication device according to Supplementary Note 9, wherein the light-receiving device includes a concentrator that collects the spatial optical signal transmitted from another communication device, a plurality of light receiving elements that receives an optical signal to be received among the spatial optical signals collected by the concentrator, and a light receiving filter that is disposed in association with each of the plurality of light receiving elements and selectively transmits the optical signal to be received by the associated light receiving element.

(Supplementary Note 11)

The communication device according to Supplementary Note 10, wherein the light receiving filter includes a polarizing plate that selectively transmits linearly polarized light in a polarization direction of the optical signal to be received by the associated light receiving element.

(Supplementary Note 12)

The communication device according to Supplementary Note 10, wherein the light receiving filter includes a quarter-wave plate that converts the optical signal to be received by the associated light receiving element from circularly polarized light into linearly polarized light, and a polarizing plate that selectively transmits the linearly polarized light whose polarization direction is a specific direction in the linearly polarized light converted by the quarter-wave plate.

(Supplementary Note 13)

The communication device according to any one of Supplementary Notes 10 to 12, wherein the light receiving filter includes a band pass filter that selectively transmits the optical signal in a wavelength band to be received by the associated light receiving element.

REFERENCE SIGNS LIST 1, 2, 3, 4 communication device
10, 20, 30, 40, 50 optical transmission device
11, 21, 31, 41 light source 13, 23, 43 spatial light modulator
14, 24, 34, 54 wave plate
15, 25, 35, 45 curved surface mirror
16, 26, 36, 46 light-receiving device
17, 47 light receiving element
18, 48 reception circuit
19, 29, 39, 49 control device
135, 235, 435 partition wall
141, 241 first wave plate
142, 242 second wave plate
161, 461 concentrator
170, 470 light receiving filter
181 first processing circuit
182 control circuit
183 selector
185 second processing circuit
331 first spatial light modulator
332 second spatial light modulator
1811 high-pass filter
1813 amplifier
1815 integrator

What is claimed is:

1. An optical transmission device comprising:

a light source;

a spatial light modulator including a modulation part where a plurality of modulation regions that is irradiated with light emitted from the light source is set, the spatial light modulator modulating a phase of the radiated light in each of the plurality of modulation regions that is set in the modulation part;

a wave plate disposed in an optical path of modulated light that is modulated in each of the plurality of modulation regions set in the modulation part of the spatial light modulator, the wave plate converting the modulated light that is modulated in each of the plurality of modulation regions to mutually different polarization states; and a curved surface mirror having a curved reflection surface irradiated with the modulated light that is converted to the mutually different polarization states, the curved surface mirror reflecting the modulated light converted to the mutually different polarization states at a projection angle in accordance with a curvature of the reflection surface.

2. The optical transmission device according to claim 1, further comprising:

a partition wall that is disposed in at least any one of boundaries of the plurality of modulation regions and prevents the modulated light modulated in each of the plurality of modulation regions from being mixed.

3. The optical transmission device according to claim 1, wherein the light source includes a first light emitter and a second light emitter, and wherein the modulation part of the spatial light modulator is divided into a first modulation region irradiated with light emitted from the first light emitter and a second modulation region irradiated with light emitted from the second light emitter.

4. The optical transmission device according to claim 3, wherein the wave plate includes a half-wave plate, and is installed on an optical path of the modulated light modulated in any one of the first modulation region and the second modulation region.

5. The optical transmission device according to claim 3, wherein
the wave plate includes
a first wave plate that includes a quarter-wave plate, is installed on an optical path of the modulated light modulated in the first modulation region, and converts the modulated light modulated in the first modulation region into circularly polarized light whose polarization direction is a first rotation direction; and
a second wave plate that includes a quarter-wave plate, is installed on an optical path of the modulated light modulated in the second modulation region, and converts the modulated light modulated in the second modulation region into circularly polarized light whose polarization direction is a second rotation direction, and wherein
a rotation direction of the first rotation direction is opposite to a rotation direction of the second rotation direction.

6. The optical transmission device according to claim 3, wherein
the spatial light modulator includes
a first spatial light modulator in which the first modulation region is set, and a second spatial light modulator in which the second modulation region is set, and wherein
the first spatial light modulator and the second spatial light modulator are disposed in such a way that polarization directions are perpendicular to each other.

7. The optical transmission device according to claim 1, wherein
the light source includes
a first light emitter, a second light emitter, a third light emitter, and a fourth light emitter, and wherein
the modulation part of the spatial light modulator
is divided into a first modulation region including a sub-region irradiated with light emitted from each of the first light emitter and light emitted from the second light emitter, and a second modulation region including a sub-region irradiated with each of light emitted from the third light emitter and light emitted from the fourth light emitter.

8. The optical transmission device according to claim 1, wherein
the light source includes
a plurality of light emitters that emits light in different wavelength bands.

9. A communication device comprising:
the optical transmission device according to claim 1;
a light-receiving device that receives a spatial optical signal transmitted from a communication target; and a controller comprising
a memory storing instructions, and
a processor connected to the memory and configured to execute the instructions to
set a pattern for forming a spatial optical signal to be transmitted toward the communication target in each of a plurality of modulation regions set in a modulation part of a spatial light modulator of the optical transmission device,
control a light source of the optical transmission device in such a way that the modulation part in which the pattern is set is irradiated with light, and
acquire a signal derived from the spatial optical signal received by the light-receiving device.

10. The communication device according to claim 9, wherein
the light-receiving device includes
a concentrator that collects the spatial optical signal transmitted from another communication device,
a plurality of light receiving elements that receives an optical signal to be received among the spatial optical signals collected by the concentrator, and
a light receiving filter that is disposed in association with each of the plurality of light receiving elements and selectively transmits the optical signal to be received by the associated light receiving element.

11. The communication device according to claim 10, wherein
the light receiving filter includes
a polarizing plate that selectively transmits linearly polarized light in a polarization direction of the optical signal to be received by the associated light receiving element.

12. The communication device according to claim 10, wherein
the light receiving filter includes
a quarter-wave plate that converts the optical signal to be received by the associated light receiving element from circularly polarized light into linearly polarized light, and a polarizing plate that selectively transmits the linearly polarized light whose polarization direction is a specific direction in the linearly polarized light converted by the quarter-wave plate.

13. The communication device according to claim 10, wherein
the light receiving filter includes
a band pass filter that selectively transmits the optical signal in a wavelength band to be received by the associated light receiving element.

\* \* \* \* \*